United States Patent
Takenaka et al.

(10) Patent No.: US 7,715,944 B2
(45) Date of Patent: May 11, 2010

(54) GAIT GENERATING DEVICE OF MOBILE ROBOT

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 925 days.

(21) Appl. No.: 10/597,620

(22) PCT Filed: Feb. 4, 2005

(86) PCT No.: PCT/JP2005/001693
§ 371 (c)(1),
(2), (4) Date: Aug. 1, 2006

(87) PCT Pub. No.: WO2005/075156
PCT Pub. Date: Aug. 18, 2005

(65) Prior Publication Data
US 2009/0171503 A1  Jul. 2, 2009

(30) Foreign Application Priority Data
Feb. 6, 2004  (JP) .............................. 2004-031271

(51) Int. Cl.
*G06F 19/00* (2006.01)
(52) U.S. Cl. .................. 700/245; 700/260; 700/261; 700/250; 318/568.17
(58) Field of Classification Search .................. 700/245, 700/250, 260, 261; 318/568.1, 568.11, 568.12, 318/568.17
See application file for complete search history.

(56) References Cited

U.S. PATENT DOCUMENTS

| 5,426,586 | A | * | 6/1995 | Ozawa ......................... 701/23 |
| 5,594,644 | A | * | 1/1997 | Hasegawa et al. .............. 701/23 |
| 5,872,893 | A | * | 2/1999 | Takenaka et al. ............. 700/245 |
| 6,697,709 | B2 | * | 2/2004 | Kuroki et al. ................ 700/245 |
| 6,876,903 | B2 | * | 4/2005 | Takenaka ..................... 700/245 |
| 6,969,965 | B2 | * | 11/2005 | Takenaka et al. ........ 318/568.12 |

(Continued)

FOREIGN PATENT DOCUMENTS

EP  1 475 198  11/2004

(Continued)

*Primary Examiner*—Thomas G Black
*Assistant Examiner*—Ce Li
(74) *Attorney, Agent, or Firm*—Rankin, Hill & Clark LLP

(57) ABSTRACT

The placement of the elements (mass points or rigid bodies having inertia) of a model expressing a robot 1 determined according to a first geometric restrictive condition from an instantaneous desired motion of the robot 1 is defined as a first placement, and provisional corrected instantaneous desired motions corresponding to a second placement and a third placement having predetermined relationships with the first placement are determined. The position/posture of a predetermined part 3 (body) of the robot 1 are determined by weighted averages of the position/posture of the aforesaid provisional corrected instantaneous desired motions. Thus, the motion of an instantaneous desired gait created using a dynamic model is properly corrected thereby achieving both improved dynamic accuracy between the motion and a floor reaction force of the instantaneous desired gait and a minimized change in the posture of a predetermined part, such as the body, of the robot without using a dynamic model.

28 Claims, 24 Drawing Sheets

U.S. PATENT DOCUMENTS

| | | | |
|---|---|---|---|
| 7,076,337 B2 * | 7/2006 | Kuroki et al. | 700/254 |
| 7,120,518 B2 * | 10/2006 | Takenaka et al. | 700/245 |
| 7,308,336 B2 * | 12/2007 | Takenaka et al. | 700/245 |
| 7,319,917 B2 * | 1/2008 | Takenaka et al. | 700/245 |
| 7,319,918 B2 * | 1/2008 | Takenaka et al. | 700/245 |
| 7,337,039 B2 * | 2/2008 | Takenaka et al. | 700/245 |
| 7,493,192 B2 * | 2/2009 | Takenaka et al. | 700/260 |

FOREIGN PATENT DOCUMENTS

| | | |
|---|---|---|
| JP | 05-237776 | 9/1993 |
| JP | 05-305584 | 11/1993 |
| JP | 05-318339 | 12/1993 |
| JP | 05-324115 | 12/1993 |
| JP | 09-094785 | 4/1997 |
| JP | 10-086080 | 4/1998 |
| JP | 10-277969 | 10/1998 |
| JP | 2002-086373 | 3/2002 |
| JP | 2002-326173 | 11/2002 |
| WO | 02/087832 | 11/2002 |
| WO | 03/057427 | 7/2003 |
| WO | 2005/068136 | 7/2005 |

* cited by examiner

FIG.7(a)
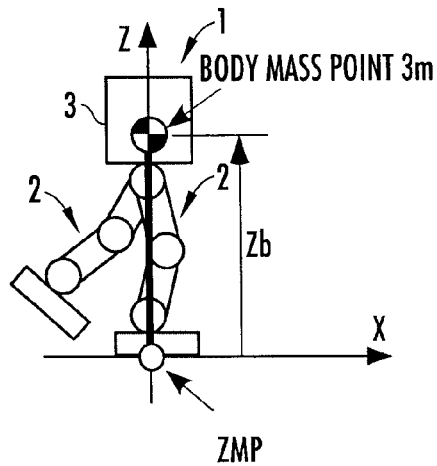
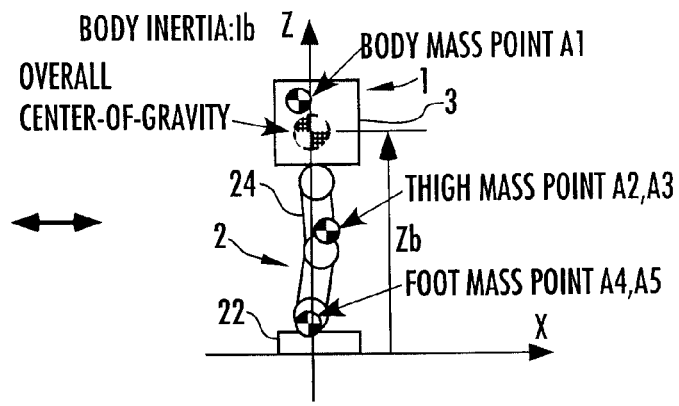
FIG.7(b)
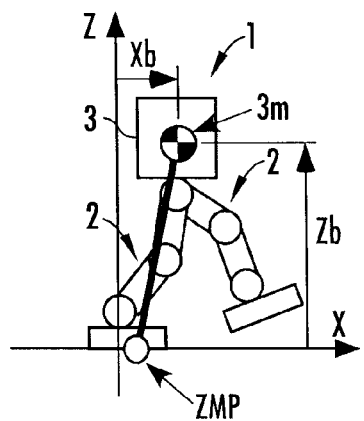
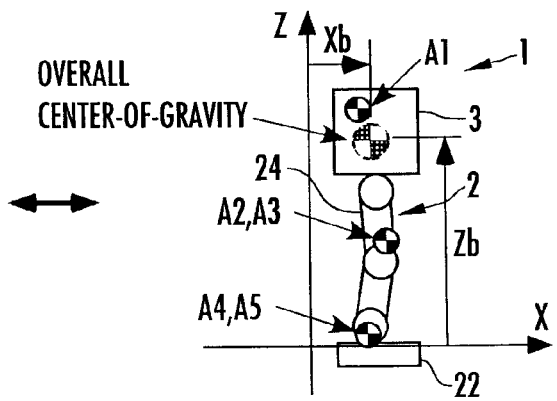
FIG.7(c)
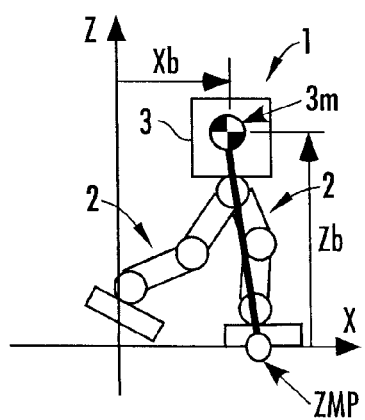
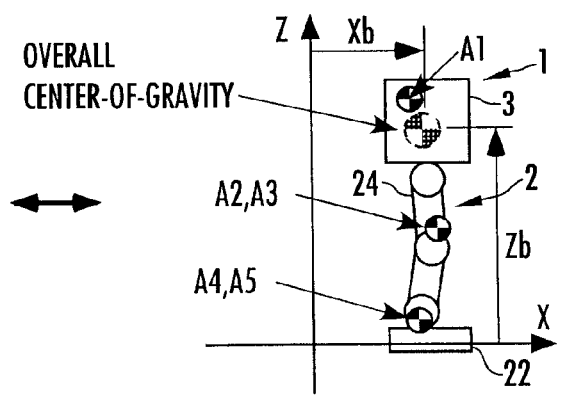

GAIT GENERATING DEVICE OF MOBILE ROBOT

TECHNICAL FIELD

The present invention relates to a device for generating desired gaits of a mobile robot, such as a bipedal mobile robot.

BACKGROUND ART

As techniques for generating desired gaits of a mobile robot, such as a bipedal mobile robot, one disclosed in, for example, Japanese Unexamined Patent Application Publication No. 2002-326173 (patent document 1) and one disclosed in PCT international publication WO/03/057427/A1 (patent document 2) have been proposed by the present applicant. According to the techniques disclosed in these documents, an instantaneous desired gait composed of an instantaneous value of a desired motion (instantaneous desired motion) of a robot and an instantaneous value of a desired floor reaction force (instantaneous desired floor reaction force) is sequentially created using a first dynamic model representing a relationship between a motion of the robot (the position and the posture of each part) and a floor reaction force such that a required dynamic balance condition (a condition, such as the one in which a translational force component of a floor reaction force reaches a desired value or a floor reaction force moment about a certain point takes a desired value) on the first dynamic model is satisfied. Then, the instantaneous desired gait is input to a second dynamic model wherein a part of the instantaneous desired motion (desired body position/posture, a desired moment about a desired ZMP, or the like) is corrected so as to generate a final instantaneous desired gait in a time series manner.

In this case, a model having high linearity is generally used as the first dynamic model. Creating instantaneous desired gaits by using a dynamic model with high linearity makes it possible to efficiently and promptly create gaits (gaits that allow stable motions of the robot to continue) that connect to or gradually approximate normal gaits, which are virtual cyclic gaits. As a result, instantaneous desired gaits of the robot can be sequentially generated in real time while performing actual motions of the actual robot.

However, a dynamic model with high linearity generally tends to exhibit relatively low dynamic accuracy in a variety of operations of a robot. In other words, the dynamics of the robot on the dynamic model is apt to produce errors with respect to the actual dynamics of the actual robot. For this reason, if the instantaneous desired gaits created using the first dynamic model are directly applied to the actual robot to operate the actual robot, then the dynamic balance condition guaranteed on the first dynamic model fails to be satisfied on the actual robot, frequently leading to unstable motions of the actual robot.

Hence, according to the techniques disclosed in the aforesaid patent documents 1 and 2, a part of an instantaneous desired gait created using the first dynamic model is further corrected using the second dynamic model. In this case, a model having higher dynamic accuracy than the first dynamic model is used as the second dynamic model. This makes it possible to generate gaits having higher dynamic accuracy (closer to the dynamics of the actual robot) than the gaits created using the first dynamic model.

Meanwhile, since the first dynamic model tends to exhibit low dynamic accuracy, as mentioned above, dynamic errors may be relatively large, depending on the type of gaits to be generated. More specifically, in a case where a gait is generated to make a robot perform a motion in which an inertial force not assumed (considered) in the first dynamic model is produced, the error frequently increases. For example, in a case where a 3-mass-point dynamic model having mass points, one each corresponding to the body and a portion near the distal portion of each leg of a bipedal mobile robot, respectively, or a 1-mass-point dynamic model having the mass point only in the body of a robot is used as the first dynamic model, if a motion in which especially the knee joint of each leg is bent is carried out relatively quickly, then the dynamic error will be relatively large because of an influence of a change in an inertial force involved in the motion. As a result, an instantaneous desired gait created using the first dynamic model sometimes becomes unduly inappropriate in securing continuous stability of the robot. In such a case, there has been a danger in that even if the instantaneous desired gait is corrected using the second dynamic model, the correction cannot be properly made, and the corrected instantaneous desired gait exhibits low stability allowance or diverges, failing to secure continued stability of the robot.

With the background described above, the present inventor has previously proposed, under Patent Application No. 2004-5029, a technique in which the position and the posture of a predetermined portion are corrected by geometric arithmetic processing without using a dynamic model when correcting the motion of an instantaneous desired gait created using the aforesaid first dynamic model (without using differential equations or integral equations representing relationships between motions and forces), thus improving dynamic accuracy between a motion and an instantaneous desired floor reaction force (reducing dynamic errors). According to this technique, for example, the body position and the body posture of an instantaneous desired gait created using the aforesaid first dynamic model are corrected by geometric arithmetic processing (arithmetic processing that does not use the value of an instantaneous desired floor reaction force or a time-series value thereof, and the differential values of body position/posture). This technique does not need dynamic arithmetic processing, thus making it possible to promptly and efficiently correct instantaneous desired motions.

Meanwhile, this technique is adapted to correct the motion of an instantaneous desired gait by geometric arithmetic processing to reduce a dynamic error each time an instantaneous desired gait is generated, so that there is a danger in that the posture of a corrected part (such as the body) frequently changes.

When correcting a body posture, in particular, if the body posture frequency changes, then an excessive moment is produced at a hip joint, because the body is generally heavy and the inertia is relatively large. As a result, excessive load may be applied to a hip joint actuator or the hip joint portion and the portion of a hip joint and a portion in the vicinity thereof may bend and vibrate, leading to loss of stability of a robot. Further, in the case of, for example, a biped mobile robot, an imaging device as a visual device is usually supported by its body, so that frequent changes in body posture cause the imaging device to shake, making it difficult for the imaging device to recognize its surrounding. In addition, frequent changes in body posture adversely affect the appearance.

In order to prevent changes in the body posture, it is conceivable to always maintain the body posture constant. In this case, the correction of an instantaneous desired motion for improving dynamic accuracy can be accomplished primarily by correcting the position of the body. In this case, however, depending on the motion mode of a robot or a frictional condition of a floor surface, a floor reaction force matching an inertial force to be generated by the motion (translational motion) at the position of the body after the correction may not be actually produced. And, in such a case, the corrected instantaneous desired motion will cause the robot to slip.

The present invention has been made in view of the background described above, and it is an object thereof to provide a gait generating device of a mobile robot that is capable of properly correcting, without using a dynamic model (without using a differential equation or an integral equation that represents a relationship between motions and forces), the motion of an instantaneous desired gait created using a dynamic model, while achieving both improved dynamic accuracy between the motion and a floor reaction force of an instantaneous desired gait and a minimized change in the posture of a predetermined part, such as the body, of a robot, thus making it possible to generate a gait that allows stable motions of the robot to be accomplished.

DISCLOSURE OF INVENTION

According to a first invention of the gait generating device of a mobile robot of the present invention, to the end described above, a gait generating device having an instantaneous gait generating means for sequentially generating an instantaneous desired gait composed of an instantaneous desired motion of a mobile robot and an instantaneous desired floor reaction force includes a first provisional corrected motion determining means for determining a first provisional corrected instantaneous desired motion obtained by provisionally correcting the position and the posture of a predetermined part of the mobile robot from the instantaneous desired motion, a second provisional corrected motion determining means for determining a second provisional corrected instantaneous desired motion obtained by provisionally correcting the position of the predetermined part from the instantaneous desired motion while maintaining the posture of the predetermined part to be the same as the posture in the instantaneous desired motion, and a desired motion correcting means for determining a corrected instantaneous desired motion obtained by executing a true correction of the position and the posture of the predetermined part in the instantaneous desired motion on the basis of the first provisional corrected instantaneous desired motion and the second provisional corrected instantaneous desired motion. And, if all or a part of the mobile robot is expressed in terms of a model constructed of a plurality of elements, the elements being at least either rigid bodies having inertia or mass points, the placement of elements of the model determined according to a predetermined first geometric restrictive condition, which specifies the relationship between an instantaneous motion of the mobile robot and the placement of the elements of the model, from an instantaneous desired motion generated by the instantaneous gait generating means is defined as a first placement, the placement of the elements of the model determined according to a predetermined second geometric restrictive condition, which specifies the relationship between an instantaneous motion of the mobile robot and the placement of the elements of the model, from the first provisional corrected instantaneous desired motion determined by the first provisional corrected motion determining means is defined as a second placement, and the placement of the elements of the model determined according to the second geometric restrictive condition from a second provisional corrected instantaneous desired motion determined by the second provisional corrected motion determining means is defined as a third placement, then the first provisional corrected motion determining means determines the first provisional corrected instantaneous desired motion such that the translational force component of the resultant force of the inertial forces of the elements calculated by treating the difference in the placement of the elements of the model between the second placement and the first placement as acceleration becomes substantially zero and also the moment component generated about a predetermined point by the resultant force becomes substantially a predetermined value, the second provisional corrected motion determining means determines the second provisional corrected instantaneous desired motion such that the moment component generated about the predetermined point by the resultant force of the inertial forces of the elements calculated by treating the difference in the placement of the elements of the model between the third placement and the first placement as acceleration takes substantially the predetermined value, and the desired motion correcting means determines the sum of the result obtained by multiplying the posture of the predetermined part in the first provisional corrected instantaneous desired motion by a predetermined weight w1 and the result obtained by multiplying the posture of the predetermined part in the second provisional corrected instantaneous desired motion by a predetermined weight w2 as the instantaneous desired posture of the predetermined part in the corrected instantaneous desired motion and also determines the sum of the result obtained by multiplying the position of the predetermined part in the first provisional corrected instantaneous desired motion by the predetermined weight w1 and the result obtained by multiplying the position of the predetermined part in the second provisional corrected instantaneous desired motion by the predetermined weight w2 as the instantaneous desired position of the predetermined part in the corrected instantaneous desired motion.

In the present invention to be explained hereinafter, including the first invention, the "placement" of the elements of the model is a term generically expressing the "positions" of mass points as the elements and the "postures" (inclination angles) of rigid bodies (links) having inertia as the elements. In general, a rigid body has a mass and an inertia; however, for the sake of convenience, in the present invention, it is assumed that the rigid body having the mass and the inertia has been taken apart into a mass point that has the mass and is positioned at the center-of-gravity of the rigid body and a rigid body that has zero mass but has the aforementioned inertia. This does not lead to loss of generality. Further, "the first placement," "the second placement," and "the third placement" will mean the sets of the placements of all elements included in the model.

According to the first invention, properly setting the first geometric restrictive condition and the second geometric restrictive condition and also properly setting the elements constituting the model make it possible to match the difference between the second placement and the first placement (the difference between the placement of the elements in the second placement and the placement of the elements in the first placement) to the level (degree) of the dynamic error between the first provisional corrected instantaneous desired motion (the instantaneous desired value of at least one of the position and the posture of each part of the robot determined by the first provisional corrected instantaneous desired motion) and an instantaneous desired floor reaction force generated by the instantaneous gait generating means (the instantaneous desired value of at least one of the translational force of a floor reaction force and a moment acting on the robot). Similarly, it is possible to match the difference between the third placement and the first placement (the difference between the placement of the elements in the third placement and the placement of the elements in the first placement) to the level (degree) of the dynamic error between the second provisional corrected instantaneous desired motion (the instantaneous desired value of at least one of the position and the posture of each part of the robot determined by the second provisional corrected instantaneous desired motion) and an instantaneous desired floor reaction force generated by the instantaneous gait generating means. Supplementally, this matching relationship generally involves a steady offset.

And, according to the first invention, the first provisional corrected instantaneous desired motion is determined by provisionally correcting the position and the posture of the predetermined part from the instantaneous desired motion generated by the instantaneous gait generating means such that the translational force component of the resultant force of the inertial forces of the elements calculated by treating the difference in the placement of the elements of the model between the second placement and the first placement as acceleration becomes substantially zero, and also, the moment component generated about a predetermined point due to the resultant force substantially takes a predetermined value (a fixed offset value). With this arrangement, the first provisional corrected instantaneous desired motion exhibits improved dynamic accuracy relative to both the translational force component and the moment component of the instantaneous desired floor reaction force. However, there is a danger in that the posture of the predetermined part in the first provisional corrected instantaneous desired motion frequently changes.

Supplementally, if the translational force component of the instantaneous desired floor reaction force is not explicitly set, then the translational force component of the floor reaction force generated by the dynamic model used by the instantaneous gait generating means to generate gaits is regarded as the translational force component of the instantaneous desired floor reaction force.

Meanwhile, the second provisional corrected instantaneous desired motion obtained by correcting the position of the predetermined part from the instantaneous desired motion generated by the instantaneous gait generating means is determined such that the moment component, which is generated about the predetermined point by the resultant force of the inertial forces of the elements calculated by treating the difference in the placement of the elements of the model between the third placement and the first placement as acceleration in a state wherein the posture of the predetermined part set at the same posture of the predetermined part in the instantaneous desired motion generated by the instantaneous gait generating means (that is, the state in which the placement of the element of the model corresponding to the predetermined part is matched with the posture of the predetermined part in the instantaneous desired motion), takes substantially the predetermined value. Thus, the second provisional corrected instantaneous desired motion exhibits improved dynamic accuracy relative to the moment component of the instantaneous desired floor reaction force, and the posture of the predetermined part is maintained at the posture of the predetermined part generated by the instantaneous gait generating means, thus limiting (restraining) the changes in the posture, as compared with the first provisional corrected instantaneous desired motion.

Further, according to the first invention, the posture (instantaneous desired posture) of the predetermined part in the corrected instantaneous desired motion is determined as the sum of the result obtained by multiplying the posture of the predetermined part in the first provisional corrected instantaneous desired motion by the predetermined weight w1 and the result obtained by multiplying the posture of the predetermined part in the second provisional corrected instantaneous desired motion by a predetermined weight w2, and the position (instantaneous desired position) of the predetermined part in a corrected instantaneous desired motion is determined as the sum of the result obtained by multiplying the position of the predetermined part in the first provisional corrected instantaneous desired motion by the predetermined weight w1 and the result obtained by multiplying the position of the predetermined part in the second provisional corrected instantaneous desired motion by the predetermined weight w2.

As a result, properly setting the weights w1 and w2 makes it possible to determine a corrected instantaneous desired motion that allows higher dynamic accuracy between the motion and the instantaneous desired floor reaction force than in an instantaneous desired motion generated by the instantaneous gait generating means, while restraining excessive changes in the instantaneous desired posture of the predetermined part at the same time. In this case, the first provisional corrected instantaneous desired motion and the second provisional corrected instantaneous desired motion, which provide a corrected instantaneous desired motion, both exhibit better dynamic accuracy relative to the moment component of the instantaneous desired floor reaction force, so that a gait composed of a set of a corrected instantaneous desired motion and an instantaneous desired floor reaction force makes it possible to secure good stability of the overall posture of the robot. Moreover, the first and the second provisional corrected instantaneous desired motions can be determined by geometric arithmetic processing for the placement of the elements without using temporal changes of the placement of the elements of the model (first-order differential values or second-order differential values of positions and postures). Furthermore, the position/posture of a predetermined part in a corrected instantaneous desired motion can be determined by simple multiplication and addition.

Thus, according to the first invention, a proper correction can be made without using a dynamic model (without using a differential equation or an integral equation representing a relationship between motion and force) so as to achieve both improved dynamic accuracy between a motion and a floor reaction force of an instantaneous desired gait and a minimized change in the posture of a predetermined part, such as the body, of the robot, thus making it possible to generate a gait that permits stable motions of the robot.

Supplementally, in the first invention, it is not always necessary to actually determine the first placement, the second placement, and the third placement or to actually determine the translational force component of the resultant force of the inertial forces of the elements or a moment component, as long as a corrected instantaneous desired motion is eventually determined, as described above.

According to a second invention of the gait generating device of a mobile robot of the present invention, a gait generating device having an instantaneous gait generating means for sequentially generating an instantaneous desired gait composed of an instantaneous desired motion of the mobile robot and an instantaneous desired floor reaction force includes a provisional corrected motion determining means for determining a provisional corrected instantaneous desired motion obtained by provisionally correcting the position and the posture of a predetermined part of the mobile robot from the instantaneous desired motion and a desired motion correcting means for determining a corrected instantaneous desired motion obtained by executing a true correction of the position and the posture of the predetermined part in the instantaneous desired motion. And, if all or a part of the mobile robot is expressed in terms of a model constructed of a plurality of elements, the elements being at least either rigid bodies having inertia or mass points, the placement of elements of the model determined according to a predetermined first geometric restrictive condition, which specifies the relationship between an instantaneous motion of the mobile robot and the placement of the elements of the model, from an instantaneous desired motion generated by the instantaneous gait generating means is defined as a first placement, the placement of the elements of the model determined according to a predetermined second geometric restrictive condition, which specifies the relationship between an instantaneous motion of the mobile robot and the placement of the elements of the model, from the provisional corrected instantaneous desired motion determined by the provisional corrected motion determining means is defined as a second placement, and the placement of the elements of the model determined according to the second geometric restrictive condition from the corrected instantaneous desired motion determined by the desired motion correcting means is defined as a third placement, then the provisional corrected motion determining means determines the provisional corrected instantaneous desired motion such that the translational force component of the resultant force of the inertial forces of the elements calculated by treating the difference in the placement of the elements of the model between the second placement and the first placement as acceleration becomes substantially zero and also the moment component generated about a predetermined point by the resultant force takes substantially a predetermined value, and the desired motion correcting means determines the sum of the result obtained by multiplying the posture of the predetermined part in the provisional corrected instantaneous desired motion by a predetermined weight w1 and the result obtained by multiplying the posture of the predetermined part in the instantaneous desired motion generated by the instantaneous gait generating means by a predetermined weight w2 as the instantaneous desired posture of the predetermined part in the corrected instantaneous desired motion and also determines the instantaneous desired position of the predetermined part in the corrected instantaneous desired motion such that the moment component generated about a predetermined point by the resultant force of the inertial forces of the elements calculated by treating the difference in the placement of the elements of the model between the third placement and the first placement as acceleration becomes substantially a predetermined value.

According to the second invention, as with the first invention, properly setting the first geometric restrictive condition and the second geometric restrictive condition and also properly setting the elements constituting the model make it possible to match the difference between the second placement and the first placement to the level (degree) of the dynamic error between the provisional corrected instantaneous desired motion (the instantaneous desired value of at least one of the position and the posture of each part of the robot determined by the provisional corrected instantaneous desired motion) and an instantaneous desired floor reaction force generated by the instantaneous gait generating means (the instantaneous desired value of at least one of the translational force of a floor reaction force and a moment acting on the robot). Further, it is possible to match the difference between the third placement and the first placement to the level (degree) of the dynamic error between the corrected instantaneous desired motion (the instantaneous desired value of at least one of the position and the posture of each part of the robot determined by the desired motion correcting means) and an instantaneous desired floor reaction force generated by the instantaneous gait generating means. Supplementally, this matching relationship generally involves a steady offset, as with the first invention.

And, according to the second invention, the provisional corrected instantaneous desired motion is determined by provisionally correcting the position and the posture of the predetermined part from the instantaneous desired motion generated by the instantaneous gait generating means such that the translational force component of the resultant force of the inertial forces of the elements calculated by treating the difference in the placement of the elements of the model between the second placement and the first placement as acceleration is substantially zero, and also, the moment component generated about a predetermined point due to the resultant force takes substantially a predetermined value (a certain constant offset value). This provisional corrected instantaneous desired motion is equivalent to the first provisional corrected instantaneous desired motion in the first invention, and exhibits higher dynamic accuracy relative to both translational force component and moment component of the instantaneous desired floor reaction force. However, there is a danger in that the posture of the predetermined part in the provisional corrected instantaneous desired motion frequently changes.

Meanwhile, the corrected instantaneous desired motion as the instantaneous desired motion after a true correction of the instantaneous desired motion generated by the instantaneous gait generating means is determined such that the moment component, which is generated about the predetermined point by the resultant force of the inertial forces of the elements calculated by treating the difference in the placement of the elements of the model between the third placement and the first placement as acceleration in a state, in which the posture of the predetermined part is set to be the same as the sum of the posture obtained by multiplying the posture of the predetermined part in the provisional corrected instantaneous desired motion by the predetermined weight w1 and the posture obtained by multiplying the posture of the predetermined part in the instantaneous desired motion generated by the instantaneous gait generating means by the predetermined weight w2 (that is, a state in which the placement of the element of the model corresponding to the predetermined part is matched with the sum of the posture obtained by multiplying the posture of the predetermined part in the provisional corrected instantaneous desired motion by the weight w1 and the posture obtained by multiplying the posture of the predetermined part in an instantaneous desired motion generated by the instantaneous gait generating means by the weight w2), takes substantially the predetermined value. Here, if the placement of the elements of the model, which is determined according to the second geometric restrictive condition in correspondence with an instantaneous motion obtained by changing only the posture of the predetermined part, from the provisional corrected instantaneous desired motion, to the sum of the posture obtained by multiplying the posture of a predetermined part in the provisional corrected instantaneous desired motion by the weight w1 and the posture obtained by multiplying the posture of the predetermined part in an instantaneous desired motion generated by the instantaneous gait generating means by the predetermined weight w2, is defined as a fourth placement, then the difference between the position of the overall center-of-gravity of the fourth placement and the position of the overall center-of-gravity of the second placement is generally relatively small. Thus, determining a corrected instantaneous desired motion as described above allows the corrected instantaneous desired motion to have improved dynamic accuracy relative to a moment component of the instantaneous desired floor reaction force and also to secure good dynamic accuracy relative to a translational force component of an instantaneous desired floor reaction force. Moreover, the posture of the predetermined part is restricted to the sum of the posture obtained by multiplying the posture of a predetermined part in a provisional corrected instantaneous desired motion by the weight w1 and the posture obtained by multiplying the posture of the predetermined part in an instantaneous desired motion generated by the instantaneous gait generating means by the predetermined weight w2, so that changes in the posture are limited (restrained) more than in the provisional corrected instantaneous desired motion by properly setting the weights w1 and w2.

As a result, it is possible to determine a corrected instantaneous desired motion that permits higher dynamic accuracy between the motion and the instantaneous desired floor reaction force than in an instantaneous desired motion generated by the instantaneous gait generating means, while restraining excessive changes in the instantaneous desired posture of the predetermined part at the same time. In this case, the corrected instantaneous desired motion exhibits better dynamic accuracy relative to not only the moment component but also the translational force component of the instantaneous desired floor reaction force, so that a gait composed of a set of a corrected instantaneous desired motion and an instantaneous desired floor reaction force makes it possible to secure good stability of the overall posture of the mobile robot. Moreover, a provisional corrected instantaneous desired motion and a corrected instantaneous desired motion can be determined by geometric arithmetic processing for the placement of the elements without using temporal changes in the placement of the elements of the model (first-order differential values or second-order differential values of positions and postures).

Thus, according to the second invention, a proper correction can be made without using a dynamic model (without using a differential equation or an integral equation representing a relationship between motion and force) so as to achieve both improved dynamic accuracy of an instantaneous desired gait relative to the floor reaction force and minimized changes in the posture of a predetermined part, such as the body, of the mobile robot, thus making it possible to generate a gait that permits stable motions of the mobile robot.

Supplementally, in the second invention, it is not always necessary to actually determine the first placement, the second placement, and the third placement or to actually determine the translational force component of the resultant force of the inertial forces of the elements or a moment component, as long as a corrected instantaneous desired motion is eventually determined, as described above.

In the aforesaid first invention, the predetermined weights w1 and w2 may be set basically to magnitudes within the range of 0 to 1 (e.g., 0.3 and 0.7); however, if the magnitudes are constant, there is a danger in that the horizontal component of a translational inertial force of the overall center-of-gravity of the robot in the aforesaid corrected instantaneous desired motion may not balance out the floor reaction force horizontal component produced by a frictional force between the mobile robot and a floor, depending on the motion mode of the mobile robot or a road surface condition. This applies also to the second invention described above.

Preferably, therefore, in the aforesaid first and second inventions, the magnitudes of the predetermined weights w1 and w2 fall within the range of 0 to 1, and there is provided a means for variably determining at least the predetermined weight w1 on the basis of the condition of a road surface on which the mobile robot is to be operated according to the desired gait and/or on the basis of the motion mode of the mobile robot according to the desired gait (a third invention). And, in this case, the sum of the magnitude of the predetermined weight w1 and the magnitude of the predetermined weight w2 is preferably 1 (a fourth invention).

According to the aforesaid third invention, variably setting the weights w1 and w2 as described above makes it possible to determine a corrected instantaneous desired motion that permits high dynamic accuracy to be secured while restricting the posture of a predetermined part of a mobile robot to a posture suited to a road surface condition or the motion mode of the mobile robot. Further, according to the fourth invention, setting the sum of the magnitude of the weight w1 and the magnitude of the weight w2 to 1 causes the position of a predetermined part in the corrected instantaneous desired motion to take a weighted mean value of the position of the predetermined part in the first provisional corrected instantaneous desired motion and the position of the predetermined part in the second provisional corrected instantaneous desired motion. This makes it possible to determine a corrected instantaneous desired motion while maintaining ideal balance of the dynamic accuracy between a corrected instantaneous desired motion and the moment component of an instantaneous desired floor reaction force and the dynamic accuracy between a corrected instantaneous desired motion and the translational force component of an instantaneous desired floor reaction force.

Further, according to the fourth invention, as with the third invention, it is possible to determine a corrected instantaneous desired motion that allows high dynamic accuracy to be secured while restricting the posture of a predetermined part of a mobile robot to a posture suited to a road surface condition or the motion mode of the mobile robot.

If the mobile robot is, for example, a biped mobile robot, then a motion mode of, for example, walking or running, may be cited as the aforesaid motion mode. Preferably, the road surface condition includes a frictional condition, such as a friction coefficient of a road surface (floor surface).

In the first to the fourth inventions, the predetermined weight w1 may take a mere real number or it may be a weight having a frequency characteristic relative to the posture of the predetermined part multiplied by the same (a fifth invention). The weight w1 having a frequency characteristic means that the gain (spectrum) of the weight w1 relative to each frequency component when the time series of the posture of a predetermined part is expressed in terms of a frequency range changes according to frequencies. Such weight w1 is expressed by a transfer function usually using a complex number and it functions as a filter.

Thus, imparting the frequency characteristic to the weight w1 makes it possible to determine a posture of the predetermined part in a corrected instantaneous desired motion by removing a predetermined frequency component from the posture of the predetermined part in the first provisional corrected instantaneous desired motion in the aforesaid first invention or the posture of the predetermined part in the provisional corrected instantaneous desired motion in the second invention. In this case, when the frequency characteristic of the weight w1 is set to, for example, a low-cut characteristic (the characteristic for cutting off low-frequency components), if a steady offset (error component) attributable to an error or the like of the model takes place in the posture of the predetermined part in the aforesaid first provisional corrected instantaneous desired motion (the first invention and its dependent third and fourth inventions) or the aforesaid provisional corrected instantaneous desired motion (the second invention and its dependent third and fourth inventions), then the steady offset can be eliminated. When the frequency characteristic of the weight w1 is set to, for example, a high-cut characteristic (the characteristic for cutting off high-frequency components), then if fine vibrations take place in the posture of the predetermined part in the aforesaid first provisional corrected instantaneous desired motion (the first invention and its dependent third and fourth inventions) or the aforesaid provisional corrected instantaneous desired motion (the second invention and its dependent third and fourth inventions), then the fine vibrations can be eliminated.

In the first to the fifth inventions described above, in the aforesaid moment component, the component originated from the difference in placement (the difference in posture) of an element (rigid body) having inertia of the model will correspond to the product of the difference in posture of the element (the difference in inclination angle) and the value of the inertia of the element. Further, the component originated from the difference in placement (difference in position) of an element having a mass of the model will correspond to a value obtained by multiplying the product (outer product) of vectors expressing the difference in position and the distance of the element from the predetermined point, respectively, by the mass of the element. In this case, a component originated from the difference in placement (difference in position) of the element having a mass will be based on the angle formed by a segment that connects one of two positions related to the difference in position and the predetermined point and a segment that connects the other of the two positions and the predetermined point (more specifically, it monotonously increases or decreases on the basis of the angle).

Therefore, according to a sixth invention of the present invention, in the first to the fifth inventions described above, in the moment component related to the difference in placement of the elements between the second placement and the first placement, the component originated from the difference between position A in the first placement and position B in the second placement of the elements of the model having masses is calculated from an angle formed by a segment connecting the predetermined point and the position A and a segment connecting the predetermined point and the position B by using a substantially monotonous function related to the angle, and in the moment component related to the difference in placement of the elements between the third placement and the first placement, the component originated from the difference between position A in the first placement and position C in the third placement of the elements of the model having masses is calculated using the monotonous function from the angle formed by the segment connecting the predetermined point and the position A and the segment connecting the predetermined point and the position C.

This arrangement obviates the need for vector computation when calculating the moment component, thus facilitating the calculation.

In the first to the sixth inventions described above, preferably, the instantaneous desired motion generated by the instantaneous gait generating means is determined using a dynamic model that represents the relationship between motions of the mobile robot and floor reaction forces and is constructed on the assumption that the inertial force generated by a specific motion component of at least one or more specific parts of the mobile robot is substantially zero, and the model includes an element corresponding to at least one part of the specific parts (a seventh invention).

In other words, when the instantaneous desired motion is determined using a dynamic model constructed on the assumption that the inertial force produced by a specific motion component (a translational motion, a rotational motion or the like in a certain direction) of one or more specific parts of the mobile robot is substantially zero, if the specific part or parts generate a desired gait that produces a relatively large inertial force, then the dynamic accuracy between an instantaneous desired motion and an instantaneous desired floor reaction force generated by the instantaneous gait generating means tends to deteriorate. In this case, according to the seventh invention, an element corresponding to at least one part out of the specific parts is included in the model, thus making it possible to securely enhance the dynamic accuracy between the corrected instantaneous desired motion and an instantaneous desired floor reaction force.

Further, in the first to the sixth inventions, preferably, an instantaneous desired motion generated by the instantaneous gait generating means is determined such that it satisfies a desired floor reaction force or a desired ZMP on a predetermined dynamic model representing a relationship between a motion of the mobile robot and a floor reaction force, and the first and the second geometric restrictive conditions are set such that a value obtained by adding a predetermined steady offset to the difference between a floor reaction force balancing out a resultant force of the inertial forces of the elements that are generated due to temporal changes in the placement of the elements of the model determined according to the first geometric restrictive condition from the instantaneous desired motion and a floor reaction force balancing out a resultant force of the inertial forces of the elements that are generated due to temporal changes in the placement of the elements of the model determined according to the second geometric restrictive condition from the instantaneous desired motion substantially agrees with an error of a floor reaction force produced in the dynamic model by the instantaneous desired motion (an eighth invention).

According to the eighth invention, the dynamic error between an instantaneous desired motion and an instantaneous desired floor reaction force generated by the instantaneous gait generating means will correspond to the difference between the placement of the elements of the model determined according to the first geometric restrictive condition and the placement of the elements of the model determined according to the second geometric restrictive condition from the instantaneous desired motion (the difference in the positions of mass points of the model or the difference in the postures of rigid bodies of the model). Thus, determining the first provisional corrected instantaneous desired motion and the second provisional corrected instantaneous desired motion according to the first invention as described above, and further determining a corrected instantaneous desired motion from the provisional corrected instantaneous desired motions make it possible to properly determine a corrected instantaneous desired motion that leads to higher dynamic accuracy relative to the instantaneous desired floor reaction force generated by the instantaneous gait generating means than in an instantaneous desired motion generated by the instantaneous gait generating means and also make it possible to restrain changes in the posture of the predetermined part. Similarly, determining the provisional corrected instantaneous desired motion according to the second invention as described above and further determining a corrected instantaneous desired motion having the same posture as the posture of the predetermined part in the provisional corrected instantaneous desired motion make it possible to properly determine a corrected instantaneous desired motion that leads to higher dynamic accuracy relative to the instantaneous desired floor reaction force generated by the instantaneous gait generating means than in an instantaneous desired motion generated by the instantaneous gait generating means and also make it possible to restrain changes in the posture of the predetermined part.

Further, in the first to the sixth inventions, an instantaneous desired motion generated by the instantaneous gait generating means may be determined to satisfy a desired floor reaction force or a desired ZMP on a predetermined dynamic model representing a relationship between a motion of the mobile robot and a floor reaction force, and the first and the second geometric restrictive conditions may be set such that a value obtained by multiplying the difference between the overall center-of-gravity of the placement of the elements of the model determined according to the first geometric restrictive condition from the instantaneous desired motion and the overall center-of-gravity of the placement of the elements of the model determined according to the second geometric restrictive condition from the instantaneous desired motion by the total mass of the elements substantially agrees with a value obtained by multiplying an error of the overall center-of-gravity of the dynamic model in the instantaneous desired motion by a total mass of the dynamic model (a ninth invention).

This arrangement makes it possible to cancel out the influences of a positional error of an overall center-of-gravity of the dynamic model, which is one of factors causing deterioration in the dynamic accuracy between the first provisional corrected instantaneous desired motion and the instantaneous desired floor reaction force and the dynamic accuracy between the second provisional corrected instantaneous desired motion and the instantaneous desired floor reaction force according to the aforesaid first invention. Similarly, it is possible to cancel out the influences of a positional error of an overall center-of-gravity of the dynamic model on the dynamic accuracy between the provisional corrected instantaneous desired motion and the instantaneous desired floor reaction force and the dynamic accuracy between the corrected instantaneous desired motion and the instantaneous desired floor reaction force according to the aforesaid second invention. As a result, the dynamic accuracy between the corrected instantaneous desired motion and the instantaneous desired floor reaction force according to the first or the second invention can be successfully improved.

It is needless to say that two or more of the seventh to the ninth inventions described above may be combined.

Further, in the first to the ninth inventions, if the mobile robot is a robot equipped with a plurality of legs or a plurality of arms extended from its body as a plurality of movable members, then the first geometric restrictive condition preferably includes a condition in which one of the elements of the model exists on a straight line parallel to a segment connecting a predetermined point in the vicinity of a distal portion of each movable member and a predetermined point in the vicinity of the portion of the movable member that is connected to the body (a tenth invention). Alternatively, the first geometric restrictive condition preferably includes a condition in which the body and the movable members on the model are retained in a predetermined constant posture state (an eleventh invention). And, in the eleventh invention, the predetermined constant posture is preferably the posture in which the body and the plurality of movable members of the mobile robot are oriented substantially in the vertical direction (a twelfth invention).

Further, in the first to the twelfth inventions, the second geometric restrictive condition is preferably set such that the placement of the elements of the model determined according to the condition from an arbitrary instantaneous desired motion of the mobile robot substantially coincides with the placement of parts corresponding to the elements in the robot following the instantaneous desired motion (a thirteenth invention).

Defining the first and the second geometric restrictive conditions as described above makes it possible to ideally match the difference between the placement of the elements of the model determined according to the first geometric restrictive condition from the instantaneous desired motion and the placement of the elements of the model determined according to the second geometric restrictive condition from the instantaneous desired motion to the dynamic error between the instantaneous desired motion and the instantaneous desired floor reaction force generated by the instantaneous gait generating means.

Further, in the first to the sixth inventions, if the mobile robot is equipped with a plurality of legs or a plurality of arms extended from the body as a plurality of movable members and also has flexible joints at middle portions between the portions of the movable members that connect to the body and the distal portions of the movable members, and further, if an instantaneous desired motion generated by the instantaneous gait generating means is determined using a dynamic model that represents a relationship between motions of the robot and floor reaction forces and that is constructed on the assumption that the inertial forces produced at or near the middle portions of the movable members due to bending motions of the movable members are substantially zero, then the model is preferably a model that contains, as an element, a mass point associated with at least the middle portion or a portion near the middle portion of each movable member (a fourteenth invention).

More specifically, if the aforesaid instantaneous desired motion is determined using a dynamic model constructed, assuming that the inertial force generated at or near the middle portion of each movable member due to a bending motion of the movable member is substantially zero (in other words, the inertial force being ignored), then the dynamic accuracy between the instantaneous desired motion and an instantaneous desired floor reaction force generated by the instantaneous gait generating means tends to deteriorate when a desired gait whereby the bending motion of each movable member is performed relatively quickly is generated. Therefore, as with the fifteenth invention, including a mass point associated with the middle portion or the portion close thereto of each movable member in the model makes it possible to determine the first and the second provisional corrected instantaneous desired motions according to the aforesaid first invention or the provisional corrected instantaneous desired motion and the corrected instantaneous desired motion according to the aforesaid second invention as explained in relation to the first or the second invention such that the influence of the inertial force produced by the bending motion of the movable member resulting from the bending operation of the joint of the middle portion of the movable member is compensated for when determining those instantaneous desired motions. This arrangement makes it possible to improve the dynamic accuracy between those determined instantaneous desired motions and the instantaneous desired floor reaction forces determined by the instantaneous gait generating means. As a result, an instantaneous gait constructed of a corrected instantaneous desired motion according to the aforesaid first or second invention and the aforesaid instantaneous desired floor reaction force makes it possible to provide higher dynamic accuracy than an instantaneous gait generated by the instantaneous gait generating means, while restraining changes in the posture of the aforesaid predetermined part at the same time.

In the fourteenth invention, the aforesaid first geometric restrictive condition may be set in the same manner as that in, for example, the tenth invention or the eleventh invention, and the second geometric restrictive condition may be set as with the thirteenth invention. And, it is preferred to set especially the first and the second geometric restrictive conditions as with the tenth invention and the thirteenth invention, respectively.

More specifically, it is preferred that the first geometric restrictive condition includes a condition in which a mass point associated with the middle portion or the portion close thereto of each movable member of the elements of the model exists on the segment that connects a predetermined point in the vicinity of the distal portion of the movable member and a predetermined point in the vicinity of the portion of the movable member that links with the body, and the second geometric restrictive condition is set such that the placement of the elements of the model determined according to the condition from an arbitrary instantaneous desired motion of the mobile robot substantially coincides with the placement of parts corresponding to the elements in the robot following the instantaneous desired motion (a fifteenth invention).

With this arrangement, when the placement of the elements of the model is determined according to the second geometric restrictive condition from an instantaneous desired motion generated by the instantaneous gait generating means, the positional difference between the mass point of the model that is associated with the middle portion or a portion close thereto of each movable member in the placement (hereinafter referred to as "the movable member middle mass point") and the movable member middle mass point (this existing on the aforesaid segment) in the first placement will correspond to an inertial force attributable to the bending motion of the joint of the middle portion of each movable member. And, this inertial force will correspond to the error component of an instantaneous desired floor reaction force generated by the instantaneous gait generating means. Hence, determining the first and the second provisional corrected instantaneous desired motions according to the aforesaid first invention or the provisional corrected instantaneous desired motion and the corrected instantaneous desired motion according to the aforesaid second invention as explained in relation to the first or the second invention makes it possible to compensate for the influence of the inertial force produced by the bending motion of the movable member resulting from the bending operation of the joint of the middle portion of the movable member, thereby permitting improved dynamic accuracy between those instantaneous desired motions and instantaneous desired floor reaction forces. Consequently, changes in the posture of the aforesaid predetermined part can be restrained, while effectively enhancing the dynamic accuracy between corrected instantaneous desired motions and instantaneous desired floor reaction forces according to the first invention or the second invention.

BEST MODE FOR CARRYING OUT THE INVENTION

The following will explain embodiments of the present invention with reference to the accompanying drawings. In the embodiments in the present description, for mobile robots, bipedal mobile robots will be used as examples.

FIG. 1 is a schematic diagram showing the outline of the entire construction of a bipedal mobile robot to which an embodiment of the present invention will be applied.

As shown in the figure, a bipedal mobile robot (hereinafter referred to as "the robot") 1 is equipped with a pair of right and left legs 2, 2 extended downward from a body (a base body of the robot 1) 3. The body 3 corresponds to "the predetermined part" in the present invention. The two legs 2, 2 share the same construction, each having six joints. The six joints of each leg are comprised of, in the following order from the body 3 side, joints 10R, 10L for swinging (rotating) a hip (waist) (for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction. In the present description, the symbols R and L mean that they correspond to the right side and the left side, respectively, of the robot 1.

A foot (foot portion) 22R (L) constituting a distal portion of each leg 2 is attached to the bottoms of the two joints 18R (L) and 20R (L) of the ankle of each leg 2. The body 3 is installed at the uppermost top of the two legs 2, 2 through the intermediary of the three joints 10R (L), 12R (L) and 14R (L) of the hip of each leg 2. A control unit 60 or the like, which will be discussed in detail hereinafter, is housed in the body 3. For convenience of illustration, the control unit 60 is shown outside the body 3 in FIG. 1.

In each leg 2 having the aforesaid construction, a hip joint (or a waist joint) is formed of the joints 10R (L), 12R (L) and 14R (L), the knee joint is formed of the joint 16R (L), and the ankle joint is formed of the joints 18R (L) and 20R (L). The hip joint and the knee joint are connected by a thigh link 24R (L), and the knee joint and the ankle joint are connected by a crus link 26R (L).

In the present description, a "link" of the robot 1 is used to mean a part that can be regarded as a rigid body of the robot 1. For example, the body 3 is also one link (rigid body), and in this sense, the body 3 may be referred to as a body link.

A pair of right and left arms 5, 5 is attached to both sides of an upper portion of the body 3, and a head 4 is disposed at a top end of the body 3. Each arm 5 is provided with a shoulder joint composed of three joints 30R (L), 32R (L), and 34R (L), an elbow joint composed of a joint 36 R(L), a wrist joint composed of a joint 38R (L), and a hand 40R (L) connected to the wrist joint. The shoulder joint and the elbow joint, and the elbow joint and the wrist joint are connected, respectively, by links.

The construction of the robot 1 described above imparts six degrees of freedom to the foot 22R (L) of each leg 2 relative to the body 3. During a travel, such as walking, of the robot 1, desired motions of the two feet 22R and 22L can be accomplished by driving 6*2=12 joints of the two legs 2, 2 together ("*" in the present description denotes multiplication as scalar calculation, while it denotes an outer product in vector calculation) at appropriate angles. This arrangement enables the robot 1 to arbitrarily move in a three-dimensional space. Furthermore, each arm 5 can perform a motion, such as arm swinging, by rotating the shoulder joint, the elbow joint, and the wrist joint thereof.

As shown in FIG. 1, a publicly known six-axis force sensor 50 is provided under the ankle joints 18R (L), 20R (L) and between the ankle joints and the foot 22R (L) of each leg 2. The six-axis force sensor 50 detects primarily whether the foot 22R (L) of each leg 2 is in contact with the ground and a floor reaction force (landing load) acting on each leg 2, and it outputs detection signals of three-direction components Fx, Fy and Fz of a translational force of the floor reaction force and three-direction components Mx, My and Mz of a moment to the control unit 60. Furthermore, the body 3 is equipped with a posture sensor 54 for detecting an inclination angle of the body 3 relative to a Z-axis (vertical direction (gravitational direction)) and an angular velocity thereof, detection signals thereof being output from the posture sensor 54 to the control unit 60. The posture sensor 54 is provided with an accelerometer and a gyro sensor, which are not shown, and the detection signals of these sensors are used to detect inclination angles of the body 3 and angular velocities thereof. Although detailed structures are not shown, each joint of the robot 1 is provided with an electric motor 64 (refer to FIG. 3) for driving the joint, and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) for manipulating the robot 1 is provided on the exterior of the robot 1. The joystick 73 is constructed in such a manner that a request or restriction to a gait of the robot 1, such as turning the robot 1 that is traveling straight, specifying the moving direction of the robot 1, or specifying an operation mode that specifies the motion mode of the robot 1, such as walking or running, or the frictional condition of a floor surface (road surface condition), is input to the control unit 60 as necessary by operating the joystick 73. Communication between the joystick 73 and the control unit 60 is effected by wire or wireless means.

FIG. 2 schematically shows the basic construction of the distal portion (including each foot 22R(L)) of each leg 2 in the present embodiment. As shown in the figure, a spring mechanism 70 is installed between each foot 22R (L) and the six-axis force sensor 50, and a foot sole elastic member 71 made of rubber or the like is bonded to a foot sole (the bottom surface of each foot 22R,L). These spring mechanism 70 and the foot sole elastic member 71 constitute a compliance mechanism 72. Although no detailed illustration is given, the spring mechanism 70 is constructed of a square guide member (not shown), which is installed on the upper surface of the foot 22R (L), and a piston-shaped member (not shown) installed adjacently to the ankle joint 18R (L) (the ankle joint 20R (L) being omitted in FIG. 2) and the six-axis force sensor 50, and it is housed in the guide member through the intermediary of an elastic member (rubber or spring) so that it may be moved extremely slightly.

The foot 22R (L) indicated by a solid line in FIG. 2 is in a state wherein it is being subjected to no floor reaction force. When each leg 2 is subjected to a floor reaction force, the spring mechanism 70 and the foot sole elastic member 71 of the compliance mechanism 72 flex, causing the foot 22R (L) to shift to the position/posture illustrated by a dashed line in the figure. The structure of the compliance mechanism 72 is important not only to ease a landing impact but also to enhance controllability. The details thereof have been explained in, for example, Japanese Unexamined Patent Publication Application No. 5-305584 previously proposed by the present applicant, so that no further explanation in the present description will be given.

FIG. 3 is a block diagram showing a construction of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg 2, the posture sensor 54 (an accelerometer and a rate gyro sensor), the joystick 73, etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates desired gaits, calculates a joint angle displacement command (a command value of a displacement angle of each joint or a rotational angle of each electric motor 64), and sends the calculation result to the RAM 84. The second calculator 92 reads the joint angle displacement command and an actual measurement value of a joint angle detected on the basis of an output signal of the encoder 65 from the RAM 84 to calculate a manipulated variable required for driving each joint. And, the calculated variable is output to the electric motor 64 for driving each joint through the intermediary of the D/A converter 96 and a servo amplifier 64a.

FIG. 4 is a block diagram showing major functional construction of the control unit 60 of the robot 1 in an embodiment in the present description. A portion except for the "actual robot" in FIG. 4 is constituted of processing functions implemented by the control unit 60 (primarily the functions of the first calculator 90 and the second calculator 92). The processing function is implemented by programs or the like installed in the control unit 60. In the following explanation, the symbols R and L will be omitted as long as it is not particularly necessary to discriminate right and left of each part of the robot 1 (the legs 2, the arms 5, etc.).

An explanation will now be given. The control unit 60 is equipped with a gait generating device 100 that generates and outputs desired gaits freely in real time, as it will be discussed later. The gait generating device 100 implements an embodiment of the present invention by its functions. A desired gait output by the gait generating device 100 is constituted of a corrected desired body posture trajectory (a trajectory of desired postures of the body 3), a corrected desired body position trajectory (a trajectory of desired positions of the body 3), a desired foot position/posture trajectory (a trajectory of desired positions and desired postures of each foot 22), a desired arm posture trajectory (a trajectory of desired postures of each arm), a desired ZMP (desired total floor reaction force central point) trajectory, a trajectory of corrected desired floor reaction force moments about a desired ZMP, and a desired total floor reaction force trajectory. If a part (a head or the like) that can be moved relative to the body 3 is provided in addition to the legs 2 and the arms 5, then a desired position/posture trajectory of the movable part is added to a desired gait.

Here, the definitions or the like of basic terms related to gaits in the present description will be explained. The term "trajectory" in a gait means a temporal change pattern (time series pattern), and may be referred to as "pattern" in place of "trajectory." Furthermore, a "posture" means a spatial orientation. For example, a posture of the body is represented by an inclination angle (posture angle) of the body 3 in the roll direction (about the X-axis) relative to the Z-axis (vertical axis) and an inclination angle (posture angle) of the body 3 in the pitch direction (about the Y-axis), and a foot posture is represented by means of a two-axis spatial azimuth fixedly set on each foot 22. In the present description, a body posture may be referred to as a body posture angle. A desired arm posture related to the arms 5 is represented by means of a relative posture with respect to the body 3 in the embodiments of the present description.

The position of the body means the position of a predetermined representative point of the body 3 (a certain fixed point on a local coordinate system arbitrarily and fixedly set relative to the body 3). Similarly, the position of a foot means the position of a predetermined representative point of each foot 22 (a fixed point on a local coordinate system arbitrarily and fixedly set relative to each foot 22). For example, the representative point of each foot 22 is set on the bottom surface of each foot 22 (more specifically, for example, a point at which a perpendicular line from the center of the ankle joint of each leg 2 to the bottom surface of each foot 22 intersects with the bottom surface).

The aforesaid corrected desired body posture and corrected desired body position related to the body 3 are obtained by correcting certain basic desired body posture (provisional desired body posture) and desired body position (provisional desired body position). In the embodiments of the present description, displacement dimension corrected body position/posture, which will be discussed hereinafter, correspond to the basic desired body position/posture.

In the explanation hereinafter, the term "desired" will be frequently omitted if there is no danger of misunderstanding.

In a gait, the constituent elements except for those related to a floor reaction force, namely, the constituent elements related to the position/posture of each part of the robot 1, such as foot position/posture and body position/posture, are referred generically to "motions." Further, a floor reaction force acting on each foot 22 (a floor reaction force composed of a translational force and a moment) is referred to as "the floor reaction force of each foot," and the resultant force of "the floor reaction forces of individual feet" related to all (two) feet 22R and 22L of the robot 1 is referred to "the total floor reaction force." However, in the following explanation, the floor reaction force of each foot will be hardly referred to, so that "the floor reaction force" will be handled as synonymous with "the total floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment component about a vertical axis (Z-axis)) will be zero. In other words, a horizontal component (the moment about horizontal axes (X-axis and Y-axis)) of the moment of the desired floor reaction force about the desired floor reaction force central point will be zero.

In a gait that satisfies a dynamic balance condition, the ZMP calculated from a desired motion trajectory of the robot 1 (the point at which a moment excluding its vertical component becomes zero, the moment acting about the point due to the resultant force of the inertial force calculated from the desired motion trajectory and the gravity) coincides with the desired floor reaction force central point. This is, therefore, equivalent to providing a desired ZMP trajectory in place of a desired floor reaction force central point trajectory.

Here, when walking of the robot 1 is performed, the vertical component of a translational floor reaction force is subordinately determined as the vertical position of the body 3 (body height) of the robot 1 is determined by the technique for determining a body height previously proposed in, for example, Japanese Unexamined Patent Application Publication No. 10-86080 by the present applicant. Furthermore, the horizontal component of the translational floor reaction force is also subordinately determined as the body horizontal position trajectory (or the positional trajectory of the overall center-of-gravity) of the robot 1 is determined such that the horizontal component of the moment generated about a desired ZMP by the resultant force of an inertial force attributable to a motion of a desired gait and gravity becomes zero. For this reason, when performing the walking of the robot 1, only the desired ZMP may be set as the physical amount to be explicitly set in relation to the floor reaction force of the desired gait.

Meanwhile, if a travel of the robot 1, e.g., running of the robot 1, is performed with a gait that includes a period during which the floor reaction force becomes zero or substantially zero, then a translational floor reaction force vertical component is also important in controlling the operation of the robot 1. Hence, it is preferred to explicitly set the desired trajectory of the translational floor reaction force vertical component and then to determine the trajectory of a desired body vertical position or the like of the robot 1. Also, when the walking of the robot 1 is performed, if the robot 1 is to travel on a floor surface with a low friction coefficient (on a low-μ road), it is preferred to explicitly set the desired trajectory of the translational floor reaction force vertical component to prevent slippage or the like of the robot 1, because the translational floor reaction force vertical component (to be more strict, the component of the translational floor reaction force that is perpendicular to the floor surface) influences a frictional force. Furthermore, according to the embodiments of the present invention, in a desired gait finally output by the gait generating device 100, a corrected desired floor reaction force moment (a moment whose horizontal component is not necessarily zero) is generated about a desired ZMP.

Thus, in the embodiments of the present description, the constituent elements related to the floor reaction forces of desired gaits output from the gait generating device 100 include a corrected desired floor reaction force moment about a desired ZMP and a desired translational floor reaction force vertical component in addition to a desired ZMP trajectory.

And, in the present description, a desired gait output by the gait generating device 100 is used to mean "a set of a desired motion trajectory and a desired floor reaction force trajectory in the period of one step or a plurality of steps" in a broad sense, and to mean "a set of a desired motion trajectory and a desired floor reaction force trajectory that includes a desired ZMP, a corrected desired floor reaction force moment and a desired translational floor reaction force vertical component in the period of one step" in a narrow sense.

However, according to the embodiments of the present description, in a desired gait (provisional desired gait) prepared in the process before a final desired gait (a desired gait output from the gait generating device 100) is determined, the horizontal component of a desired floor reaction force moment about a desired ZMP is set to zero as defined by an original desired ZMP. Accordingly, in a provisional desired gait (a simplified model gait, a first provisional corrected gait, a second provisional corrected gait, or a displacement dimension corrected gait, which will be discussed hereinafter) other than a desired gait that is finally determined, a gait obtained by removing a corrected desired floor reaction force moment from the desired gait in the aforesaid narrow sense is used as the one meant to be a desired gait. Supplementally, according to the embodiments in the present description, a desired gait (a provisional desired gait) prepared in the process before a final desired gait (a desired gait output by the gait generating device 100) is determined is closely associated with the present invention. Hence, the majority of a desired gait appearing in the following explanation will be used to mean a gait (a gait that satisfies a desired ZMP) obtained by removing a corrected desired floor reaction force moment from a desired gait in the narrow sense.

In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component."

"One step" of a desired gait will be used to mean a period from the moment one leg 2 of the robot 1 lands to the moment the other leg 2 lands.

A double stance period in a gait refers to a period during which the robot 1 supports its own weight by the two legs 2, 2, a single stance period refers to a period during which the robot 1 supports its own weight only by one leg 2, and a floating period refers to a period during which both legs 2, 2 are apart from a floor (floating in the air). In the single stance period, the leg 2 not supporting the self-weight of the robot 1 is referred to as a free leg. A running gait of the robot 1, in which the single stance period and the floating stance period are alternately repeated, does not have the double stance period. In this case, during the floating period, both legs 2, 2 do not support the self-weight of the robot 1; however, for the sake of convenience, the leg 2 that was a free leg and the leg 2 that was a supporting leg during a single stance period immediately before the floating period will be referred to as a free leg and a supporting leg, respectively, even in the floating period.

The trajectory of a desired gait is described using a global coordinate system (a coordinate system fixed to a floor). As a global coordinate system, a supporting leg coordinate system defined, for example, on the basis of landing position/posture of the supporting leg foot 22 is used. This supporting leg coordinate system is, for example, a coordinate system in which the point at which a perpendicular line extended to a floor surface from the center of the ankle joint to which the foot 22 is connected intersects with the floor, while substantially the entire bottom surface of the supporting leg foot 22 is in contact with the floor, is defined as the origin, and when the supporting leg foot 22 is projected onto a horizontal plane that passes the origin, the longitudinal direction of the foot 22 is defined as the X-axis direction and the lateral direction is defined as the Y-axis (the Z-axis direction being the vertical direction).

FIG. 5 is a block diagram showing the details of the gait generating device 100. Referring to this FIG. 5, more specific overview of the processing of the gait generating device 100 will be explained below.

As illustrated, the gait generating device 100 is equipped with a gait parameter determiner 100a. The gait parameter determiner 100a determines the values of gait parameters that define a desired gait or a time series table.

According to the embodiments of the present description, gait parameters determined by the gait parameter determiner 100a include the parameters that define a desired foot position/posture trajectory, a desired arm posture trajectory, a desired ZMP trajectory, and a desired floor reaction force vertical component trajectory, respectively, of a desired gait.

When the gait generating device 100 generates a desired gait, estimated landing position/posture and estimated landing time of the free leg foot 22, or basic required values (required parameters) for generating a gait, such as the length of a step and moving speed, are supplied to the gait generating device 100 from the joystick 73 or an action planner (a device for preparing action plans of the robot 1), which is not shown. Alternatively, the gait generating device 100 reads the required parameters from a storage medium in which the required parameters have been stored beforehand and retained. Then, the gait parameter determiner 100a of the gait generating device 100 determines gait parameters on the basis of the required parameters.

In the embodiments of the present description, the gait parameters determined by the gait parameter determiner 100a also include parameters that define a reference body posture trajectory, a ZMP permissible range, and a floor reaction force horizontal component permissible range, respectively.

Although the reference body posture trajectory is not the one finally output from the gait generating device 100, it is referred to when determining a desired gait. The reference body posture trajectory is supplied in relation to the body posture of the robot 1 from the joystick 73 or the action planner, or it is a body posture trajectory generated directly on the basis of a requirement (a requirement for retaining a body posture at a vertical posture, or the like) that has been set in advance. A desired body posture (hereinafter, "body posture" with no "reference" attached thereto will indicate a desired body posture) is generated such that it follows or coincides with a reference body posture for a long time.

To add a supplemental explanation regarding the ZMP permissible range, in the embodiments of the present description, a desired gait is corrected so as to generate a corrected desired floor reaction force moment (this being generally not zero) about a desired ZMP. Therefore, the desired ZMP will be a point having a different definition from an original definition (the definition in that it is a point with zero floor reaction force moment horizontal component), and a ZMP that satisfies the original definition (hereinafter referred to as true ZMP) moves to a position shifted from the desired ZMP by a value obtained by dividing the corrected desired floor reaction force moment by a desired floor reaction force vertical component.

The true ZMP of a corrected gait (the desired gait finally output from the gait generating device 100) must fall within a range wherein at least ZMP can exist (a so-called supporting polygon. A range wherein a floor reaction force acting point (ZMP) can exist when it is assumed that no adhesive force acts between a floor and the bottom surface of the foot 22). Further, in order to secure a sufficient stability allowance of the robot 1, the true ZMP of a corrected gait preferably falls within a range near the center in the range wherein the ZMP can exist. Hence, in the embodiments of the present description, a permissible range wherein a true ZMP of a corrected gait can exist is set. This range is called a ZMP permissible range. The ZMP permissible range is set to coincide with a range wherein a ZMP can exist or to be included in a range wherein a ZMP can exist.

As described above, the value obtained by dividing a corrected desired floor reaction force moment about a desired ZMP by a desired floor reaction force vertical component indicates the amount of positional deviation of a true ZMP from the desired ZMP; therefore, the amount of positional deviation of the true ZMP from the desired ZMP (a ZMP-converted value of a corrected desired floor reaction force moment) may be set instead of setting the corrected desired floor reaction force moment about the desired ZMP. Moreover, a ZMP permissible range can be converted into a permissible range of a corrected desired floor reaction force moment by using the position of its boundary and a desired floor reaction force vertical component, and the permissible range of the corrected desired floor reaction force moment may be set in place of a ZMP permissible range.

The floor reaction force horizontal component permissible range is the permissible range of a floor reaction force horizontal component that makes it possible to generate a frictional force having a magnitude that prevents the foot 22 from slipping between the floor surface and the foot 22 of the robot 1 that is in contact with a floor. According to the embodiments of the present description, at least a motion of a desired gait (a desired motion) finally output from the gait generating device 100 is generated such that a floor reaction force horizontal component balancing out the horizontal component of an inertial force of the robot 1 that is produced thereby falls within a floor reaction force horizontal component permissible range.

The gait parameters determined by the gait parameter determiner 100a are input to a desired instantaneous value generator 10b. The desired instantaneous value generator 100b sequentially calculates (generates) instantaneous values (values at every predetermined control processing cycle of the control unit 60) of some constituent elements of a desired gait, such as a reference body posture, a desired foot position/posture, a desired ZMP, and a desired floor reaction force vertical component, on the basis of the input gait parameters. FIG. 5 shows only some desired instantaneous values as typical ones.

The desired instantaneous values calculated by the desired instantaneous value generator 100b are input to a simplified model gait generator 100c. Based on the input desired instantaneous values, the simplified model gait generator 100c calculates the instantaneous value of a desired body position/posture (provisional desired body position/posture), using a dynamic model, which approximately expresses the relationship between motions of the robot 1 and floor reaction forces and which will be discussed later (hereinafter referred to as a simplified model). The simplified model gait generator 100c calculates the instantaneous values of desired body position/posture such that a dynamic balance condition on the simplified model is satisfied, that is, the horizontal component of a moment generated about a desired ZMP by the resultant force of the inertial force produced by a desired motion of the robot 1 and the gravity acting on the robot 1 on the simplified model becomes zero. Supplementally, according to the embodiments in the present description, a desired floor reaction force vertical component trajectory is also explicitly set, so that the instantaneous value of a desired body position/posture is determined such that the horizontal component of the moment generated about a desired ZMP by the resultant force of the inertial force produced due to a desired motion and the gravity acting on the robot 1 becomes zero and also that the translational force vertical component of the resultant force (in other words, the resultant force of the inertial force due to the translational motion in the vertical direction of the overall center-of-gravity of the robot 1 and the gravity) balances out the desired floor reaction force vertical component.

Thus, instantaneous values of a desired gait (provisional desired gait) including desired body position/posture are sequentially determined. Hereinafter, a desired gait having the desired body position/posture determined by the simplified model gait generator 100c as its constituent element will be referred to as a simplified model gait. The desired instantaneous values input to the simplified model gait generator 10c do not have to be all desired instantaneous values calculated by the desired instantaneous value generator 100b. The inputs necessary for the simplified model gait generator 100c depend on the structure of a simplified model or the restrictive conditions added thereto, as necessary. For instance, in FIG. 5, desired foot position/posture are supplied to the simplified model gait generator 100c, whereas it is unnecessary to supply desired foot position/posture in the simplified model in a first embodiment, which will be discussed later.

The simplified model gait generator 100c and the desired instantaneous value generator 100b together constitute the instantaneous gait generating means in the present invention.

The desired body position/posture calculated by the simplified model gait generator 100c are input to a displacement dimension gait corrector 100d. The displacement dimension gait corrector 100d receives the instantaneous values of desired foot position/posture and the instantaneous value of a desired ZMP in addition to the desired body position/posture. However, supplying a desired ZMP to the displacement dimension gait corrector 100d is not essential, and more generally, a central point related to an angular momentum product, which will be discussed later, is supplied thereto. In FIG. 5, as an example of the central point, a desired ZMP is supplied to the displacement dimension gait corrector 100d.

Based on the supplied instantaneous values of the desired body position/posture or the like, and by using first and second displacement dimension correcting models to be discussed later, the displacement dimension gait corrector 100d determines the instantaneous values of the displacement dimension corrected body position/posture obtained by correcting the desired body position/posture determined by the simplified model gait generator 100c. Although details will be described later, the first and the second displacement dimension correcting models are usually formed of models (geometric models) constructed of at least either mass points or links having inertia as elements, and the placement of the elements (the positions of the mass points and the postures of the links) is associated with the position and posture of one or more parts in an instantaneous motion of the robot 1. In this case, these first and second displacement dimension correcting models are both constructed of the same elements. However, in these first and second displacement dimension correcting models, geometric restrictive conditions that are different from each other are established on the placement of the elements thereof, and when an arbitrary instantaneous desired motion of the robot 1 (the instantaneous values of the position/posture of each part of the robot 1) is given, the placement of the elements of each displacement dimension correcting model corresponding to thereto is determined on the basis of each separate geometric restrictive condition. Hence, when a certain desired instantaneous motion is given, the placements of the elements of the individual displacement dimension correcting models corresponding thereto are usually different from each other. Based on the difference in the placement of elements between these first and second displacement dimension correcting models (the difference in the positions of mass points or the difference in the posture angles of links), the displacement dimension gait corrector 100d sequentially corrects the desired body position/posture of a simplified model gait to determine the instantaneous values of displacement dimension corrected body position/posture.

Although it is not shown in FIG. 5, the displacement dimension gait corrector 100d also receives an operation mode of the robot 1 that indicates a motion mode of the robot 1 (walking, running or the like of the robot 1) or the frictional condition (the magnitude of the friction coefficient or the like) of a floor surface, which is required in a desired gait, from the joystick 73 or the action planner (not shown) of the robot 1. Then, the displacement dimension gait corrector 100d variably determines the instantaneous values of displacement dimension corrected body position/posture on the basis of the input operation mode. According to the embodiments in the present description, the aforesaid operation mode comes in a running mode in which the robot 1 runs, a low-friction floor surface walking mode in which the robot 1 walks on a floor surface with a relatively small friction coefficient (on a low-μ road), and a normal mode, which is an operation mode besides these modes. The normal mode includes an operation mode in which the robot 1 walks on a floor surface with a relatively high friction coefficient (a common floor surface).

The displacement dimension gait corrector 100d constitutes the first provisional corrected motion determining means, the second provisional corrected motion determining means, and the desired motion correcting means in the first invention, or the provisional corrected motion determining means and the desired motion correcting means in the second invention, depending on its functions.

The instantaneous values of the displacement dimension corrected body position/posture determined by the displacement dimension gait corrector 100d are supplied to a full model corrector 100e. Supplied to the full model corrector 100e are the desired instantaneous values (except for the instantaneous values of reference body positions/postures) calculated by the desired instantaneous value generator 100b in addition to the instantaneous values of displacement dimension corrected body positions/postures. The full model corrector 100e uses a full model as a dynamic model having higher dynamic accuracy than a simplified model to calculate corrected desired body positions/postures obtained by correcting displacement dimension body positions/postures, and it also calculates a corrected desired floor reaction force moment, which is the desired value of a floor reaction force moment horizontal component about a desired ZMP.

More generally, the full model corrector 10e carries out processing of E1 or E2 to satisfy the following conditions D1 to D3. Specifically, the full model corrector 100e:

E1) corrects the body position/posture of the displacement dimension corrected gait, or E2) corrects the body position/posture of the displacement dimension corrected gait and also outputs a corrected desired floor reaction force moment about a desired ZMP (corrects a desired floor reaction force) in order to satisfy the following conditions.

D1) A dynamic balance condition is satisfied with accuracy that is higher than the gait (hereinafter referred to as the displacement dimension corrected gait) obtained by correcting a gait generated using a simplified model (a simplified model gait) by using a displacement dimension correcting model;

D2) A true ZMP (a ZMP satisfying the original definition that has been corrected by generating a corrected desired floor reaction force moment about a desired ZMP) falls within a ZMP permissible range (a permissible range that allows a sufficient stability allowance to be maintained).

D3) A floor reaction force horizontal component falls within a floor reaction force horizontal component permissible range.

In the embodiments of the present description, the processing of E2 is carried out to satisfy the conditions D1 to D3. The processing by the full model corrector 100e in the embodiments of the present description is the same as that explained in detail in, for example, PCT international publication WO/03/057427/A1 previously proposed by the present applicant (specifically, the processing of S038 shown in FIG. 13 of the publication). Hence, detailed explanation of the processing by the full model corrector 10e in the present description will be omitted.

Referring back to FIG. 4, the instantaneous values of a desired gait, including the instantaneous values of corrected desired body position/posture, a corrected desired floor reaction force moment about a desired ZMP, and desired foot position/posture determined as described above are supplied to a composite-compliance control unit 101 (the portion enclosed by the dashed line in FIG. 4). The composite-compliance control unit 101 controls a joint actuator (an electric motor 64) so as to follow the desired gait, while maintaining the balance of the robot 1. More specific processing of the composite-compliance control unit 101 will be discussed later.

The above provides the outline of the gait generating device 100. The outline of the gait generating device 100 explained above will be applied to all embodiments in the present description.

First Embodiment

A first embodiment in accordance with the present invention will now be specifically explained. First, the simplified model (dynamic model), the first displacement dimension correcting model, and the second displacement dimension correcting model in the first embodiment will be explained. Incidentally, the first embodiment is an embodiment according to the first, the third, the fourth, the seventh to the ninth, and the eleventh to the fourteenth inventions mentioned above.

FIG. 6 shows the structure of a simplified model in the first embodiment. As illustrated, the simplified model is a one-mass-point model equipped with one mass point (body mass point) 3m corresponding to a body 3 of a robot 1. The robot 1 shown in FIG. 6 is the robot 1 schematically side-viewed, arms 5, 5 and a head 6 being omitted. In the figures following FIG. 6 (including the drawings of embodiments other than the first embodiment), when illustrating the robot 1, the arms 5, 5 and the head 6 will be omitted, as with FIG. 6, unless it is necessary to discriminate them from the body 3. Further, the X-axis and the Z-axis shown in the following drawings, including FIG. 6, indicate a global coordinate system.

A body mass point 3m of the simplified model shown in FIG. 6 is set at a point uniquely determined on the basis of the position/posture of the body 3, i.e., a certain fixed point on a local coordinate system fixedly set arbitrarily on the body 3 (a point having a predetermined positional relationship with a representative point of the body 3 on the local coordinate system). The mass of the body mass point 3m is set to be identical to a total mass mtotal of the robot 1. The body mass point 3m may coincide with a representative point of the body 3, but it generally does not.

The dynamics of the simplified model is expressed by the dynamics of an inverted pendulum constructed of the body mass point 3m and a variable-length link 3b that supports the same such that it is free to swing, using a desired ZMP as its supporting point. To be more specific, equations of motions that represent the relationship between motions of the robot 1 and floor reaction forces in the simplified model are given by the following expression 01, expression 02, and expression 03. However, for the purpose of easier understanding of the present description, only the equations of motions on a sagittal plane (a plane that contains a longitudinal axis (X-axis) and a vertical axis (Z-axis), i.e., a so-called sagittal plane) will be described here, and equations of motions on a lateral plane (a plane that contains a lateral axis (Y-axis) and a vertical axis (Z-axis), i.e., a so-called frontal plane) will be omitted.

In the present description, $d2X/dt2$ relative to an arbitrary variable X will mean a second-order differential value of the variable X. Further, the variables related to the dynamics of the simplified model of FIG. 6 are defined as follows.

g: Gravitational acceleration; Zb: Vertical position of body mass point; Xb: Horizontal position of body mass point; mtotal: Total mass of the robot 1; Fx: Floor reaction force horizontal component (specifically, the component in the longitudinal direction (X-axis) of a translational floor reaction force); Fz: Floor reaction force vertical component (specifically, the component in the vertical direction (Z-axis) of the translational floor reaction force); My: Floor reaction force moment about a desired ZMP (specifically, the component about a lateral axis (Y-axis) of a floor reaction force moment); Xzmp: Horizontal position of the desired ZMP; and Zzmp: Vertical position of the desired ZMP.

$$Fz = mtotal*(g + d2Zb/dt2) \qquad \text{Expression 01}$$

$$Fx = mb*d2Xb/dt2 \qquad \text{Expression 02}$$

$$My = -mtotal*(Xb - Xzmp)*(g + d2Zb/dt2) + mtotal*(Zb - Zzmp)*(d2Xb/dt2) \qquad \text{Expression 03}$$

In the simplified model described by these expressions 01 to 03, when, for example, a desired ZMP and a desired floor reaction force vertical component are determined, a vertical position Zb of the body mass point 3m can be determined according to expression 01. Moreover, in a dynamically balanced state of the robot 1, My of the left side of expression 03 becomes zero (the horizontal component of a floor reaction force moment about a desired ZMP becomes zero); therefore, a horizontal position Xb of the body mass point 3m can be determined from the vertical position Zb of the body mass point 3m and expression 03.

Since the simplified model of the first embodiment explained above is a one-mass-point model having the mass point 3m only on the body 3, the inertial force generated by a motion of each leg 2 and the inertia (inertial moment) of the body 3 are ignored. In other words, the simplified model of the first embodiment may be said to be a dynamic model constructed on the assumption that the inertial force generated by a motion (translational or posture changing motion) of each leg 2 or a posture changing motion of the body 3 is zero. Supplementally, the simplified models in the embodiments in the present description, including the first embodiment, are constructed on the assumption that the inertial force produced by a specific motion (a translational motion, a posture changing motion or the like) of at least one or more specific parts of the robot 1 is substantially zero (the inertial force being ignored).

The simplified model in the first embodiment has been the one-mass-point model; alternatively, however, it may be, for example, a three-mass-point model having an additional mass point in the vicinity of the foot 22 of each leg 2. Further alternatively, the simplified model may be, for example, a model in which the body 3 has inertia (inertial moment) about the body mass point 3m.

The first displacement dimension correcting model in the first embodiment will now be explained. The diagrams on the right side in FIGS. 7(a), (b) and (c) show the structure of the first displacement dimension correcting model in the first embodiment, while the diagrams on the left side show the entire posture states at which the robot 1 aims (the posture states of simplified model gaits), respectively corresponding to the diagrams on the right side, and the simplified models. The robot 1 shown on the right side in FIGS. 7(a), (b) and (c) is the robot 1 standing upright with both legs 2 and 2 arranged in the lateral direction (the Y-axis direction) observed in a side view (on a sagittal plane). Hence, both legs 2 and 2 overlap with each other in the drawings.

The first displacement dimension correcting model in the first embodiment is a five-mass-point model having one body mass point A1 corresponding to the body 3 of the robot 1, thigh mass points A2 and A3 corresponding to the thigh link portions in the vicinity of the knee joints of the legs 2, and foot mass points A4 and A5 corresponding to the distal portions (feet 22) of the legs 2. The body 3 (body link) in the first displacement dimension correcting model has inertia (inertial moment) Ib about the body mass point A1. More specifically, the first displacement dimension correcting model is constructed of the mass points A1 to A5 and the body link having the inertia Ib as elements. In this case, the mass points A2 to A5 and the body link having the inertia Ib of the first displacement dimension correcting model are the elements that the simplified model shown in FIG. 6 described above does not have, and they produce inertial forces in response to motions of the parts respectively corresponding thereto (a posture changing motion in the case of the body 3).

The body mass point A1 and the foot mass points A4 and A5 of the first displacement dimension correcting model are set at points uniquely defined on the basis of the positions/postures of the parts corresponding thereto (the body 3 and the feet 22), that is, certain fixed points on local coordinate systems fixedly set arbitrarily on corresponding parts (points having predetermined positional relationships with the representative points of the parts on the local coordinate systems of the corresponding parts). However, the position of the body mass point A1 on the local coordinate system of the body 3 is generally different from the body mass point 3m of the simplified model shown in FIG. 6. The thigh mass points A2 and A3 are set at certain fixed points (fixed points in the vicinity of the knee joints) on local coordinate systems fixedly set arbitrarily to the thigh links 24 of the legs 2. The total sum of the masses of the body mass point A1, the foot mass points A4 and A5, and the thigh mass points A2 and A3 agrees with the total mass mtotal of the robot 1. The mass of the body mass point A1 includes the masses of both arms 5 and 5 and the head 4 in addition to the mass of the body 3.

A certain geometric restrictive condition is set on the placement of the elements of the first displacement dimension correcting model. Specifically, in the first displacement dimension correcting model, the posture state of the robot 1 is normally restricted to a posture state (upright posture state) in which the body 3 is in a vertical posture with both legs 2 and 2 arranged side by side in the lateral direction (the Y-axis direction) of the robot 1 with a predetermined interval therebetween (for this reason, the mass points A2 and A4 corresponding to one of the legs 2 overlap the mass points A3 and A5 corresponding to the other leg 2 in the diagrams of the first displacement dimension correcting model on the right side of FIGS. 7(a), (b) and (c)).

Accordingly, the mutual relative positional relationship among the body mass point A1, the foot mass points A4, A5, and the thigh mass points A2, A3 is restricted by a predetermined positional relationship corresponding to the upright posture state of the robot 1. Further, the posture of the body 3, which is the link (rigid body) having inertia in the first displacement dimension correcting model, is restricted to a vertical posture (the posture at which the posture angle relative to the vertical axis is zero).

The positions of the mass points A1 to A5 of the first displacement dimension correcting model on a global coordinate system (a coordinate system fixed to a floor) are determined on the basis of the instantaneous values of a motion of a simplified model gait. More specifically, in the first displacement dimension correcting model of the first embodiment, the positions of the mass points A1 to A5 on a global coordinate system are determined such that the position of the overall center-of-gravity of the mass points A1 to A5 coincides with the position of the overall center-of-gravity of the robot 1 on the simplified model, that is, the position of the body mass point 3$m$ on the simplified model (the position on the global coordinate system). In this case, as previously mentioned, the mutual relative positional relationship among the mass points A1 to A5 of the first displacement dimension correcting model remains constant, so that once the position of the overall center-of-gravity of the mass points A1 to A5 (the position on the global coordinate system) is determined, the position of each of the mass points A1 to A5 on the global coordinate system will be also uniquely determined.

Thus, in the first displacement dimension correcting model in which the positions of the mass points A1 to A5 on the global coordinate system are determined on the basis of a simplified model gait, the motion of the overall center-of-gravity coincides with the motion of the overall center-of-gravity on the simplified model; therefore, the floor reaction force acting on the robot 1 on the simplified model will be equivalent to the floor reaction force acting on the robot 1 on the first displacement dimension correcting model.

Here, determining the placement of the elements of the first displacement dimension correcting model described above in the first embodiment is equivalent to determining the placement of the elements of the first displacement dimension correcting model according to a geometric restrictive condition (1) from an instantaneous motion of a simplified model gait when the geometric restrictive condition (1) for determining the placement of the elements of the first displacement dimension correcting model (the positions of the mass points A1 to A5 and the posture of the body link on the global coordinate system) is defined as follows.

Geometric restrictive condition (1): For a given arbitrary instantaneous desired motion, the posture state of the robot 1 based on the placement of the elements of the first displacement dimension correcting model is normally maintained in the upright posture state, and the overall center-of-gravity of the elements of the first displacement dimension correcting model coincides with the overall center-of-gravity of the robot 1 in the given instantaneous desired motion.

In the first embodiment, this geometric restrictive condition (1) corresponds to the first geometric restrictive condition in the present invention.

The second displacement dimension correcting model in the first embodiment will now be explained. FIG. 8 shows the structure of the second displacement dimension correcting model. The constituent elements of the second displacement dimension correcting model are the same as those of the first displacement dimension correcting model. The second displacement dimension correcting model has five mass points A1 to A5, as with the first displacement dimension correcting model, its body 3 (the body link) having the inertia Ib about the mass point A1. The masses of the mass points A1 to A5 and the positions of the mass points A1 to A5 on the local coordinate systems fixedly set on corresponding parts are the same as those of the first displacement dimension correcting model. Further, the inertia Ib of the body 3 is also the same as that in the first displacement dimension correcting model.

Unlike the first displacement dimension correcting model, the posture of the robot 1 is not restricted to the upright posture state in the second displacement dimension correcting model, and the mass points A1 to A5 and the body 3 (the body link) can be moved to positions/postures corresponding to arbitrary posture states that the robot 1 may take.

In other words, a geometric restrictive condition (2) shown below is set between the placement of the elements of the second displacement dimension correcting model (the positions of the mass points A1 to A5 and the posture of the body link on the global coordinate system) and an instantaneous desired motion of the robot 1 corresponding thereto (the instantaneous values of desired position/posture of each part). The geometric restrictive condition (2) corresponds to the second geometric restrictive condition in the present invention.

Geometric restrictive condition (2): The positions/postures of parts corresponding to the elements of the robot 1 that are determined according to the placement of the elements of the second displacement dimension correcting model agree with the positions/postures of parts corresponding to the elements of the robot 1 in an instantaneous desired motion corresponding to the placement.

Accordingly, in the second displacement dimension correcting model, the overall center-of-gravity of the mass points A1 to A5 thereof substantially coincides with the position of the true overall center-of-gravity of the actual robot 1 in a posture state corresponding to the placement of the elements of the second displacement dimension correcting model (the positions of the mass points A1 to A5 and the posture of the body link).

Supplementally, determining the placement of the elements of the second displacement dimension correcting model according to the above geometric restrictive condition (2) from an arbitrary instantaneous desired motion is equivalent to determining the placement of the elements of the second displacement dimension correcting model such that the placement of the elements of the second displacement dimension correcting model coincides with the placement (the positions/postures) of the parts corresponding to the elements in the robot 1 following a given instantaneous desired motion. Furthermore, determining an instantaneous desired motion according to the geometric restrictive condition (2) from arbitrary placement of the elements of the second displacement dimension correcting model is equivalent to determining an instantaneous desired motion such that the placement (the positions/postures) of the parts corresponding to the elements of the robot 1 following an instantaneous desired motion coincides with the placement of the elements of the given second displacement dimension correcting model.

The second displacement dimension correcting model is a model that determines the aforesaid displacement dimension corrected body position/posture in cooperation with the first displacement dimension correcting model. To determine the displacement dimension corrected body position/posture, two types of placement of the elements of the second displacement dimension correcting model are provisionally determined. In one placement, the positions of the foot mass points A4 and A5 of the second displacement dimension correcting model are determined to be the positions corresponding to the positions/postures of the feet of a simplified model gait. Further, the positions of the body mass point A1 and the thigh mass points A2, A3, and the posture angle of the body 3 (body link) are determined such that predetermined conditions related to the overall centers of gravity of the first displacement dimension correcting model and the second displacement dimension correcting model and the angular momentum product between the models, which will be discussed later, are satisfied. This will be discussed in more detail hereinafter.

Supplementally, each of the legs 2 of the robot 1 according to the present embodiment has six degrees of freedom, so that once the positions/postures of both feet 22, 22 and the position/posture of the body 3 are determined, the overall postures of the legs 2 and 2 of the robot 1 (the positions/postures of the individual portions (individual links) of the legs 2 and 2 of the robot 1) are uniquely determined. Hence, if the positions of the mass points A4 and A5 of both feet and the body mass point A1 and the posture of the body 3 (the body link) on the second displacement dimension correcting model are determined, then the positions of the thigh mass points A2 and A3 are subordinately determined accordingly.

In the other placement of the elements of the second displacement dimension correcting model provisionally determined when displacement dimension corrected body position/posture is determined, the positions of the foot mass points A4 and A5 of the second displacement dimension correcting model are determined to be the positions corresponding to the positions/postures of the feet of a simplified model gait. Further, the posture of the body link is determined to be the same as the body posture of the simplified model gait. The positions of the body mass point A1 and the thigh mass points A2 and A3 are determined such that a predetermined condition related to an angular momentum product between the first displacement dimension correcting model and the second displacement dimension correcting model, which will be discussed later, is satisfied. This will be also discussed in detail hereinafter.

Based on the aforesaid two types of placement of the elements of the second displacement dimension correcting model, final displacement dimension corrected body position/posture are determined.

In the following explanation, "positions" of mass points or "postures" of links having inertia related to a simplified model and the first and the second displacement dimension correcting models will mean the positions and postures on a global coordinate system unless otherwise specified.

Next, the details of the processing of the gait generating device 100 in the first embodiment will be explained more specifically. Taking a desired gait (the desired gait in the narrow sense described above) for one step from the moment one of the legs 2 of the robot 1 lands to the moment the other leg 2 lands as a unit, the gait generating device 100 generates the desired gait for one step in order according to the processing of a flowchart to be explained below. At this time, a desired gait to be newly generated is called "the current time gait."

FIG. 9 is a structured flowchart showing main routine processing of the gait generating device 100. The following is a detailed explanation. First, in S010, various initializing operations, including the initialization of time t to zero, are performed. This processing is carried out at startup or the like of the gait generating device 100. Then, the gait generating device 100 proceeds to S014 via S012 and waits for a timer interrupt for each control cycle (the arithmetic processing cycle of the flowchart of FIG. 9). The control cycle is denoted by $\Delta t$. Thereafter, the processing from S014 to S032 is repeated for each control cycle $\Delta t$.

The gait generating device 100 proceeds from S014 to S016 wherein it determines whether a gait is changing. If the gait is changing, then the gait generating device 100 proceeds to S018, or if the gait is not changing, then it proceeds to S022. Here, "the change of a gait" means the timing at which the generation of a current time gait is begun. For example, a control cycle following the control cycle in which the generation of the desired gait immediately preceding the current time gait has been completed will be the change of a gait.

When proceeding to S018, the current time t is initialized to zero, and then the gait generating device 100 proceeds to S020 to determine gait parameters of the current time gait. The processing of S020 corresponds to the processing of a gait parameter determiner 100a of FIG. 5 mentioned above, whereby parameters that define a desired foot position/posture trajectory, a desired arm posture trajectory, a desired ZMP trajectory, and a desired floor reaction force vertical component trajectory are determined, and parameters that define a reference body posture trajectory, a floor reaction force horizontal component permissible range, and a ZMP permissible range are also determined.

The processing of S020 is the processing corresponding to, for example, S022 to S030 of FIG. 13 in PCT international publication WO/03/057427/A1 (hereinafter referred to as publication document 1) previously proposed by the present applicant, and it is carried out in the same manner as that in the publication document 1. To explain it in brief, first, a normal gait as a virtual cyclic gait (a gait whose one cycle is composed of a gait for two steps of the robot 1) to which a current time gait is to be connected or asymptotic is determined. The normal gait is determined so as to satisfy a periodicity condition (a condition in which the initial condition of a cycle of the normal gait (the position/posture and their changing velocities of each part of the robot 1) matches the terminal condition thereof) on the basis of the estimated landing position/posture, estimated landing time, and the like of the free foot 22 for the next two steps, including the current time gait. Then, gait parameters defining a desired foot position/posture trajectory, a desired arm posture trajectory, a desired ZMP trajectory, and a desired floor reaction force vertical component trajectory are determined such that the current time gait connects or becomes asymptotic to a normal gait thereof. Here, when generating a desired foot position/posture trajectory by using, for example, the finite-duration setting filter previously proposed in U.S. Pat. No. 3,233,450 by the present applicant, the gait parameters defining the desired foot position/posture trajectory are primarily composed of estimated landing position/posture and estimated landing time of the free leg foot 22 of the current time gait and the next estimated landing position/posture and estimated landing time of the supporting leg foot 22 of the current time gait. If, for example, a desired ZMP trajectory and a desired floor reaction force vertical component trajectory to be defined by gait parameters are trajectories formed by broken lines, then the gait parameters will be composed primarily of the values at break points thereof and time of the break points. In the present embodiment, a reference body posture is, for example, defined as a vertical posture (a posture at which the inclination angle of the body 3 relative to the vertical axis is zero). Of the gait parameters determined in S020 of the present embodiment, the gait parameter defining a floor reaction force horizontal component permissible range corresponds to the parameter of the floor reaction force horizontal component permissible range for full-model correction determined in S030 of FIG. 13 of the aforesaid publication document 1.

Supplementally, the processing for determining the gait parameters for a current time gait in the aforesaid publication document 1 uses a dynamic model for preparing normal gaits. As the dynamic model, the aforesaid simplified model is used in the present embodiment. In this case, although the simplified model in the present embodiment is not the same as the dynamic model illustrated in FIG. 11 of publication document 1, the simplified model is equivalent to the one in which the masses of the mass points of both legs of the dynamic model in publication document 1 are set to zero and the inertia related to the body (the inertia of the flywheel) is set to zero. Hence, if the masses of the mass points of both legs of the dynamic model of FIG. 11 in the publication document 1 are set to zero and the inertia related to the body is set to zero, then the processing of S020 in the present embodiment is carried out by directly applying the processing of S022 to S030 of FIG. 13 in the publication document 1. Further, in the processing of S022 to S028 of FIG. 13 of the publication document 1, a floor reaction force horizontal component permissible range for simplified model gaits (the permissible range being not output from the gait generating device) is set and used mainly for creating a normal gait. In the present embodiment, however, the floor reaction force horizontal component permissible range for simplified model gaits may alternatively be set to be, for example, an infinite range or it may be set to be a wide range so that the floor reaction force horizontal component of a simplified model gait (or a normal gait) always falls within the floor reaction force horizontal component permissible range. This makes it possible to apply, without trouble, the algorithm shown in the publication document 1 to the processing of S020 in the present embodiment.

Next, after the processing of S020, or if the determination result of S016 is NO, then the processing proceeds to S022 to determine the instantaneous value of the current time gait. This processing is the processing carried out by the desired instantaneous value generator 100b and the simplified model gait generator 100c in FIG. 5 described above, and it determines the instantaneous value (the instantaneous value of a simplified model gait) of the current time gait on the basis of the gait parameters determined in S020.

To be more specific, this processing corresponds to the processing of S032 of FIG. 13 in the aforesaid publication document 1, and it is carried out in the same manner as with publication document 1. To explain it in brief, the instantaneous values of desired foot position/posture, a desired ZMP, a desired arm posture, a desired floor reaction force vertical component, and a reference body posture are determined on the basis of the gait parameters determined in the foregoing S020, and then based on the instantaneous values, the instantaneous values of the desired body position/posture are determined such that the desired ZMP and the desired floor reaction force vertical component are satisfied on the foregoing simplified model (such that the moment horizontal component acting about the desired ZMP due to the resultant force of the inertial force produced by a motion of the robot 1 and gravity becomes zero, and the translational force vertical component of the resultant force balances out the desired floor reaction force vertical component). Here, the instantaneous values of the desired body position/posture will be supplementally explained. The instantaneous value of a desired body posture is set to be the same as the instantaneous value of a reference body posture in the present embodiment. Further, a desired body position vertical component is determined on the basis of the vertical position of a body mass point 3m of a simplified model determined from the desired floor reaction force vertical component and the aforesaid expression 01. And, the horizontal position of the body mass point 3m of the simplified model is determined so as to satisfy an expression obtained by setting the left side of the aforesaid expression 03 to zero (so that the horizontal component of the floor reaction force moment about the desired ZMP becomes zero), and the desired body position horizontal component is determined on the basis of the horizontal position of the body mass point 3m.

The processing of S032 of FIG. 13 in the aforesaid publication document 1 uses the floor reaction force horizontal component permissible range for simplified model gaits. According to the present embodiment, as in the case explained in relation to the processing of S020, the floor reaction force horizontal component permissible range for simplified model gaits may be set to be, for example, an infinite range or it may be defined so that the floor reaction force horizontal component of a simplified model gait always falls within the floor reaction force horizontal component permissible range.

In the processing of S022, briefly speaking, a desired gait (the current time gait) for which instantaneous values are determined sequentially (for every control cycle Δt) is a gait in which the horizontal component of the moment generated about a desired ZMP by the resultant force of an inertial force generated by the motion and gravity becomes zero, and the translational force vertical component of the resultant force balances out a desired floor reaction force vertical component on the simplified model.

Subsequently, the processing proceeds to S024 to carry out a displacement dimension gait correction subroutine. The displacement dimension gait correction subroutine relating to the core of the present invention will be explained below in detail.

The processing for generating desired gaits by using the simplified model is advantageous in that it allows current gaits (currents gaits that do not diverge) to be stably determined in real time, whereas it disadvantageously provides low dynamic approximation accuracy of generated gaits. Hence, the embodiments of the present invention use a full model having higher dynamic accuracy than a simplified model to correct a part of a gait (desired body position/posture and the moment about a desired ZMP). In this case, if a simplified model gait is input to a full model for such a reason of lower dynamic approximation accuracy of a simplified model gait or high nonlinearity of a full model, then an inconvenience may occur in that the correction of the simplified model gait is not properly made, causing a gait to be generated that disables the robot 1 to perform a continuous motion. Especially when generating a gait such as the one for the running of the robot 1, in which the motion of the leg 2 considerably changes in a short time, the influences of changes in inertial force produced due to a bending operation or the like of a knee joint of each leg 2, which are not considered in a simplified model, will increase. This leads to deteriorated dynamic approximation accuracy of simplified model gaits, frequently causing the inconvenience described above. As a conceivable example of solutions to the inconvenience, a dynamic model having a plurality of mass points in each leg 2 or even a dynamic model having inertia (inertial moment) in one or more links of the robot, such as the body, is constructed and used as a simplified model in order to enhance the dynamic approximation accuracy of simplified model gaits. In such a case, however, the nonlinearity of the simplified model is intensified, making it difficult to stably and properly find the gait parameters of a current time gait connecting to a normal gait (gait parameters that allow the continuity of a motion of the robot 1 to be secured) in some cases, and the arithmetic processing therefor takes time, consequently making it difficult to generate proper gaits in real time.

Therefore, the embodiments of the present invention, including the present embodiment (the first embodiment), use first and second displacement dimension correcting models to correct only some motions (specifically, body position/posture) of a simplified model gait by geometric processing (processing in the dimension of displacement of a position and a posture) related to the placement of the elements (the positions and postures of mass points and links having inertia) of the first and the second displacement dimension correcting models without using dynamic equations that include desired ZMPs or floor reaction forces. This arrangement generates a gait having higher dynamic accuracy than a simplified model gait, more specifically, a gait in which the translational force component of the resultant force of an actual inertial force, which is generated by the robot 1 due to the motion of the gait, and gravity balances out the translational force component of a desired floor reaction force with higher accuracy, and also the horizontal component of a moment acting about a desired ZMP due to the resultant force becomes zero with higher accuracy.

However, if both body position and body posture of a simplified model gait are corrected with efforts focused only on achieving enhanced dynamic accuracy, then there is a danger of excessive change in the body posture. Here, the body 3 of the robot 1 is generally heavier and has larger inertia, as compared with other parts; therefore, if a motion of the robot 1 is performed with a gait in which the body posture frequency changes, then an undue moment is produced in a hip joint. As a result, an excessive load may be applied to a hip joint actuator or the hip joint portion or a portion in the vicinity thereof may bend and vibrate, frequently leading to sudden instability of the posture of the robot 1. Further, in the case where an imaging device is installed as a visual device on the head 4 or the like of the robot 1, the imaging device will be easily shaken, making it difficult for the imaging device to recognize its surrounding.

Meanwhile, when generating a desired gait for performing the walking of the robot 1 on, for example, a floor having a relatively large friction coefficient, it is possible, primarily by adjusting the translational motion of the body 3, to generate a gait that satisfies a desired ZMP without causing the robot 1 to slip. Hence, it is possible to improve dynamic accuracy while satisfying the desired ZMP by correcting mainly the body position among the body posture and the body position of a simplified model gait. On the other hand, when performing the walking of the robot 1 on a floor having a relatively small friction coefficient or when generating a desired gait that cannot avoid involving a period during which a desired floor reaction force vertical component becomes zero or extremely small, as in the running of the robot 1, a certain extent of change in the body posture is inevitable in order to satisfy a desired ZMP. This is because the horizontal component (more precisely, a component parallel to a floor surface) of an inertial force that may be produced by a translational motion of the body 3 of the robot 1 is restricted, and it is difficult to satisfy the desired ZMP solely by adjusting the translational motion of the body 3 within the restriction.

Thus, in the embodiments of the present invention, including the first embodiment, the body position/posture of a simplified model gait are corrected so as to improve dynamic accuracy while restraining changes in the body posture as much as possible by using the first displacement dimension correcting model and the second displacement dimension correcting model described above, considering the motion mode and a frictional condition of a floor in a desired gait of the robot 1.

As described above, the first and the second displacement dimension correcting models used to correct body position/posture of a simplified model gait are usually equipped similarly with mass points corresponding to some parts of the robot 1, or equipped similarly with links (the body 3 and the like) having mass points and inertia. Further, both displacement dimension correcting models have more mass points than a simplified model does, or have inertia that the simplified model does not have. Both displacement dimension correcting models in the embodiments in the present description include body links having mass points and inertia corresponding to the body 3 in order to correct the body position/posture of a simplified model gait.

In this case, in the first displacement dimension correcting model, an appropriate restrictive condition is added to the mutual positional relationship among the mass points, or the posture of a link (such as the body 3) having inertia.

To give more detailed explanation (here, general explanation not limited to the first embodiment), the positions of the mass points of the first displacement dimension correcting model are determined on the basis of the instantaneous values (instantaneous motions) of the positions/postures of the parts of a generated simplified model gait. At this time, if the first displacement dimension correcting model having inertia in one or more links (such as the body 3) of the robot 1, then the posture angle of the link is also determined. However, in the first displacement dimension correcting model, an appropriate geometric restrictive condition is added to the relationship among the mass points or the posture of a link (such as the body 3) having inertia. With this arrangement, when the positions of the mass points of the first displacement dimension correcting model or the posture angle of the link having inertia has been determined on the basis of the instantaneous values (instantaneous motions) of the positions/postures of the parts of the simplified model gait, a floor reaction force similar to the floor reaction force of the simplified model gait is generated also in the first displacement dimension correcting model. In the first embodiment, the aforesaid geometric restrictive condition (1) is added to the first displacement dimension correcting model as the geometric restrictive condition.

Further, the positions of the mass points of the second displacement dimension correcting model (or the positions of the mass points and the posture angles of links having inertia) are provisionally determined as the first element placement of the second displacement dimension correcting model such that the following conditions 1 and 2 are satisfied between the second displacement dimension correcting model, which does not have the geometric restrictive condition set in the first displacement dimension correcting model, and the first displacement dimension correcting model.

Condition 1) The position of the overall center-of-gravity of the first displacement dimension correcting model and the position of the overall center-of-gravity of the second displacement dimension correcting model substantially coincide with each other.

Condition 2) When a certain point Q is established, the total sum of the products of angular momentums about point Q in the second displacement dimension correcting model relative to the first displacement dimension correcting model takes a constant value (predetermined value).

Here, condition 1 is the condition for ensuring that the inertial forces produced by a motion of a translational floor reaction force or overall center-of-gravity will be substantially the same in the two displacement dimension correcting models. In other words, condition 1 is equivalent to a condition in which, if the vector of the difference between the position of each mass point of the first displacement dimension correcting model and the position of the mass point of the second displacement dimension correcting model corresponding thereto (the difference in positional vector) is regarded as the translational acceleration of the mass point, then the total sum of the translational force components of the inertial forces generated by mass points (the masses of mass points * translational acceleration) on all mass points will be substantially zero.

The aforesaid angular momentum product related to condition 2 is defined as follows for each mass point when the reference position for each mass point of each displacement dimension correcting model is arbitrarily established, and the position of the aforesaid point Q is also arbitrarily established. If each displacement dimension correcting model has inertia (if inertia is set in certain one or more links), then the angular momentum product is defined as follows for each link when the reference posture angle for each link having the inertia is arbitrarily specified.

Specifically, the angular momentum product related to each mass point of each displacement dimension correcting model corresponds to a value obtained by multiplying the outer product of a segment (the vector of the segment) that connects point Q and the point of the reference position corresponding to the mass point and a positional deviation (the vector of the positional deviation) of the mass point from the reference point by the mass of the mass point. In this case, one having a proportional relationship with the product of the outer product mentioned above and the mass or the one approximately equal to the product of the outer product and the mass may be defined as the angular momentum product related to the mass point. Further, in each displacement dimension correcting model, the angular momentum product related to a link having inertia is equivalent to the product of the deviation of the posture angle of the link from the reference posture angle for the link and the inertia of the link. In this case, one having a proportional relationship with the product of the deviation of the posture angle of the link from the reference posture angle and inertia or the one approximately equal to the product may be defined as the angular momentum product related to the link.

To supplementally describe the angular momentum product related to the mass point of each displacement dimension correcting model, the angular momentum product related to an arbitrary mass point will be a function that monotonously changes relative to the angle formed by the segment connecting a mass point and the foregoing predetermined point and the segment connecting the reference point for the mass point and the foregoing predetermined point (a monotone increasing function or a monotone decreasing function).

To be more specific, when the angular momentum product is defined as described above, condition 2 is a condition in which the total sum of the angular momentum products of the second displacement dimension correcting model takes a certain fixed value when the position of each mass point of the first displacement dimension correcting model is defined as the reference position for each mass point of the second displacement dimension correcting model, and the posture angle of each link having inertia in the first displacement dimension correcting model is defined as the reference posture angle of each link having inertia in the second displacement dimension correcting model.

In other words, condition 2 is equivalent to a condition in which, if the vector of the difference between the position of each mass point of the first displacement dimension correcting model and the position of the mass point of the second displacement dimension correcting model corresponding thereto (the difference in position vector) is regarded as the translational acceleration of the mass point, and the difference in the posture angle of each link having inertia between the two displacement dimension correcting models is regarded as angular acceleration of the link, then the total sum of the moment acting about point Q due to the translational force component of the inertial force generated by each mass point and the moment acting about point Q due to the inertial force (the inertial force of a rotational motion) of each link having inertia will take a certain fixed value (predetermined value).

According to the embodiments explained in detail in the present description, the above point Q is set to, for example, a desired ZMP. Point Q is not limited to a desired ZMP. This will be supplementally explained hereinafter.

Further, according to the first and the second embodiments in the present description, for the second displacement dimension correcting model, the body posture of the robot 1 is restricted to a posture in a simplified model gait, and the position of each mass point of the second displacement dimension correcting model (or the position of each mass point and the posture angle of a link having inertia) that satisfies the aforesaid condition 2 relative to the first displacement dimension correcting model is provisionally determined as the second element placement of the second displacement dimension correcting model. Then, a weight suited to the motion mode in a desired gait of the robot 1 and the friction condition of a floor is used to determine the weighted average of the body posture corresponding to the first element placement and the body posture corresponding to the second element placement as a displacement dimension corrected body posture, and the weighted average of the body position corresponding to the first element placement and the body position corresponding to the second element placement is determined as a displacement dimension corrected body position. Alternatively, according to the third embodiment in the present description, a weight suited to the motion mode in a desired gait of the robot 1 and the friction condition of a floor is used for the second displacement dimension correcting model so as to restrict the body posture of the robot 1 to the weighted average of the body posture corresponding to the first element placement and the body posture of a simplified model gait, then the position of each mass point of the second displacement dimension correcting model (or the position of each mass point and the posture angle of a link having inertia) that satisfies the aforesaid condition 2 is determined as the second element placement of the second displacement dimension correcting model. Then, the body position/posture corresponding to the second element placement are directly determined as the displacement dimension corrected body position/posture.

According to the embodiments in the present description, displacement dimension corrected body position/posture obtained by correcting the desired body position/posture of a simplified model gait are determined by using the first displacement dimension correcting model and the second displacement dimension correcting model, as described above. The aforesaid processing of S024 of the flowchart of FIG. 6 is the processing for determining displacement dimension corrected body positions/postures, as described above.

Returning to the explanation of the first embodiment, the subroutine processing of S024 in the first embodiment will now be specifically explained with reference to FIG. 10. Here, for the convenience of understanding of the embodiments in the present description, the explanation will be given to the correction of body position/posture (the calculation of displacement dimension corrected body position/posture) on a sagittal plane (a plane containing the X-axis and the Z-axis), while the correction of body position/posture on a lateral plane (a plane containing the Y-axis and the Z-axis) will be omitted.

First, in S100, first provisional corrected body position/posture (Pb21, θb21) (a set of the first provisional corrected body position Pb21 and the first provisional corrected body posture θb21) are determined such that the aforesaid condition 1 related to the center-of-gravity and the aforesaid condition 2 related to angular momentum product between the first displacement dimension correcting model and the second displacement dimension correcting model are satisfied. To be more precisely, the first element placement of the second displacement dimension correcting model is determined such that the conditions 1 and 2 between the two models are satisfied, and the body position/posture of the robot 1 corresponding to the position of the body mass point A1 and the posture of the body link in that first element placement are determined as the first provisional corrected body position/posture (Pb21, θb21).

This processing of S100 is executed by the subroutine processing of FIG. 11. This will be explained below. First, in S200, the positions of the mass points A1 to A5 and the posture angle of the body 3 (body link) having inertia in the first displacement dimension correcting model are determined on the basis of the instantaneous values (the instantaneous values of a desired motion, including desired body position/posture) of a simplified model gait at current time (present time) t. Specifically, the positions of the mass points A1 to A5 of the first displacement dimension correcting model are determined such that the position of the overall center-of-gravity of the robot 1 in the simplified model gait is equal to the position of the center-of-gravity of the robot 1 on the first displacement dimension correcting model. In this case, according to the present embodiment, the position of the overall center-of-gravity of the robot 1 in the simplified model gait agrees with the position of the body mass point 3m of the simplified model, so that the position will be uniquely defined from the desired body position/posture of the simplified model gait. Further, in the first displacement dimension correcting model, the relative positional relationship among the mass points A1 to A5 is restricted, as described above; therefore, making the position of the overall center-of-gravity of the mass points A1 to A5 (the position of the overall center-of-gravity of the robot 1 in the first displacement dimension correcting model) agree with the position of the body mass point 3m of the simplified model will uniquely determine the positions of the mass points A1 to A5. Moreover, the posture angle of the body link of the first displacement dimension correcting model is set to be identical to the body posture angle (the vertical posture in the present embodiment) of the simplified model gait. Thus, from the instantaneous motion (the instantaneous values at current time t) of the simplified model gait, the placement of the elements of the first displacement dimension correcting model is determined according to the aforesaid geometric restrictive condition (1) related to the first displacement dimension correcting model. The placement of the elements of the first displacement dimension correcting model corresponds to "the first placement" in the first invention of the present invention.

Next, the processing from S202 is executed to exploratorily determine the set of the positions of the mass points A1 to A5 of the second displacement dimension correcting model and the posture angle of the body 3 (body link) having inertia, i.e., the first element placement of the second displacement dimension correcting model, that satisfies the aforesaid conditions 1 and 2 relative to the first displacement dimension correcting model, and the body position/posture of the robot 1 corresponding to the body mass point A1 and the posture of the body link in the first element placement are determined as the first provisional corrected body position/posture (Pb21, θb21).

To be more specific, first, in S202, initial candidates (Pb21_s, θb21_s) of the first provisional corrected body position/posture are determined. The initial candidates (Pb21_s, θb21_s) correspond to approximate estimated values of the first provisional corrected body position Pb21 and the first provisional corrected body posture θb21 at current time t (present time t), and they are determined, for example, as follows. It is considered that the difference (positional deviation amount) between the first provisional corrected body position Pb21 and the body position Pb of the simplified model gait at current time t is close to the difference between Pb21 and Pb at last time (time at a last time control cycle) t−Δt. Similarly, the difference (posture angle deviation amount) between the first provisional corrected body posture θb21 and the body posture θb of the simplified model gait at current time t is considered to be close to the difference between θb21 and θb at last time t−Δt. Hence, the initial candidates (Pb21_s, θb21_s) are determined according to the following expressions from Pb, θb at current time t, values Pb_p, θb_p of Pb, θb at last time t−Δt, and values Pb21_p, θb21_p of Pb21, θb21 at last time t−Δt.

$$Pb21\_s = Pb + (Pb21\_p - Pb\_p) \qquad \text{Expression 04a}$$

$$\theta b21\_s = \theta b + (\theta b21\_p - \theta b\_p) \qquad \text{Expression 05a}$$

Subsequently, following the S204, the loop processing from S206 to S216 is carried out. In S206, the positions of the mass points A1 to A5 in the second displacement dimension correcting model are determined on the basis of the current candidates (Pb21_s, θb21_s) of the first provisional corrected body position/posture and the desired positions/postures of both feet of a simplified model gait at current time t. In this case, the positions of the mass points A1 to A5 are determined, assuming that the position/posture of the body 3 of the robot 1 in the second displacement dimension correcting model coincide with the current candidates (Pb21_s, θb21_s), and the position/posture of each foot 22 of the robot 1 in the second displacement dimension correcting model coincide with the desired foot position/posture of the simplified model gait. In other words, the positions of the mass points A1 to A5 in the second displacement dimension correcting model are determined according to the geometric restrictive condition (2) from an instantaneous motion obtained by replacing only the instantaneous values of the body position/posture of the instantaneous motions of the simplified model gait by the candidates (Pb21_s, θb21_s).

To be specific, the positions of foot mass points A3 and A4 are determined from desired foot position/posture. Further, the position of the body mass point A1 is determined from the candidates (Pb21_s, θb21_s), and the posture angle of the body 3 (body link) is set to be identical to θb21_s. And, the positions of thigh mass points A2 and A3 are determined from the posture of each leg 2 of the robot 1 defined from the desired positions/postures of both feet and the candidates (Pb21_s, θb21_s). Supplementally, as described above, in the robot 1 of the present embodiment in the present description, each leg 2 has six degrees of freedom; therefore, once the positions/postures of the two feet 22, 22 and the body 3 are determined, the position/posture of each part of each leg 2 will be uniquely determined. Accordingly, if the position of the body mass point A1, the posture angle of the body link, and the positions of the mass points A4 and A5 of both feet of the second displacement dimension correcting model are determined, then the positions of the thigh mass points A2 and A3 will be uniquely determined.

Subsequently, the processing proceeds to S208 to determine a positional difference Gc_err in overall center-of-gravity between the first displacement dimension correcting model and the second displacement dimension correcting model (hereinafter referred to as the inter-model overall center-of-gravity error Gc_err), and a deviation amount of a total sum L_err of angular momentum products of the second displacement dimension correcting model relative to the first displacement dimension correcting model (hereinafter referred to as the inter-model angular momentum product error L_err). This processing will be specifically explained below. In the following explanation, the masses of the mass points A1 to A5 of the first and the second displacement dimension correcting models will be denoted by mi (i=1, 2, . . . , 5), and the positions (positional vectors) will be generally denoted by Pi1 or Pi2 (i=1, 2, . . . , 5). The Pi1 is a symbol that generally denotes the position of a mass point Ai of the first displacement dimension correcting model, while the Pi2 is a symbol that generally denotes the position of a mass point Ai of the second displacement dimension correcting model. Further, the posture angles of the body 3 (body link) in the first and the second displacement dimension correcting models will be generally denoted by θb1 and θb2, respectively. In the present embodiment, θb1 is identical to a desired body posture θb (vertical posture) of a simplified model gait.

The inter-model overall center-of-gravity error Gc_err and the inter-model angular momentum product error L_err are respectively calculated according to, for example, the following expressions 06 and 07.

$$Gc\_err=\Sigma(mi*(Pi2-Pi1))$$ Expression 06

$$L\_err=\Sigma(mi*(Pi1-Q)*(Pi2-Pi1))+Ib*(\theta b2-\theta b1)+Const$$ Expression 07 where Σ in these expressions means the total sum on all mass points Ai (i=1, 2, . . . , 5) of the parenthesized portions following it. "Const" of expression 07 denotes a predetermined value specified beforehand, and it corresponds to "constant value" (predetermined value) in the aforesaid condition 2. Q in expression 07 is identical to the position of a desired ZMP of a simplified model gait in the present embodiment.

In these expressions 06 and 07, the right side of expression 06 means the difference between the position of the overall center-of-gravity determined by the positions Pi1 (i=1, 2, . . . , 5) of the mass points A1 to A5 of the first displacement dimension correcting model and the position of the overall center-of-gravity determined by the positions Pi2 (i=1, 2, . . . , 5) of the mass points A1 to A5 of the second displacement dimension correcting model. Thus, if the value of the inter-model overall center-of-gravity error Gc_err is zero (zero vector) or substantially zero, then the foregoing condition 1 will be satisfied.

Further, the term obtained by removing "Const" from the right side of expression 07 means the total sum of the angular momentum products of the second displacement dimension correcting model relative to the first displacement dimension correcting model. In other words, the term obtained by removing "Const" from the right side of expression 07 means the total sum of the angular momentum products of the second displacement dimension correcting model when the positions Pi1 (i=1, 2, . . . , 5) of the mass points A1 to A5 of the first displacement dimension correcting model are set to the reference positions of the mass points A1 to A5 of the second displacement dimension correcting model, and the posture angle of the body 3 (body link) of the first displacement dimension correcting model is set to the reference posture angle of the body 3 (body link) of the second displacement dimension correcting model.

Accordingly, if the value of the inter-model angular momentum product error L_err is always zero or substantially zero, then the foregoing condition 2 is satisfied.

To supplementally explain about the parenthesized term following Σ of the right side of expression 07, (Pi1−Q)*(Pi2−Pi1) denotes the outer product of the vector of a segment that connects point Q and the mass point Ai and the positional deviation vector of the mass point Ai of the second displacement dimension correcting model relative to the mass point Ai of the first displacement dimension correcting model. When this is visually expressed, (Pi1−Q)*(Pi2−Pi1) corresponds to the amount of size that is double the area of each hatched or meshed triangle, as shown in FIG. 13. In FIG. 13, the positions Pi1, Pi2 of the mass points Ai (i=1, 2, . . . , 5) in the first and the second displacement dimension correcting models, respectively, are denoted by Pi1(Ai) and Pi2(Ai).

Expression 07 related to angular momentum product may be replaced by any one of the following expressions 08 to 10.

$$L\_err=\Sigma(Ci*mi*\text{angle}(Pi1\_Q\_Pi2))+Ib*(\theta b2-\theta b1)+Const$$ Expression 08

$$L\_err=\Sigma(mi*(\text{Horizontal component displacement of mass point }Ai*\text{Height}))+Ib*(\theta b2-\theta b1)+Const$$ Expression 09

$$L\_err=\Sigma(mi*(\text{Horizontal component displacement of mass point }Ai*\text{Height})*C(\text{Height of mass point }Ai))+Ib*(\theta b2-\theta b1)+Const$$ Expression 10 where "angle(Pi1_Q_Pi2)" in expression 08 denotes the angle formed by a segment that connects the mass point Ai and point Q of the first displacement dimension correcting model and a segment that connects the mass point Ai and point Q of the second displacement dimension correcting model. Further, "Ci" in expression 08 is a predetermined coefficient and it is determined such that Ci*mi*angle (Pi1_Q_Pi2) is substantially equal to double the area of the triangle formed by mass points Ai and points Q of both displacement dimension correcting models. Further, "horizontal component displacement of mass point Ai" in expressions 09 and 10 means the horizontal component of a positional difference (Pi2−Pi1) between the mass point Ai of the first displacement dimension correcting model and the mass point Ai of the second displacement dimension correcting model, and "height" means a relative height of the mass point Ai of the first or the second displacement dimension correcting model in relation to point Q, that is, the vertical component of Pi1−Q or Pi2−Q. Further, "C(height of mass point Ai)" in expression 10 means a certain function value of a relative height of the mass point Ai of the first or the second displacement dimension correcting model in relation to point Q (the vertical component of Pi1−Q or Pi2−Q). In this case, preferably, a function value C (height of a mass point Ai) is a monotone function whose value basically decreases as the height of the mass point Ai increases.

Regardless of which one of the aforesaid expressions 07 to 10 related to angular momentum product is used, the term obtained by excluding "Const" of the right side of the expression used will be substantially proportional to or approximately equal to the total sum of angular momentum products. The values of "Const" in expressions 07 to 10 are generally different from each other.

Supplementally, the terms following Σ of the right side of the foregoing expressions 07 to 10 will be functions that substantially monotonously change relative to the angle (Pi1_Q_Pi2) formed by a segment that connects the mass point Ai and point Q of the first displacement dimension correcting model and a segment that connects the mass point Ai and point Q of the second displacement dimension correcting model.

According to the present embodiment, in S208, the positions of the mass points A1 to A5 of the first displacement dimension correcting model determined in S200 are substituted into Pi1 of the foregoing expression (6), and the positions of the mass points A1 to A5 determined in S206 are substituted into Pi2 of the expression (6) thereby to calculate the inter-model center-of-gravity positional error Gc_err. Further, the same is carried out on Pi1 and Pi2 in the foregoing expression (7), a body posture (vertical posture in the present embodiment) determined in S200 is substituted into θb1, and a current value θb21 of a candidate of the first provisional corrected body posture is substituted into θb2 thereby to calculate the inter-model angular momentum product error Lc_err.

After determining the inter-model overall center-of-gravity error Gc_err and the inter-model angular momentum product error L_err in S208 as described above, the processing proceeds to S210 to determine whether Gc_err and L_err lie in a predetermined range in the vicinity of zero. If the result of the determination is YES, then the processing proceeds via S212 to S218, which will be discussed hereinafter. On the other hand, if the result of the determination is NO, then the processing proceeds to S214 wherein a plurality of provisional candidates (Pb21_s+ΔPb21x, θb21_s), (Pb21_s+ΔPb21z, θb21_s) and (Pb21_s, θb21_s+Δθb21) are determined in the vicinity of a current candidate (Pb21_s, θb21_s) of the first provisional corrected body position/posture. ΔPb21x and ΔPb21y denote predetermined values for changing the candidate Pb21_s of the first provisional corrected body position from a current value in the X-axis direction and the Y-axis direction, respectively, by an extremely small amount, and Δθb21 denotes a predetermined value for changing the candidate θb21 of the first provisional corrected body posture about the Y-axis by an extremely small amount. Then, the same processing as that of the foregoing S206 and S208 is carried out on these provisional candidates so as to determine the inter-model overall center-of-gravity error Gc_err and the inter-model angular momentum product error L_err. This processing of S214 is the processing for observing the degrees of changes in Gc_err and L_err when the candidates (Pb21_s, θb21_s) of the first provisional corrected body position/posture are changed from the current values.

Subsequently, the processing proceeds to S216 wherein, based on Gc_err and L_err determined in S208 and S214, new candidates of the first provisional corrected body position/posture are determined such that their values approach zero, and the determined candidates are substituted into (Pb21_s, θb21_s). The new candidates are determined using, for example, Jacobian (sensitivity matrix). Then, the processing from S206 is executed again.

As described above, by the loop processing from S206 to S216, the first provisional corrected body position/posture that cause Gc_err and L_err to fall within a predetermined range in the vicinity of zero, i.e., the first provisional corrected body position/posture that satisfy the aforesaid conditions 1 and 2, are exploratorily determined. Supplementally, the set of the first provisional corrected body position/posture, which are observed when the condition in S210 is satisfied, and the positions of the mass points determined in S206 immediately before the S210 corresponds to the aforesaid first element placement. Further, the first element placement corresponds to "the second placement" in the first invention of the present invention.

And, if the result of the determination of S210 is YES, then the processing proceeds to S218 via S212, and current (Pb21_s, θb21_s) are decided as the first provisional corrected body position/posture (Pb21, θb21) at current time t. This provides a gait obtained by correcting the body position/posture of a simplified model gait so that it satisfies the foregoing conditions 1 and 2 (hereinafter referred to as the first provisional corrected gait in some cases). This first provisional corrected gait is obtained by correcting only the desired body position/posture of the simplified model gait, and the remaining constituent elements, such as desired foot position/posture, a desired ZMP and a desired floor reaction force vertical component, of the desired gait are the same as those of the simplified model gait. The motion of the first provisional corrected gait is the same as an instantaneous desired motion determined according to the foregoing geometric restrictive condition (2) from the placement of the second displacement dimension correcting model (the above first element placement) when the condition in S210 is satisfied. Further, the motion of the first provisional corrected gait corresponds to the first provisional corrected instantaneous desired motion in the first invention of the present invention. Hence, the processing of S100 constitutes the first provisional corrected motion determining means in the first invention of the present invention.

The above is the subroutine processing of S100.

Returning to the explanation of the flowchart of FIG. 10, after the processing of S100 is executed as described above, the processing of S102 is carried out. The processing of this S102 sets the body posture in the second displacement dimension correcting model to be identical to the body posture at the instantaneous value (the instantaneous value at current time t) of the simplified model gait, and determines second provisional corrected body position/posture (Pb22, θb22) (the pair of the second provisional corrected body position Pb22 and the second provisional corrected body posture θb22) such that the aforesaid condition 2 regarding the angular momentum product between the first displacement dimension correcting model and the second displacement dimension correcting model is satisfied. More accurately, the body posture in the second displacement dimension correcting model is set to be the same as the body posture of the simplified model gait, and then the aforesaid second element placement of the second displacement dimension correcting model is determined such that the aforesaid condition 2 is satisfied, and the body position/posture of the robot 1 corresponding to the position of the body mass point A1 and the posture of the body link in the second element placement are determined as the second provisional corrected body position/posture (Pb22, θb22). In the processing of this S102, the second provisional corrected body posture θb22 is set to be the same as the body posture of the simplified model gait, so that the processing of the S102 may be said to be virtually the processing for determining the second provisional corrected body position Pb22 so as to satisfy condition 2.

The processing of this S102 is executed by the subroutine processing of FIG. 12. This will be explained below. First, in S300, based on the instantaneous values of the simplified model gait (the instantaneous values of a desired motion, including desired body position/posture) at current time (present time) t, the positions of the mass points A1 to A5 and the posture angle of the body 3 (body link) having inertia of the first displacement dimension correcting model are determined. This processing is the same as the processing of S200 shown in FIG. 11, and the placement of the elements of the first displacement dimension correcting model to be determined is also the same as that determined by the processing of S200. Accordingly, the processing of S300 may be omitted if the placement of the elements of the first displacement dimension correcting model determined in S200 is directly used for the subroutine processing shown in FIG. 12.

Subsequently, the processing from S302 is executed to exploratorily determine the set of the positions of the mass points A1 to A5 of the second displacement dimension correcting model and the posture angle of the body 3 (body link) having inertia, that is, the foregoing second element placement of the second displacement dimension correcting model, that satisfies the foregoing condition 2 relative to the first displacement dimension correcting model, and the body position/posture of the robot 1 corresponding to the body mass point A1 and the posture of the body link in the second element placement are determined as the second provisional corrected body position/posture (Pb22, θb22). In this case, however, the second provisional corrected body posture θb22 is set to be identical to the instantaneous value of the simplified model gait (the instantaneous value at current time t). Hence, the processing from S302 is virtually the processing for determining the second provisional corrected body position Pb22 so that the aforesaid condition 2 is satisfied.

More detailedly, first, in S302, initial candidates (Pb22_s, θb22_s) of the second provisional corrected body position/posture are determined.

Specifically, Pb22_s of the initial candidates (Pb22_s, θb22_s) is determined according to the following expression 04b from the body position Pb of the simplified model gait at current time t, the value Pb_p of the body position of the simplified model gait at last time t−Δt, and the value Pb22_p of the second provisional corrected body position at last time t−Δt, and also determined according to the following expression 05b from the body posture θb of the simplified model gait at current time t.

$$Pb22\_s = Pb + (Pb22\_p - Pb\_p) \qquad \text{Expression 04b}$$

$$\theta b21\_s = \theta b \qquad \text{Expression 05}$$

Accordingly, the initial candidate Pb22_s of the second provisional corrected body position is determined as with the initial candidate Pb21_s of the first provisional corrected body position determined as explained in relation to the foregoing S202, while the initial candidate θb22_s of the second provisional corrected body posture is set to be identical to the body posture of the simplified model gait.

Subsequently, via S304, the loop processing of S306 to S316 is executed. In S306, the mass points A1 to A5 in the second displacement dimension correcting model are determined on the basis of the current candidates (Pb22_s, θb22_s) of the second provisional corrected body position/posture and desired position/posture of both feet of the simplified model gait at current time t. This processing is the same as that of the aforesaid S206 except for the values of the candidates (Pb22_s, θb22_s), and the mass points A1 to A5 in the second displacement dimension correcting model are determined according to the foregoing geometric restrictive condition (2) from the instantaneous motion obtained by substituting only the body position/posture out of the instantaneous motion of the simplified model gait at current time t by the candidates (Pb22_s, θb22_s).

Subsequently, the processing proceeds to S308 wherein the inter-model angular momentum product error L_err between the first displacement dimension correcting model and the second displacement dimension correcting model is determined. The determining method is the same as that for determining the inter-model angular momentum product error in the aforesaid S208. More specifically, the positions of the mass points A1 to A5 of the first displacement dimension correcting model determined in S300 are substituted into Pi1 of the foregoing expression (7), and the positions of the mass points A1 to A5 determined in S306 are substituted into Pi2 of the expression (7), and further, the current value θb22 (=θb of current time t) of the candidate of the second provisional corrected body posture is substituted into θb2 of expression (7), thereby calculating the inter-model angular momentum product error Lc_err. Incidentally, the foregoing expressions (8) to (10) may be used in place of expression (7).

Subsequently, the processing proceeds to S310 wherein it is determined whether L_err lies within a predetermined range in the vicinity of zero. If the result of the determination is YES, then the processing proceeds, via S312, to S318, which will be discussed later. On the other hand, if the result of the determination is NO, then the processing proceeds to S314 wherein a plurality of provisional candidates (Pb22_s+ΔPb22x, θb22_s) and (Pb22_s+ΔPb22z, θb22_s), which have been obtained by changing only the body position Pb22_s of the candidate by an extremely small amount, are determined in the vicinity of the current candidates (Pb22_s, θb22_s) of the second provisional corrected body position/posture. ΔPb22x and ΔPb22y denote predetermined values for changing the candidate Pb22_s of the first provisional corrected body position from a current value in the X-axis direction and the Y-axis direction by an extremely small amount. Then, the same processing as that of the foregoing S306 and S308 is carried out on these provisional candidates so as to determine the inter-model angular momentum product error L_err. This processing of S314 is the processing for observing the degrees of changes in L_err when only the candidate of the body position out of the candidates (Pb22_s, θb22_s) of the second provisional corrected body position/posture is changed from the current value.

Subsequently, the processing proceeds to S316 wherein new candidates of the second provisional corrected body position/posture are determined on the basis of L_err determined in S308 and S314 such that their values approach zero, and the determined candidates are substituted into (Pb22_s, θb22_s). The new candidates are determined using, for example, Jacobian (sensitivity matrix). Then, the processing from S306 is executed again.

As described above, by the loop processing from S306 to S316, the second provisional corrected body position that causes L_err to fall within a predetermined range in the vicinity of zero, i.e., the second provisional corrected body position that satisfies the aforesaid condition 2, with the second provisional corrected body posture set to be the same as the body posture of the simplified model gait, is exploratorily determined. Supplementally, the set of the second provisional corrected body position/posture, which are observed when the condition in S310 is satisfied, and the positions of the mass points, which are determined in S306 immediately before the S310, corresponds to the aforesaid second element placement. Further, the second element placement corresponds to "the third placement" in the first invention of the present invention.

And, if the result of the determination of S310 is YES, then the processing proceeds to S318 via S312, and current (Pb22_s, θb22_s) are decided as the second provisional corrected body position/posture (Pb22, θb22) at current time t. This provides a gait obtained by correcting the body position of a simplified model gait so that it satisfies the foregoing condition 2 (hereinafter referred to as the second provisional corrected gait in some cases). This second provisional corrected gait is obtained by correcting only the desired body position of the simplified model gait, and the remaining constituent elements, such as a desired body posture, desired foot position/posture, a desired ZMP and a desired floor reaction force vertical component, of the desired gait are the same as those of the simplified model gait. Further, the second provisional corrected gait is the same as an instantaneous desired gait determined according to the foregoing geometric restrictive condition (2) from the placement of the second displacement dimension correcting model (the above second element placement) when the condition in S310 is satisfied. Further, the motion of the second provisional corrected gait corresponds to the second provisional corrected instantaneous desired motion in the first invention of the present invention.

Hence, the processing of S102 constitutes the second provisional corrected motion determining means in the first invention of the present invention.

The above is the subroutine processing of S102.

Returning to the explanation of the flowchart of FIG. 10, after the processing of S102 is carried out as described above, the processing of S104 is carried out. This processing determines a reference value w1_aim related to weight w1 for determining a final displacement dimension corrected body position/posture from the first provisional corrected body position/posture and the second provisional corrected body position/posture mentioned above (hereinafter referred to as the weight reference value w1_aim). To be specific, if the operation mode of the robot 1 related to the current time gait is the running mode, then w1_aim=1, or if it is the low-friction floor surface walking mode, then w1_aim=0.5, or if it is an operation mode other than these (i.e., the normal mode), then w1_aim=0.

Then, in S106, the value of the weight w1 is determined such that the current value (the value determined at last time $t-\Delta t$) is gradually approximated to the weight reference value w1_aim determined as described above in S104 at the current time t. To be specific, for example, the value obtained by multiplying the difference between the current value of the weight w1 and the weight reference value w1_aim by a predetermined coefficient value (0<coefficient value<1) is added to the current value of the weight w1, thereby determining the weight w1 at the current time t. Thus, the weight w1 is determined such that it gradually follows, with a response delay, the weight reference value w1_aim. This processing is for avoiding a sudden change (a discontinuous change) of the value of the weight w1 when the weight reference value w1_aim changes because of a change of the operation mode of the robot 1. If the weight reference value w1_aim is steadily maintained at the same value, then the weight w1 will be eventually maintained at the same value as the weight reference value w1_aim.

Subsequently, in S108, another weight w2 is determined. This weight w2 is determined such that the sum of the weight w1 previously determined and the weight w2 becomes 1. More specifically, the weight w2 is determined according to the following expression 11.

$$w2 = 1 - w1 \quad \text{Expression 11}$$

Subsequently, in S110, the displacement dimension corrected body position/posture (Pb2, θb2) at current time t are lastly determined according to the following expressions.

$$Pb2 = w1*Pb21 + w2*Pb22 \quad \text{Expression 12}$$

$$\theta b2 = w1*\theta b21 + w2*\theta b22 \quad \text{Expression 13}$$

More specifically, the displacement dimension corrected body position Pb2 is determined as the total sum of the values obtained by multiplying the first provisional corrected body position Pb21 and the second provisional corrected body position Pb22 determined as described above at current time t by the weights w1 and w2, respectively, that is, the weighted mean value of the first provisional corrected body position Pb21 and the second provisional corrected body position Pb22. Further, the displacement dimension corrected body posture θb2 is determined as the total sum of the values obtained by multiplying the first provisional corrected body posture θb21 and the second provisional corrected body posture θb22 by the weights w1 and w2, respectively, that is, the weighted mean value of the first provisional corrected body posture θb21 and the second provisional corrected body posture θb22.

The processing of the displacement dimension gait correcting subroutine is carried out as described above to determine displacement dimension corrected body position/posture. Thus, the desired gait (hereinafter referred to as a displacement dimension corrected gait in some cases) is obtained by correcting the body position/posture of a simplified model gait. The displacement dimension corrected gait is obtained by correcting only desired body position/posture of the simplified model gait, whereas other constituent elements of the desired gait, such as desired foot position/posture, a desired ZMP, and a desired floor reaction force vertical component, remain to be the same as those of the simplified model gait.

Supplementally, the motion of the aforesaid displacement dimension corrected gait in the first embodiment corresponds to a corrected instantaneous desired motion in the first invention of the present invention. Hence, the processing of the displacement dimension gait correcting subroutine of S024 constitutes the desired motion correcting means in the first invention.

Here, referring to FIG. 14 to FIG. 16, a supplemental explanation will be given to the relationship among a simplified model gait, a gait obtained by correcting the body position/posture of the simplified model gait to the aforesaid first provisional corrected body position/posture (the aforesaid first provisional corrected gait), a gait obtained by correcting the body position/posture of the simplified model gait to the aforesaid second provisional corrected body position/posture (the aforesaid second provisional corrected gait), and a displacement dimension corrected gait. FIG. 14 illustrates a relationship between the positions of the mass points Ai and the posture angle of the body 3 (body link) of the second displacement dimension correcting model and the positions of the mass points Ai and the posture angle of the body 3 (body link) of the first displacement dimension correcting model, which are defined on the basis of the simplified model gait, when the positions of the mass points Ai (i=1, 2, ..., 5) and the posture angle of the body 3 (body link) of the second displacement dimension correcting model are determined exactly on the basis of the simplified model gait (i.e., if no correction is added to the simplified model gait in the aforesaid S024). In other words, it may be said that the positions of the mass points Ai and the posture angle of the body 3 of the second displacement dimension correcting model in this case, that is, the placement of the elements of the second displacement dimension correcting model, is determined according to the aforesaid geometric restrictive condition (2) from an instantaneous motion of the simplified model gait. In FIG. 14 mentioned above, the positions of the mass points Ai (i=1, 2, ..., 5) of the second displacement dimension correcting model corresponding to a simplified model gait are denoted by Pi2'(Ai).

Further, FIG. 15 illustrates the relationship between the positions of the mass points Ai and the posture angle of the body 3 (body link) of the second displacement dimension correcting model corresponding to the aforesaid first provisional corrected gait and the positions of the mass points Ai and the posture angle of the body 3 (body link) of the first displacement dimension correcting model. The placement of the elements of the second displacement dimension correcting model shown in FIG. 15 is the aforesaid first element placement of the second displacement dimension correcting model finally determined in S100 of the aforesaid FIG. 10 on the basis of the instantaneous values of the simplified model gait assumed in FIG. 14. This placement is the same as the one determined according to the aforesaid geometric restrictive condition (2) from the aforesaid first provisional corrected gait. In FIG. 15, the positions of the mass points Ai (i=1, 2, . . . , 5) of the second displacement dimension correcting model corresponding to the first provisional corrected gait are denoted by Pi21(Ai). The positions of the mass points Ai and the posture angle of the body 3 (body link) of the first displacement dimension correcting model shown in FIG. 15 are identical to those shown in FIG. 14.

FIG. 16 illustrates the relationship between the positions of the mass points Ai and the posture angle of the body 3 (body link) of the second displacement dimension correcting model corresponding to the aforesaid second provisional corrected gait and the positions of the mass points Ai and the posture angle of the body 3 (body link) of the first displacement dimension correcting model. The placement of the elements of the second displacement dimension correcting model shown in FIG. 16 is the aforesaid second element placement of the second displacement dimension correcting model finally determined in S102 of the aforesaid FIG. 10 on the basis of the instantaneous values of the simplified model gait assumed in FIG. 14. This placement is the same as the one determined according to the aforesaid geometric restrictive condition (2) from the aforesaid second provisional corrected gait. In FIG. 16, the positions of the mass points Ai (i=1, 2, . . . , 5) of the second displacement dimension correcting model corresponding to the second provisional corrected gait are denoted by Pi22(Ai). The positions of the mass points Ai and the posture angle of the body 3 (body link) of the first displacement dimension correcting model shown in FIG. 16 are identical to those shown in FIG. 14.

In the following explanation, generally, if the positional difference between an arbitrary mass point of the first displacement dimension correcting model and the mass point of the second displacement dimension correcting model corresponding thereto is regarded as translational acceleration, then this translational acceleration is referred to as the inter-model pseudo translational acceleration of the mass point. Similarly, if the difference in posture angle between a link having inertia of the first displacement dimension correcting model and the link of the second displacement dimension correcting model corresponding thereto is regarded as an angular acceleration, then this angular acceleration is referred to as the inter-model pseudo angular acceleration.

In the example shown in FIG. 14, at a position Pi2' of each mass point Ai of the second displacement dimension correcting model corresponding to a simplified model gait, mass points A2 and A4 of the supporting leg among mass points A2 to A5 of both legs 2 and 2 are slightly positionally deviated toward the front side of the robot 1 relative to the first displacement dimension correcting model. Further, mass points A3 and A5 of the free leg of the second displacement dimension correcting model are positionally deviated toward the rear side of the robot 1 relatively markedly relative to the first displacement dimension correcting model. Therefore, the overall center-of-gravity of the robot 1 in the second displacement dimension correcting model will be deflected toward the rear side of the robot 1 (in the negative direction of the X-axis) further than the overall center-of-gravity of the robot 1 (this coincides with the overall center-of-gravity of the robot 1 in a simplified model gait according to the present embodiment) in the first displacement dimension correcting model. In other words, the total sum of the translational force components of the inertial forces generated by the mass points A2 to A5 due to the inter-model pseudo translational acceleration of the mass points A2 to A5 of both legs 2 and 2 (=Masses of mass points A2 to A5 * Inter-model pseudo translational acceleration) will be relatively large toward the front side of the robot 1. In addition, the moment acting about a desired ZMP caused by the inertial forces produced by the mass points A2 to A5 due to the inter-model pseudo translational acceleration of the mass points A2 to A5 will be relatively large on the forward inclination side of the robot 1. In the present embodiment, the body posture of the simplified model gait and the body posture of the first displacement dimension correcting model are the same, so that the inter-model pseudo translational acceleration of the body mass point A1 is zero and the inter-model pseudo angular acceleration of the body link is also zero in the example of FIG. 14.

In comparison to the above, in the placement of the elements of the second displacement dimension correcting model corresponding to the aforesaid first provisional corrected gait (the first element placement), i.e., the placement of the elements of the second displacement dimension correcting model defined by the positions of the mass points Ai and the posture angle of the body link of the second displacement dimension correcting model finally determined in S100 of the aforesaid FIG. 10, the position of the body mass point A1 of the second displacement dimension correcting model is set at further front side than the body mass point A1 of the first displacement dimension correcting model, that is, the first provisional corrected body position is corrected to further front side than in a simplified model gait, so as to compensate for the deviations of the centers of gravity of the mass points A2 to A5 of the two legs 2 and 2, as shown in FIG. 15. At the same time, the positions of the mass points A1 to A5 and the posture of the body 3 having inertia in the second displacement dimension correcting model are determined such that the total sum of angular momentum products described above takes a fixed value. In the example illustrated, the body posture (the posture of the body 3 indicated by the solid line) in the second displacement dimension correcting model is inclined toward the rear by an angle of θb21-θb with respect to the body posture of the simplified model gait (the posture of the body 3 indicated by the dashed line).

Hence, at the positions of the mass points Ai and the posture angle of the body link of the second displacement dimension correcting model corresponding to the first provisional corrected gait, the total sum of the translational force components of the inertial forces produced due to the inter-model pseudo translational acceleration of the mass points Ai will be smaller than in the case shown in FIG. 14 and reduced to substantially zero, and the total sum of the moments acting about a desired ZMP generated by the inertial forces will approximate a predetermined value (a value corresponding to "the predetermined value" in the aforesaid condition 2) further than in the case shown in FIG. 14.

Thus, the first provisional corrected gait compensates for the influences of the inertial forces generated due to the motions of the legs, which are not taken into account in a simplified model gait, to provide a corrected desired motion (more specifically, a desired body position and a desired body posture) of the robot 1 so that a floor reaction force similar to a desired floor reaction force of the simplified model gait (a translational floor reaction force and a floor reaction force moment, more precisely, the floor reaction force produced by a simplified model due to the simplified model gait) is generated. With this arrangement, the actual floor reaction force generated when the actual robot 1 is operated exactly in accordance with a motion of the first provisional corrected gait will be closer to a desired floor reaction force (=Floor reaction force of the simplified model gait) than the actual floor reaction force is, which is generated when the actual robot 1 is operated exactly in accordance with a motion of the simplified model gait. This means that the dynamic accuracy between the motion and a floor reaction force of a first provisional corrected gait (a translational floor reaction force and a floor reaction force moment) is higher than the dynamic accuracy between the motion and a floor reaction force of a simplified model gait.

Meanwhile, in the placement of the elements of the second displacement dimension correcting model corresponding to the aforesaid second provisional corrected gait (the second element placement), i.e., the placement of the elements of the second displacement dimension correcting model defined by the positions of the mass points Ai and the posture angle of the body link of the second displacement dimension correcting model finally determined in S102 shown in FIG. 10 mentioned above, the positions of the mass points A1 to A5 of the second displacement dimension correcting model are determined such that the total sum of angular momentum products mentioned above takes a fixed value, while the body posture is maintained at the same instantaneous body posture of a simplified model gait, as shown in FIG. 16.

Therefore, at the positions of the mass points Ai and the posture angle of the body link of the second displacement dimension correcting model corresponding to the second provisional corrected gait, the total sum of the moments acting about a desired ZMP due to the inertial forces from the inter-model pseudo translational acceleration of the mass points Ai approximates more to a predetermined value (the value corresponding to "the fixed value" of the aforesaid condition 2) than in the case illustrated in FIG. 14.

Thus, the second provisional corrected gait is obtained by correcting the desired body position of the robot 1 such that a floor reaction force moment similar to the floor reaction force moment of the simplified model gait is generated, compensating for the influences of the inertial forces generated due to the motions of the legs, which are not taken into account in the simplified model gait, while maintaining the desired body posture of the robot 1 at the same body posture of the simplified model gait. According to the second provisional corrected gait, the actual floor reaction force moment generated when the actual robot 1 is operated exactly in accordance with a motion of the gait will be closer to a desired floor reaction force moment (=Floor reaction force moment of the simplified model gait) than the actual floor reaction force moment is, which is generated when the actual robot 1 is operated exactly in accordance with a motion of the simplified model gait. This means that the dynamic accuracy between a motion and a floor reaction force moment of a second provisional corrected gait will be higher than the dynamic accuracy between a motion and a floor reaction force moment of a simplified model gait. However, when a second provisional corrected gait is determined (the second element placement of the second displacement dimension correcting model is determined), the difference in the overall center-of-gravity between the first and the second displacement dimension correcting models is not considered; therefore, the dynamic accuracy between a motion and a translational floor reaction force of the second provisional corrected gait will not be necessarily higher than the dynamic accuracy between a motion and a translational floor reaction force of a simplified model gait.

The body position/posture of the displacement dimension corrected gait, i.e., the displacement dimension corrected body position/posture, which are finally determined by the displacement dimension gait correcting subroutine of S024 from the body position/posture of the first provisional corrected gait and the body position/posture of the second provisional corrected gait, as described above, are determined by the aforesaid expression 12 and expression 13. In this case, if the operation mode of the robot 1 steadily remains the normal mode (an operation mode other than the running mode and the low-friction floor surface walking mode, i.e., an operation mode for performing, for example, the walking of the robot 1 on a typical floor surface with a high friction coefficient) (at this time, w1=0, w2=1), then the displacement dimension corrected body posture is maintained at the posture assumed in a simplified model (reference posture), specifically, the vertical posture in the present embodiment, and the displacement dimension corrected body position will be the same as the body position of the second provisional corrected gait (the second provisional corrected body position). Hence, the displacement dimension corrected gait will be a gait obtained by correcting the body position of the simplified model gait without changing the body posture (without correcting the body posture), thus making it possible to achieve higher dynamic accuracy between a motion and a floor reaction force moment of a displacement dimension corrected gait than that of the simplified model gait. In other words, if the actual robot 1 is operated according to the motion of the displacement dimension corrected gait, then a desired ZMP will be satisfied with higher accuracy than in a case where the actual robot 1 is operated according to a motion of the simplified model gait.

Further, if the operation mode of the robot 1 is steadily the running mode (at this time, w1=1, w2=0), then the displacement dimension corrected body posture and the displacement dimension corrected body position will be respectively identical to the body posture of the first provisional corrected gait (the first provisional corrected body posture). Hence, the displacement dimension corrected gait will be a gait obtained by correcting both the body position and the body posture of the simplified model gait so as to make it possible to achieve higher dynamic accuracy between a motion and a floor reaction force (a translational floor reaction force and a floor reaction force moment) of a displacement dimension corrected gait than in a simplified model gait. Supplementally, the running mode inevitably includes a period during which a desired floor reaction force vertical component is close to zero (a period during which the friction force between the robot 1 and a floor surface is extremely small). In such a period, generally, the translational acceleration of the body 3 cannot be manipulated; therefore, a desired ZMP cannot be satisfied with the body posture maintained at a constant posture, so that the body posture has to be changed. In the present embodiment, therefore, if the operation mode of the robot 1 is steadily the running mode, then priority is given to higher dynamic accuracy of a displacement dimension corrected gait, and an arrangement is made to cause the posture of the displacement dimension corrected body to be identical to the first provisional corrected body posture.

If the operation mode of the robot 1 is steadily the low-friction floor surface walking mode (at this time, w1=w2=0.5), then the displacement dimension corrected body posture will be set at a posture angle that is half the body posture angle of the first provisional corrected gait (a body posture angle having a smaller inclination angle relative to a vertical direction than the body posture angle of the first provisional corrected gait, more precisely, the sum of the half of the body posture angle of the first provisional corrected gait and the half of the body posture angle of the second provisional corrected gait), and the displacement dimension corrected body position will be set to a mid position between the body position of the first provisional corrected gait and the body position of the second provisional corrected gait. Thus, the displacement dimension corrected gait will be obtained by correcting both the body position and the body posture of the simplified model gait such that the dynamic accuracy between a motion and a floor reaction force (a translational floor reaction force and a floor reaction force moment) of the displacement dimension corrected gait is higher than that in the simplified model gait, while restraining a change in the body posture. In this case, it is possible to prevent the translational inertial force horizontal component generated by the robot 1 due to the motion of a displacement dimension corrected gait from becoming excessive by setting the displacement dimension corrected body position at the midpoint between the body position of the first provisional corrected gait and the body position of the second provisional corrected gait. At the same time, setting the displacement dimension corrected body posture at an inclination angle that is smaller than the body posture angle of the first provisional corrected gait makes it possible to satisfy a desired ZMP while restraining a change in the body posture. Thus, when the operation mode of the robot 1 is steadily the low-friction floor surface walking mode, the displacement dimension corrected gait will be a gait that enables the robot 1 to perform a stable operation while achieving higher dynamic accuracy than in a simplified model gait and while minimizing a change in the body posture and also preventing the robot 1 from slipping.

When the operation mode of the robot 1 is changed, the value of the weight w1 (eventually w2) is gradually changed by the processing of S106 shown in FIG. 10 mentioned above, so that a displacement dimension corrected body posture or a displacement dimension corrected body position will not be suddenly changed.

Returning to the explanation of FIG. 9, after the displacement dimension gait correcting subroutine is carried out as described above, the processing proceeds to S026 wherein the operation of the arms for canceling a spin (a rotation about the vertical axis) of the robot 1 is determined. This processing is performed to determine the postures of the arms so as to produce a floor reaction force moment by swinging the arms (a motion for swinging both arms back and forth in the opposite directions from each other), the floor reaction force moment being in the opposite direction from the vertical component of a floor reaction force moment generated about a desired ZMP when the robot 1 is moved according to a desired gait without swinging the arms of the robot 1. The processing is executed in the same manner as that of S034 of FIG. 13 in publication document 1 mentioned above. The details thereof are included in the publication document 1, so that no further explanation will be given herein.

Next, the processing proceeds to S028 wherein the instantaneous value of a ZMP permissible range and the instantaneous value of a floor reaction force horizontal component permissible range of full model correction (for the processing of the full model corrector 10e mentioned above) are determined. This is the processing executed by the aforesaid desired instantaneous value generator 100b on the basis of the gait parameters that define the ZMP permissible range and the floor reaction force horizontal component permissible range out of the current time gait parameters determined in S020 described above.

Subsequently, the processing proceeds to S030 wherein a corrected gait using the full model is generated. This processing is carried out by the full model corrector 10e, and it is the same processing as that of S038 of FIG. 13 of publication document 1 and therefore it is carried as described in the publication document 1. Hence, no further detailed explanation will be given in the present description. By this processing, the corrected desired body position/posture and a corrected desired floor reaction force moment are determined by further correcting the desired body position/posture (the body position/posture of the aforesaid displacement dimension corrected gait).

The full model used in the aforesaid full model corrector 10e is a multi-mass-point model having mass points in the body 3, the hip joints of the legs 2, the thigh links, the crus links, the ankle joints, and the feet 22 of the robot 1, and inertia Ib in the body 3 (the body link), as shown in, for example, FIG. 17. In this case, inertia may be set in other links in addition to the body 3.

This completes the explanation of the gait generation processing carried out by the gait generating device 100 in the present embodiment.

Referring now to FIG. 4, the operation of the composite-compliance control unit 101 will be explained. The operation of the composite-compliance control unit 101 is explained in detail in, for example, Japanese Unexamined Patent Application Publication No. 10-277969 filed previously by the present applicant, so that only a brief explanation will be given in the present description. In the gait generating device 100, corrected desired body position/posture (trajectory) and desired arm postures (trajectory) of the desired gait that has been generated as described above are sent out to the robot geometric model (inverse kinematics calculator) 102.

Further, desired foot position/posture (trajectory), a desired ZMP trajectory (a desired total floor reaction force central point trajectory), and a desired total floor reaction force (trajectory) (a corrected desired floor reaction force moment and a desired floor reaction force vertical component) are sent to a composite-compliance operation determiner 104 and also to a desired floor reaction force distributor 106. Then, in the desired floor reaction force distributor 106, the floor reaction force is distributed to the feet 22, and a desired floor reaction force central point of each foot and a desired floor reaction force of each foot are determined. The desired floor reaction force central point of each foot and desired floor reaction force of each foot, which have been determined, are sent to the composite-compliance operation determiner 104.

The corrected desired foot position/posture (trajectory) with deformation compensation are sent from the composite-compliance operation determiner 104 to the robot geometric model 102. The corrected desired foot position/posture with deformation compensation means the desired foot position/posture of each foot 22 that have been corrected such that an actual floor reaction force detected by the six-axis force sensor 50 approximates a desired floor reaction force, considering the deformation of the compliance mechanism 72 of each leg 2. Upon receipt of the desired body position/posture (trajectory) and the corrected desired foot position/posture with deformation compensation (trajectory), the robot geometric model 102 calculates joint displacement commands (values) for twelve joints of the legs 2 and 2 that satisfy them and sends the calculated commands (values) to the displacement controller 108. The displacement controller 108 uses the joint displacement commands (values) calculated by the robot geometric model 102 as desired values to carry out follow-up control of the displacement of the twelve joints of the robot 1. The robot geometric model 102 also calculates displacement command (values) of arm joints that satisfy desired arm postures and sends the calculation results to the displacement controller 108. The displacement controller 108 uses the joint displacement commands (values) calculated by the robot geometric model 102 as desired values to carry out follow-up control of the displacement of the twelve joints of the arms of the robot 1.

A floor reaction force (more specifically, an actual floor reaction force of each foot) generated in the robot 1 is detected by the six-axis force sensor 50. The detected value is sent to the composite-compliance operation determiner 104.

Further, posture inclination errors θerrx, θerry that have occurred in the robot 1 (more specifically, actual body posture angle errors relative to a desired body posture angle, a posture angle error in the roll direction (about the X-axis) being denoted by θerrx and a posture angle error in the pitch direction (about the Y-axis) being denoted by θerry) are detected through the intermediary of the posture sensor 54, and the detection values are supplied to a posture stabilization control calculator 112. The posture stabilization control calculator 112 calculates a compensating total floor reaction force moment about a desired total floor reaction force central point (desired ZMP) for resetting the body posture angle of the robot 1 to a desired body posture angle, and sends the calculation result to the composite-compliance operation determiner 104. The composite-compliance operation determiner 104 corrects a desired floor reaction force on the basis of the input value. Specifically, the desired floor reaction force is corrected such that a compensating total floor reaction force moment or the sum of a compensating total floor reaction force moment and a corrected desired floor reaction force moment acts about a desired total floor reaction force central point (desired ZMP).

The composite-compliance operation determiner 104 determines the corrected desired foot position/posture with deformation compensation (trajectory) such that the state and floor reaction force of an actual robot calculated from the detection values of sensors agree with the corrected desired floor reaction force. However, it is practically impossible to match every state with a desired value, so that a trade-off relationship is imparted to them to make them agree as much as possible compromisingly. More specifically, a weight is added to a control error relative to each desired value, and control is carried out to minimize a weighted average of a control error (or the square of a control error). Thus, actual foot position/posture and total floor reaction force are controlled to approximately follow a desired foot position/posture and a desired total floor reaction force.

Second Embodiment

A second embodiment in accordance with the present invention will now be explained with reference to FIG. 18 to FIG. 22. In the present embodiment, the constructions of a robot 1 and a control unit 60 are the same as those in the first embodiment, whereas a simplified model, a first displacement dimension correcting model, and a part of the processing of a gait generating device 100 are different from those of the first embodiment. Hence, in the explanation of the present embodiment, the same reference numerals and drawings as those in the first embodiment will be used for the same parts as those in the first embodiment, and detailed explanation thereof will be omitted. The second embodiment represents an embodiment of the first, the third, the fourth, the seventh to the tenth, and the thirteenth to the fifteenth inventions of the present invention.

FIG. 19 shows a structure of a simplified model (dynamic model) in the present embodiment, and FIG. 18 shows a structure of a first displacement dimension correcting model in the present embodiment.

The simplified model according to the present embodiment shown in FIG. 18 is a model constructed of three mass points, namely, two foot mass points 2m2, 2m2 corresponding to legs 2 (more specifically, feet 22 of the legs 2) of the robot 1 and a body mass point 3m2 corresponding to a body 3, and a flywheel FH having inertia J but no mass. This model is the same as the model shown in FIG. 11 of publication document 1 mentioned above. Therefore, no detailed explanation will be given in the present description, and only an overview will be provided below.

The simplified model is constructed so that the dynamics of the foot mass points 2m2, 2m2 (the relationship between motions and floor reaction forces) and the dynamics of the body mass point 3m2 and the flywheel FH do not interfere with each other, the dynamics of the entire robot 1 being expressed by their linear connections. A floor reaction force generated by a rotational motion of the flywheel FH corresponds to a floor reaction force generated by a rotational motion of a posture angle of the body 3 (a rotational motion for changing only a floor reaction force moment without changing a translational floor reaction force). The body mass point 3m2 is set at a point uniquely defined on the basis of the position/posture of the body 3 (a certain fixed point on a local coordinate system that has been arbitrarily fixed on the body 3), and the leg mass points 2m2 are set at points uniquely defined on the basis of positions/postures of feet 22 of the legs 2 (certain fixed points on a local coordinate system arbitrarily fixed on the feet 22). The total sum of the masses of the mass points 2m2, 2m2 and 3m2 is identical to the total mass of the robot 1. The mass of the body mass point 3m2 includes the mass of the body 3 and the masses of both arms.

The expressions (dynamic equations) describing the dynamics of the simplified model are represented by the following expressions 14 to 16. However, for the convenience of understanding of the present description, only the equations of motions on a sagittal plane (a plane that includes a longitudinal axis (X-axis) and a vertical axis (Z-axis)) will be described, and equations of motions on a lateral plane (a plane that includes a lateral axis (Y-axis) and a vertical axis (Z-axis)) will be omitted here. The variables of Expressions 14 to 16 are defined as follows: Zsup: Vertical position of supporting leg foot mass point; Zswg: Vertical position of free leg foot mass point; Zb: Vertical position of body mass point; Xsup: Horizontal position of supporting leg foot mass point; Xswg: Horizontal position of free leg foot mass point; Xb: Horizontal position of body mass point; θby: Body posture angle about Y-axis relative to vertical direction; mb: Mass of body mass point; msup: Mass of supporting leg foot mass point; mswg: Mass of free leg foot mass point; J: Inertial moment of flywheel; Fx: Horizontal component of floor reaction force; Fz: Vertical component of floor reaction force; and My: Floor reaction force moment about desired ZMP (specifically, a component of floor reaction force moment about the lateral axis (Y-axis)).

$$Fz = mb*(g + d2Zb/dt2) + \\ msup*(g + d2Zsup/dt2) + mswg*(g + d2Zswg/dt2)$$

Expression 14

$$Fx = mb*d2Xb/dt2 + \\ msup*d2Xsup/dt2 + mswg*d2Xswg/dt2$$

Expression 15

$$My = -mb*(Xb - Xzmp)*(g + d2Zb/dt2) + \\ mb*(Zb - Zzmp)*(d2Xb/dt2) - \\ msup*(Xsup - Xzmp)*(g + d2Zsup/dt2) + \\ msup*(Zsup - Zzmp)*(d2Xsup/dt2) - \\ mswg*(Xswg - Xzmp)*(g + d2Zswg/dt2) - \\ mswg*(Zswg - Zzmp)*(d2Xswg/dt2) + \\ J*d2\theta by/dt2$$

Expression 16

In the second embodiment using such a simplified model, a simplified model gait that satisfies a desired ZMP is generated in exactly the same manner as that in the aforesaid publication document 1, as it will be discussed later.

Supplementally, the simplified model according to the second embodiment ignores an inertial force generated by a motion of a part in the vicinity of the knee joint due to a bending operation of the knee joint of each leg 2. In other words, the simplified model according to the second embodiment may be said to be a dynamic model constructed, assuming that the inertial force produced by a motion of a part in the vicinity of a knee joint due to a bending operation of the knee joint of each leg 2 is zero.

Referring now to FIG. 19, a first displacement dimension correcting model of the present embodiment will be explained. This model is a five-mass-point model having a body mass point A1, thigh mass points A2 and A3, and foot mass points A4 and A5 corresponding to the body 3, the thigh links of the legs 2, and the feet 22, respectively. It is assumed that the body 3 (body link) of the robot 1 has inertia (inertial moment) Ib about the body mass point A1. In other words, the first displacement dimension correcting model of the present embodiment is constructed of the mass points A1 to A5 and the body link having the inertia as its elements, just like the first and the second displacement dimension correcting models of the first embodiment.

In this case, the body mass point A1 and the foot mass points A4 and A5 are set at points uniquely defined on the basis of the positions/postures of the parts (the body 3 and the feet 22) corresponding thereto (certain fixed points on local coordinate systems fixedly set arbitrarily on the parts corresponding thereto) as with those of the first or the second displacement dimension correcting model in the aforesaid first embodiment. The total sum of the masses of the body mass point A1, the foot mass points A4 and A5, and the thigh mass points A2 and A3 coincides with the total mass mtotal of the robot 1. The mass of the body mass point A1 includes the masses of both arms 5 and 5 and the head 4 in addition to the mass of the body 3.

A certain geometric restrictive condition is set on the placement of the elements of the first displacement dimension correcting model also in the present embodiment. Specifically, in the first displacement dimension correcting model, the knee joint of each leg 2 of the robot 1 is regarded as a direct-acting type (telescopic type) joint that expands/contracts only in a direction for connecting the center of the ankle joint and the center of a hip joint of the leg 2, and each of the thigh mass points A2 and A3 is set at an internally dividing point of a segment connecting the center of the ankle joint and the center of the hip joint of its corresponding leg 2. The internally dividing point is a point at which the ratio of the distance from the internally dividing point to the center of the ankle joint to the distance therefrom to the center of the hip joint becomes a predetermined ratio, and it is a point in the vicinity of the knee joint when each leg 2 is linearly stretched (e.g., a point slightly deflected to the thigh link 24 from the center of the knee joint). Accordingly, in the first displacement dimension correcting model of the present embodiment, each of the thigh mass points A2 and A3 is restricted to the internally dividing point of a segment that connects the center of the ankle joint and the center of the hip joint of its corresponding leg 2.

The thigh mass points A2 and A3 may alternatively be set at a point offset by a predetermined distance from the internally dividing point in a direction orthogonal to the aforesaid segment. In other words, the thigh mass points A2 and A3 may be set on a straight line parallel to the segment that is apart from the aforesaid segment by a predetermined distance.

Further, the positions of the mass points A1 to A5 of the first displacement dimension correcting model on the global coordinate system and the posture angle of the body 3 (body link) are to be geometrically defined on the basis of the instantaneous values of the motions of a simplified model gait. More specifically, the position of the body mass point A1 of the first displacement dimension correcting model in the present embodiment on the global coordinate system is determined to be a position corresponding to the body position/posture of the simplified model gait, while the positions of the foot mass points A4 and A5 on the global coordinate system are determined to be the positions corresponding to the foot positions/postures of the simplified model gait. Further, the posture angle of the body link is set to be identical to the body posture of the simplified model gait. The positions of the thigh mass points A2 and A3 on the global coordinate system are determined to be the positions of the aforesaid internally dividing points defined on the basis of the body position/posture and the foot positions/postures of the simplified model gait. This means that the positions of the central points of the hip joints and the ankle joints of the legs 2 on the global coordinate system are uniquely defined on the basis of the body position/posture and the foot positions/postures of the robot 1, so that the positions of the thigh mass points A2 and A3 on the global coordinate system as the internally dividing points of the segments that connect the central points of the hip joints and the central points of ankle joints of the legs 2 are defined.

Further, in the first displacement dimension correcting model of the second embodiment, a predetermined ratio related to the aforesaid internally dividing points and the mass ratio of the mass points A1 to A5 are determined such that the overall center-of-gravity of the mass points A1 to A5 coincides with the position of the overall center-of-gravity of the robot 1 on a simplified model, that is, the position of the center-of-gravity of all mass points $2m2$, $2m2$, and $3m2$ of the simplified model.

Here, determining the placement of the elements of the first displacement dimension correcting model as described above in the second embodiment is equivalent to determining the placement of the elements of the first displacement dimension correcting model according to a geometric restrictive condition (3) from instantaneous motions of a simplified model gait when the geometric restrictive condition (3) for establishing the placement of the elements of the first displacement dimension correcting model (the positions of the mass points A1 to A5 on a global coordinate system and the posture of the body link) is defined as shown below.

Geometric restrictive condition (3): Relative to a given arbitrary instantaneous desired motion, the placement of the body mass point A1 and the body link among the elements of the first displacement dimension correcting model agrees with the placement determined on the basis of the position/posture of the body 3 of the robot 1 in a given instantaneous desired motion, the position of each of the foot mass points A4 and A5 agrees with the placement determined on the basis of the position/posture of each foot of the robot 1 in the given instantaneous desired motion, and the position of each of the thigh mass points A2 and A3 agrees with the position of a predetermined internally dividing point on the segment that connects the center of the hip joint and the center of the ankle joint of each leg 2 in the given instantaneous desired motion.

In the second embodiment, this geometric restrictive condition (3) corresponds to the first geometric restrictive condition in the present invention.

In the present embodiment, the second displacement dimension correcting model has the same structure as the structure thereof in the first embodiment shown in FIG. 8 described above, and includes a body mass point A1, thigh mass points A2 and A3, and foot mass points A4 and A5, and also has inertia Ib in the body link, as with the first displacement dimension correcting model in the present embodiment (the second embodiment). In this case, the positions of the body mass point A1 and the foot mass points A4 and A5 on the local coordinate systems fixed to their corresponding parts (the body 3 and feet 22) are the same as those in the first displacement dimension correcting model of FIG. 19. Moreover, the masses of the mass points A1 to A5 are the same as those of the first displacement dimension correcting model of FIG. 19. In the second displacement dimension correcting model, the mass points A1 to A5 and the body 3 (body link) can be moved to the positions/postures corresponding to an arbitrary posture state that the robot 1 may take. This means that the geometric restrictive condition (2) explained in the aforesaid first embodiment is established between an arbitrary instantaneous desired motion of the robot 1 and the placement of the elements of the second displacement dimension correcting model.

Next, the processing of the gait generating device 100 in the present embodiment (the second embodiment) will be explained in detail. The basic processing procedure of the gait generating device 100 in the present embodiment is the same as that of the first embodiment, and a gait is generated according to the flowchart of FIG. 9 mentioned above.

Specifically, the processing from S010 to S018 is implemented in the same manner as that of the first embodiment. The processing is the same as that of the first embodiment.

Then, the processing of S020 is carried out after S018 to determine the gait parameters of a current time gait. More specifically, the parameters of a desired foot position/posture trajectory, a desired arm posture trajectory, a desired ZMP trajectory, and a desired floor reaction force vertical component trajectory of the current time gait are determined, and the parameters that define a reference body posture trajectory, a floor reaction force horizontal component permissible range, and a ZMP permissible range are determined. In this case, the simplified model in the present embodiment is identical to the dynamic model used in the publication document 1, as described above; therefore, the gait parameters of the current time gait are determined by carrying out, in S020 of the present embodiment, the same processing as the processing of S022 to S030 of FIG. 13 of the publication document 1.

In the processing of S022 to S028 of FIG. 13 in the publication document 1, a floor reaction force horizontal component permissible range for simplified model gaits is set and used mainly to prepare normal gaits. In the present embodiment, the floor reaction force horizontal component permissible range for simplified model gaits may be, for example, the same as the floor reaction force horizontal component permissible range for full model correction set in S30 of FIG. 13 in the publication document 1, or may be set to be a range that is wider than that. Alternatively, as with the first embodiment of the present description, the floor reaction force horizontal component permissible range for simplified model gaits may be defined to be an infinite range or a wide range so that the floor reaction force horizontal components of simplified model gaits (or normal gaits) always fall within the floor reaction force horizontal component permissible range.

Subsequently, after the processing of S020 of FIG. 9, or if a determination result of S016 is NO, the processing advances to S022 wherein the instantaneous value of a current time gait (simplified model gait) is determined on the basis of gait parameters (the gait parameters determined in S020). In this case, the simplified model in the present embodiment is identical to the dynamic model used in the publication document 1 as described above, so that the instantaneous value of a simplified model gait is determined by carrying out, in S022 of the present embodiment, the same processing as the processing of S032 of FIG. 13 in the publication document 1.

To be more specific, the instantaneous values of desired foot position/posture, a desired ZMP, a desired arm posture, a desired floor reaction force vertical component, and a reference body posture are determined on the basis of the gait parameters determined in S020. Furthermore, the instantaneous values of the desired body position/posture are determined such that, on the simplified model of FIG. 16 described above, the horizontal component of the moment generated about the desired ZMP by the resultant force of the inertial force produced by a motion of the robot 1 and gravity becomes zero, and the floor reaction force horizontal component does not exceed a floor reaction force horizontal component permissible range for simplified model gaits. Supplementally, regarding the instantaneous values of the desired body position/posture, the desired body position vertical component is determined on the basis of the vertical position of the body mass point $3m2$ of the simplified model determined from the desired floor reaction force vertical component and the aforesaid expression 14. And, during a period in which the desired floor reaction force vertical component is relatively large, the desired body posture and the desired body position horizontal component are determined by mainly adjusting the horizontal acceleration of the body 3 such that the instantaneous value of the desired body posture approximates a reference body posture (e.g., a vertical posture) while the horizontal component of the moment about the desired ZMP becomes zero. During a period in which the desired floor reaction force vertical component is relatively small or zero, the instantaneous values of the desired body posture and the desired body position horizontal component are determined by mainly adjusting angular acceleration of the posture angle of the body 3 such that the horizontal component of the moment about the desired ZMP becomes zero while the horizontal acceleration of the body 3 is controlled to substantially zero (strictly speaking, the horizontal acceleration of the overall center-of-gravity is controlled to substantially zero) at the same time.

The floor reaction force horizontal component permissible range for simplified model gaits used for the processing of S022 may be the same as that used for the processing of S020 described above.

Subsequently, the processing advances to S024 to execute a displacement dimension correcting subroutine. The basic processing procedure of this subroutine processing is the same as that of the aforesaid first embodiment, and it is carried out according to the flowchart of FIG. 10 mentioned above. Specifically, first, in S100, the first provisional corrected body position/posture (Pb21, θb21) are determined such that the aforesaid condition 1 related to centers of gravity and the aforesaid condition 2 related to angular momentum products between the first displacement dimension correcting model and the second displacement dimension correcting model are satisfied, as with the first embodiment described above. This processing is executed by the subroutine processing of FIG. 11, as with the first embodiment.

Specifically, in S200, the positions of the mass points A1 to A5 of the first displacement dimension correcting model and the posture angle of the body 3 (body link) having inertia are determined on the basis of the instantaneous values (the instantaneous values of a desired motion, such as desired body position/posture) of the simplified model gait at current time (present time) t. In this case, as described above, the position of the body mass point A1 of the first displacement dimension correcting model is determined to be the position based on the instantaneous values of the body position/posture of the simplified model gait, and the positions of the foot mass points A4 and A5 of the global coordinate system are determined to be the positions based on the foot positions/postures of the simplified model gait. The position of each of the thigh mass points A2 and A3 is determined to be the position of the internally dividing point obtained by internally dividing the segment, which connects the central point of the hip joint and the central point of the ankle joint of each leg 2 of the robot 1 established on the basis of the body position/posture and the position/posture of each foot of the simplified model gait, by a predetermined ratio. Further, the posture angle of the body link of the first displacement dimension correcting model is set to be identical to the body posture angle of the simplified model gait.

Thus, the placement of each element of the first displacement dimension correcting model is determined from an instantaneous motion (the instantaneous value at the current time t) of a simplified model gait according to the geometric restrictive condition (3) associated with the first displacement dimension correcting model in the present embodiment. The placement of the elements of the first displacement dimension correcting model corresponds to the "first placement" in the first invention of the present invention.

Then, the processing from S202 to S218 is carried out. The processing is the same as that in the first embodiment. More specifically, the first provisional corrected body position/posture that satisfy the aforesaid conditions 1 and 2 are exploratorily determined, and the obtained values are determined as the first provisional corrected body position/posture (Pb21, θb21) at the current time t. This provides the gait (the first provisional corrected gait) obtained by correcting the body position/posture of a simplified model gait such that the aforesaid conditions 1 and 2 are satisfied. The motion of the first provisional corrected gait is the same as the instantaneous desired motion determined according to the aforesaid geometric restrictive condition (2) from the placement of the second displacement dimension correcting model (the aforesaid first element placement) when the condition in S210 is satisfied.

Supplementally, according to the present embodiment, the positions of the mass points A4 and A5 of both feet of each displacement dimension correcting model are identical to those of both displacement dimension correcting models. Therefore, terms related to the mass points A4 and A5 of both feet may be omitted when calculating the inter-model overall center-of-gravity error Gc_err and the inter-model angular momentum product error L_err in S208.

After the processing of S100 is executed as described above, the processing of S102 is executed in the same manner as that in the aforesaid first embodiment to determine the second provisional corrected body position/posture (Pb22, θb22) such that the aforesaid condition 2 related to angular momentum products between the first displacement dimension correcting model and the second displacement dimension correcting model is satisfied, the body posture in the second displacement dimension correcting model being set to be identical to the body posture in the instantaneous value (the instantaneous value at the current time t) of a simplified model gait. In the processing of S102, the second provisional corrected body posture θb22 is set to be the same as the body posture of the simplified model gait; hence, the processing of S102 may be said to be virtually the processing for determining the second provisional corrected body position Pb22 such that the condition 2 is satisfied.

This processing is executed by the subroutine processing of FIG. 12, as with the first embodiment.

To be specific, in S300, the positions of the mass points A1 to A5 of the first displacement dimension correcting model and the posture angle of the body 3 (body link) having inertia are determined on the basis of the instantaneous values of the simplified model gait at current time (present time) t. The processing and the placement of the elements of the first displacement dimension correcting model determined thereby are the same as those of the processing of S200 of FIG. 11 in the present embodiment. Hence, in the present embodiment also, the processing of S300 may be omitted if the placement of the elements of the first displacement dimension correcting model determined in S200 is used as it is in the subroutine processing of FIG. 12.

Subsequently, the processing from S302 to S318 is carried out as with the first embodiment. The processing is the same as that in the first embodiment. More specifically, the second provisional corrected body position/posture that has the same body posture as the body posture of the simplified model gait and satisfies the aforesaid condition 2 are exploratorily determined, and the obtained values are set as the second provisional corrected body position/posture (Pb22, θb22) at the current time t. This provides the gait obtained by correcting only the body position of a simplified model gait such that the aforesaid condition 2 is satisfied (the second provisional corrected gait). The second provisional corrected gait is the same as the instantaneous desired gait determined according to the aforesaid geometric restrictive condition (2) from the placement of the second displacement dimension correcting model (the aforesaid second element placement) when the condition in S310 is satisfied.

Supplementally, according to the present embodiment, the positions of the mass points A4 and A5 of both feet of each displacement dimension correcting model are identical to those of both displacement dimension correcting models. Therefore, as with the processing of the aforesaid S208, the terms related to the mass points A4 and A5 of both feet may be omitted when calculating the inter-model angular momentum product error L_err in S308.

After the processing of S102 is executed as described above, the processing from S104 to S110 is executed in the same manner as that in the first embodiment. The processing is exactly the same as that in the first embodiment. Thus, the displacement dimension corrected body position/posture (Pb2, θb2) at the current time t are determined, providing a displacement dimension corrected gait obtained by correcting the body position/posture of the simplified model gait.

In the present embodiment (the second embodiment), after the processing of S024 of FIG. 9 (the displacement dimension gait correcting subroutine) is carried out, as discussed above, the processing of S026 to S032 is carried out in the same manner as that in the first embodiment. The processing is the same as that in the first embodiment.

The operation of the composite-compliance control unit 101 to which desired gaits generated by the gait generating device 100 explained above are supplied is the same as that in the aforesaid first embodiment.

Supplementally, the processing of the displacement dimension gait correcting subroutine in the second embodiment constitutes the desired motion correcting means in the first invention of the present invention, and the motions of the displacement dimension corrected gaits determined by the processing correspond to corrected instantaneous desired motions in the first invention. Further, the processing of S100 and the processing of S102 in the second embodiment correspond to the first provisional corrected motion determining means and the second provisional corrected motion determining means, respectively, in the first embodiment, and the first provisional corrected gait and the second provisional corrected gait determined by the respective processing correspond to the first provisional corrected instantaneous desired motion and the second provisional corrected instantaneous desired motion, respectively, in the first invention.

Referring to FIG. 20 to FIG. 22, the relationship among a simplified model gait, the aforesaid first provisional corrected gait, the aforesaid second provisional corrected gait, and a displacement dimension corrected gait in the present embodiment will be supplementally explained. FIG. 20 illustrates the relationship between the positions of the mass points Ai (i=1, 2, . . . , 5) and the posture angle of the body 3 (body link) of the second displacement dimension correcting model, and the positions of the mass points Ai and the posture angle of the body 3 (body link) of the first displacement dimension correcting model determined on the basis of a simplified model gait when the positions of the mass points Ai and the posture angle of the body 3 (body link) of the second displacement dimension correcting model are determined in exact accordance with the simplified model gait (that is, if the simplified model gait is not corrected in the aforesaid S024). The placement of the elements of the second displacement dimension correcting model in this base may be said to be determined according to the aforesaid geometric restrictive condition (2) from an instantaneous motion of the simplified model gait. In the aforesaid FIG. 20, the positions of the mass points Ai (i=1, 2, . . . , 5) of the second displacement dimension correcting model corresponding to the simplified model gait are denoted by Pi2'(Ai).

FIG. 21 illustrates the relationship between the positions of the mass points Ai and the posture angle of the body 3 (body link) of the second displacement dimension correcting model corresponding to the aforesaid first provisional corrected gait, and the positions of the mass points Ai and the posture angle of the body 3 (body link) of the first displacement dimension correcting model. The placement of the elements of the second displacement dimension correcting model shown in this FIG. 21 corresponds to the aforesaid first element placement of a second displacement dimension correcting model finally determined in S100 of the aforesaid FIG. 10 on the basis of the instantaneous value of a simplified model gait assumed in FIG. 20. This placement is identical to the one defined according to the aforesaid geometric restrictive condition (2) from the first provisional corrected gait. In FIG. 21, the positions of the mass points Ai (i=1, 2, . . . , 5) of the second displacement dimension correcting model corresponding to the first provisional corrected gait are denoted by Pi21(Ai). The positions of the mass points Ai and the posture angle of the body 3 (body link) of the first displacement dimension correcting model shown in FIG. 21 are the same as those shown in FIG. 20.

FIG. 22 illustrates the relationship between the positions of the mass points Ai and the posture angle of the body 3 (body link) of the second displacement dimension correcting model corresponding to the aforesaid second provisional corrected gait, and the positions of the mass points Ai and the posture angle of the body 3 (body link) of the first displacement dimension correcting model. The placement of the elements of the second displacement dimension correcting model shown in this FIG. 22 corresponds to the aforesaid second element placement of a second displacement dimension correcting model finally determined in S102 of the aforesaid FIG. 10 on the basis of the instantaneous value of the simplified model gait assumed in FIG. 20. This placement is identical to the one defined according to the aforesaid geometric restrictive condition (2) from the second provisional corrected gait. In FIG. 22, the positions of the mass points Ai (i=1, 2, . . . , 5) of the second displacement dimension correcting model corresponding to the second provisional corrected gait are denoted by Pi22(Ai). The positions of the mass points Ai and the posture angle of the body 3 (body link) of the first displacement dimension correcting model shown in FIG. 22 are the same as those shown in FIG. 20.

In the example shown in FIG. 20, at a position Pi2' of each mass point Ai of the second displacement dimension correcting model corresponding to a simplified model gait, thigh mass points P22' and P32' lie on the front side of the robot 1 relative to the first displacement dimension correcting model. This means that the overall center-of-gravity of the robot 1 in the second displacement dimension correcting model is deflected further toward the front of the robot 1 (in the positive direction of the X-axis) than the overall center-of-gravity of the robot 1 in the simplified model gait. In other words, the total sum of the translational force components of the inertial forces produced by the thigh mass points A2 and A3 due to the inter-model pseudo translational acceleration of the thigh mass points A2 and A3 of the two legs 2 and 2 (=Masses of the mass points A2 and A3*Inter-model pseudo translational acceleration) is generated at the rear side of the robot 1. Further, the moment acting about a desired ZMP by the inertial force produced by the thigh mass points A2 and A3 by the inter-model pseudo translational acceleration of the thigh mass points A2 and A3 is generated at the backward inclination side of the robot 1. In the present embodiment, the positions/postures of both feet and the body position/posture remain the same in the simplified model gait and the first displacement dimension correcting model. Hence, in the example of FIG. 20, the inter-model pseudo translational acceleration of the body mass point A1 and the foot mass points A4 and A5 are zero, and the inter-model pseudo angular acceleration of the body link is also zero.

Meanwhile, in the placement of the elements (the first element placement) of the second displacement dimension correcting model corresponding to the aforesaid first provisional corrected gait, that is, the placement of the elements of the second displacement dimension correcting model defined by the positions of the mass points Ai and the posture angle of the body link of the second displacement dimension correcting model finally determined in S100 of the aforesaid FIG. 10 in the present embodiment, the position of the body mass point A1 of the second displacement dimension correcting model is determined to lie further toward the rear beyond the body mass point A1 of the first displacement dimension correcting model, that is, the body position is corrected to be further toward the rear than in the simplified model gait so as to compensate the deflection of the thigh mass points A2 and A3 toward the front side, as shown in FIG. 21. At the same time, the positions of the mass points A1 to A5 and the posture of the body 3 having inertia in the second displacement dimension correcting model are determined such that the aforesaid angular momentum product takes a certain fixed value (predetermined value). In the illustrated example, the body posture (the posture of the body 3 indicated by the solid line) in the second displacement dimension correcting model is inclined forward by an angle θb21-θb relative to the body posture of a simplified model gait (the posture of the body 3 indicated by the dashed line). Supplementally, values obtained by doubling the area of the triangle marked with diagonal lines or horizontal lines in FIG. 21 correspond to the angular momentum products related to the body mass point A1 and the thigh mass points A2, A3, respectively.

Therefore, with the positions of the mass points Ai and the posture angle of the body link of the second displacement dimension correcting model corresponding to a first provisional corrected gait, the total sum of the translational force components of the inertial forces from the inter-model pseudo translational acceleration of the mass points Ai is smaller than in the case shown in FIG. 20 and becomes substantially zero, and the total sum of the moments generated about a desired ZMP by the inertial force also becomes closer to a predetermined value (a value corresponding to "the fixed value" related to the condition 2 mentioned above) than in the case shown in FIG. 20.

Thus, the first provisional corrected gait will be the one obtained by correcting a desired motion (more specifically, a desired body position and a desired body posture) of the robot 1 so that a floor reaction force similar to the desired floor reaction force (the translational floor reaction force and the floor reaction force moment) of a simplified model gait is generated, compensating for the influence of the inertial force from the motion of a part in the vicinity of the knee joint of each leg, which is not considered in a simplified model gait. Hence, the actual floor reaction force generated when the actual robot 1 is operated exactly in accordance with a motion of the first provisional corrected gait will be closer to a desired floor reaction force (=Floor reaction force of the simplified model gait) than the actual floor reaction force generated when the actual robot 1 is operated exactly in accordance with a motion of the simplified model gait is. This means that the dynamic accuracy between a motion and a floor reaction force of a first provisional corrected gait (a translational floor reaction force and a floor reaction force moment) is higher than the dynamic accuracy between the motion and a floor reaction force of a simplified model gait.

Meanwhile, in the placement of the elements of the second displacement dimension correcting model (the second element placement) corresponding to the aforesaid second provisional corrected gait, i.e., the placement of the elements of the second displacement dimension correcting model defined by the positions of the mass points Ai and the posture angle of the body link of the second displacement dimension correcting model finally determined in S102 shown in FIG. 10 mentioned above, the positions of the mass points A1 to A5 of the second displacement dimension correcting model are determined such that the total sum of angular momentum products mentioned above takes a fixed value (predetermined value), while the body posture is maintained at the same instantaneous body posture of a simplified model gait, as shown in FIG. 22.

Therefore, at the positions of the mass points Ai and the posture angle of the body link of the second displacement dimension correcting model corresponding to the second provisional corrected gait, the total sum of the moments acting about a desired ZMP due to the inertial forces from the inter-model pseudo translational acceleration of the mass points Ai (more specifically, the body mass point A1 and the thigh mass points A2 and A3) approximates more to a predetermined value (the value corresponding to "the fixed value" of the aforesaid condition 2) than in the case illustrated in FIG. 20.

Thus, the second provisional corrected gait is obtained by correcting the desired body position of the robot 1 such that a floor reaction force moment similar to the floor reaction force moment of the simplified model gait is generated, compensating for the influences of the inertial forces generated due to the motion of a part in the vicinity of the knee joint of each leg, which are not taken into account in the simplified model gait, while maintaining the desired body posture of the robot 1 at the same body posture of the simplified model gait. According to the second provisional corrected gait, the actual floor reaction force moment generated when the actual robot 1 is operated exactly in accordance with a motion of the gait will be closer to a desired floor reaction force moment (=Floor reaction force moment of the simplified model gait) than the actual floor reaction force moment is, which is generated when the actual robot 1 is operated exactly in accordance with a motion of the simplified model gait. This means that the dynamic accuracy between a motion and a floor reaction force moment of a second provisional corrected gait will be higher than the dynamic accuracy between a motion and a floor reaction force moment of a simplified model gait. However, when a second provisional corrected gait is determined (the second element placement of the second displacement dimension correcting model is determined), the difference in the overall center-of-gravity between the first and the second displacement dimension correcting models is not considered; therefore, the dynamic accuracy between a motion and a translational floor reaction force of the second provisional corrected gait will not be necessarily higher than the dynamic accuracy between a motion and a translational floor reaction force of a simplified model gait.

Then, according to the present embodiment, a displacement dimension corrected body posture is determined by using the foregoing expression 12 and expression 13 based on the body position/posture of the first provisional corrected gait and the body position/posture of the second provisional corrected gait described above in the same manner as that in the first embodiment. Thus, as with the first embodiment, if the operation mode of the robot 1 steadily remains the normal mode, then the displacement dimension corrected gait will be a gait obtained by correcting the body position of a simplified model gait without changing the body posture (without correcting the body posture), thus achieving higher dynamic accuracy between a motion and a floor reaction force moment of a displacement dimension corrected gait than that of the simplified model gait.

Further, if the operation mode of the robot 1 is steadily the running mode, then the displacement dimension corrected gait will be a gait obtained by correcting both the body position and the body posture of the simplified model gait, thus making it possible to achieve higher dynamic accuracy between a motion and a floor reaction force (a translational floor reaction force and a floor reaction force moment) of the displacement dimension corrected gait than that of the simplified model gait, as with the first embodiment.

If the operation mode of the robot 1 is steadily the low-friction floor surface walking mode, then the displacement dimension corrected gait will be a gait that enables the robot 1 to perform a stable operation while achieving higher dynamic accuracy than in a simplified model gait, restraining a change in the body posture to a minimum and preventing the robot 1 from slipping, as with the first embodiment.

When the operation mode of the robot 1 is changed, the value of the weight w1 (eventually the weight w2 also) is gradually changed by the processing of S106 shown in FIG. 10 mentioned above, so that a displacement dimension corrected body posture or a displacement dimension corrected body position will not suddenly change.

Third Embodiment

A third embodiment of the present invention will now be explained with reference to FIG. 23 to FIG. 25. The present embodiment shares the same construction of the robot 1 as that of the first and the second embodiments, and also shares the same structures of a simplified model, a first displacement dimension correcting model and a second displacement dimension correcting model as those of the second embodiment. And, the present embodiment differs from the second embodiment only in a part of the processing of a gait generating device 100. Hence, in the explanation of the present embodiment, the same reference numerals and drawings as those of the second embodiment will be used for the same portions as those of the second embodiment, and detailed explanation will be omitted. The following will explain the present embodiment, focusing mainly on the portions that are different from those of the second embodiment. Incidentally, the present embodiment is an embodiment of the second to the fourth, the seventh to the tenth, and the thirteenth to the fifteenth inventions of the present invention.

According to the present embodiment, the processing of the gait generating device 100 differs from the aforesaid second embodiment only in the displacement dimension gait correcting subroutine of S024 shown in FIG. 9. Hence, the explanation of processing except for the displacement dimension gait correcting subroutine will be omitted.

The displacement dimension gait correcting subroutine in the present embodiment is carried out as indicated by the flowchart of FIG. 23. To explain it, first, in S500, first provisional corrected body position/posture (Pb21, θb21) are determined such that the aforesaid condition 1 related to the center-of-gravity and the aforesaid condition 2 related to angular momentum product between the first displacement dimension correcting model and the second displacement dimension correcting model are satisfied.

This processing is the same as the processing of S100 (FIG. 10) in the second embodiment and carried out in exactly the same manner as that in the second embodiment by the subroutine processing of FIG. 11. Supplementally, in the present embodiment (the third embodiment), the placement of the elements of the first displacement dimension correcting model determined by the processing of S200 of FIG. 11 corresponds to "the first placement" in the second invention of the present invention, and the placement of the elements of the second displacement dimension correcting model when the condition of S210 has been satisfied corresponds to the aforesaid first element placement and also corresponds to "the second placement" in the second invention of the present invention.

Subsequently, the processing of S502, S504 and S506 is executed in exactly the same manner as that of S104, S106 and S108, respectively, in the second embodiment in order to determine the values of weights w1 and w2 at current time t.

Subsequently, in S508, the body posture in the second displacement dimension correcting model is set to be identical to the sum of the posture obtained by multiplying a first provisional corrected body posture θb21 determined in S500 by the weight w1 determined in S504 and the posture obtained by multiplying a body posture θb at the instantaneous value of the aforesaid simplified model gait by the weight w2 determined in S506 (w1*θb21+w2*θb), and second provisional corrected body position/posture (Pb22, θb22) are determined such that the aforesaid condition 2 related to the angular momentum products between the first displacement dimension correcting model and the second displacement dimension correcting model is satisfied. In this processing of S508, the second provisional corrected body posture θb22 is set to be identical to w1*θb21+w2*θb; therefore, the processing of S508 may be said to be substantially the processing for determining a second provisional corrected body position Pb22 such that condition 2 is satisfied.

The processing of S508 is executed by the subroutine processing of FIG. 24. This subroutine processing differs from the subroutine processing of FIG. 12 in the aforesaid second embodiment only in the value of the candidate θb22_s of the second provisional corrected body posture. This means that the subroutine processing of FIG. 24 according to the present embodiment (the third embodiment) differs from the subroutine processing of FIG. 12 only in that the candidate θb22_s of the second provisional corrected body posture is fixed to w1*θb21+w2*θb (the sum of the posture angle obtained by multiplying the first provisional corrected body posture θb21 by the weight w1 at current time t and the posture angle obtained by multiplying a state posture θb at the instantaneous value of the simplified model gait at the current time t by the weight w2 at current time t) (in the subroutine processing of FIG. 12, the candidate θb22_s is fixed to the body posture at the instantaneous value of a simplified model gait). More specifically, the subroutine processing of FIG. 24 sets the initial candidate θb22_s to w1*θb21+w2*θb by the processing of S602, the rest of this subroutine processing being the same as the subroutine processing of FIG. 12. In this case, S600 and S604 to S618 of FIG. 24 are the same as S300, S304 to S318, respectively, of FIG. 12.

The processing of S508 provides a second provisional corrected gait as the gait obtained by correcting the body posture of the simplified model gait to w1*θb21+w2*θb and also correcting the body position of the simplified model gait so that it satisfies the aforesaid condition 2.

After the processing of S508 is executed as described above, the processing of S510 is executed to determine displacement dimension corrected body position/posture (Pb2, θb2) at current time t. More specifically, the body position/posture of the second provisional corrected gait (Pb22, θb22) (=(Pb22, w1*θb21+w2*θb)) are directly determined as the displacement dimension corrected body position/posture (Pb2, θb2). Supplementally, according to the present embodiment (the third embodiment), the placement of the elements of the second displacement dimension correcting model when the condition of S610 is satisfied corresponds to the aforesaid second element placement and also corresponds to "the third placement" in the second invention of the present invention.

The above is the details of the displacement dimension gait correcting subroutine in the present embodiment (the third embodiment).

Supplementally, in the third embodiment, the processing of the displacement dimension gait correcting subroutine corresponds to the desired motion correcting means in the second invention of the present invention, and the motion of the displacement dimension corrected gait determined by this processing (this being equivalent to the motion of the second provisional corrected gait in the third embodiment) corresponds to the corrected instantaneous desired motion in the second invention. Furthermore, the processing of S500 corresponds to the provisional corrected motion determining means in the second invention, and the first provisional corrected gait determined by this processing corresponds to the provisional corrected instantaneous desired motion in the second invention.

In the present embodiment explained above, a first provisional corrected gait is the same as that in the second embodiment. Accordingly, as explained with reference to the foregoing FIG. 20 and FIG. 21, the first provisional corrected gait will be the one obtained by correcting a desired motion (more specifically, a desired body position and a desired body posture) of the robot 1 so that a floor reaction force similar to the desired floor reaction force (the translational floor reaction force and the floor reaction force moment) of a simplified model gait is generated, compensating for the influence of the inertial force from the motion of a part in the vicinity of the knee joint of each leg, which is not considered in a simplified model gait. Hence, the actual floor reaction force generated when the actual robot 1 is operated exactly in accordance with a motion of the first provisional corrected gait will be closer to a desired floor reaction force (=Floor reaction force of the simplified model gait) than the actual floor reaction force is, which is generated when the actual robot 1 is operated exactly in accordance with a motion of the simplified model gait. This means that the dynamic accuracy between the motion and a floor reaction force of a first provisional corrected gait (a translational floor reaction force and a floor reaction force moment) is higher than the dynamic accuracy between the motion and a floor reaction force of a simplified model gait.

Meanwhile, FIG. 25 illustrates the relationship between the placement of the elements of the second displacement dimension correcting model corresponding to the second provisional corrected gait (the second element placement) and the placement of the elements of the first displacement dimension correcting model in the present embodiment (the third embodiment). The placement of the elements of the second displacement dimension correcting model of this FIG. 25 corresponds to the instantaneous values of the simplified model gait assumed in the foregoing FIG. 20, and it is the aforesaid second element placement of the second displacement dimension correcting model finally determined in S506 of the foregoing FIG. 23. This placement is the same as the one defined according to the aforesaid geometric restrictive condition (2) from the aforesaid second provisional corrected gait. In FIG. 25, the positions of the mass points Ai (i=1, 2, ..., 5) of the second displacement dimension correcting model corresponding to the second provisional corrected gait are denoted by Pi22(Ai). The positions of the mass points Ai and the posture angle of the body link of the first displacement dimension correcting model shown in FIG. 25 are identical to those shown in the foregoing FIG. 20.

As shown in this FIG. 25, according to the placement of the elements of the second displacement dimension correcting model corresponding to the second provisional corrected gait, the positions of the mass points A1 to A5 of the second displacement dimension correcting model are determined such that the total sum of the angular momentum products mentioned above takes a fixed value (predetermined value) under a condition in which the body posture is restricted to the sum of the posture angle obtained by multiplying the first provisional corrected body posture θb21 by the weight w1 and the posture angle obtained by multiplying the body posture θb at an instantaneous value of the aforesaid simplified model gait by the weight w2. Supplementally, double the area of each hatched or meshed triangle shown in FIG. 25 corresponds to the angular momentum product related to the body mass point A1 and the thigh mass points A2 and A3, respectively.

Thus, at the positions of the mass points Ai and the posture angle of the body link of the second displacement dimension correcting model corresponding to the second provisional corrected gait, the total sum of the moments acting about a desired ZMP due to the inertial forces from the inter-model pseudo translational acceleration of the mass points Ai (more specifically, the body mass point A1 and the thigh mass points A2 and A3) approximates more to a predetermined value (the value corresponding to "the fixed value" of the aforesaid condition 2) than in the case illustrated in FIG. 20.

Thus, the second provisional corrected gait is obtained by correcting the desired body position of the robot 1 such that a floor reaction force moment similar to the floor reaction force moment of the simplified model gait is generated, compensating for the influences of the inertial forces generated due to the motion of a part in the vicinity of the knee joint of each leg, which are not taken into account in the simplified model gait, while restricting the desired body posture of the robot 1 at a posture between the body posture at an instantaneous value of the simplified model gait (the vertical posture in the present embodiment) and a first provisional corrected body posture. According to the second provisional corrected gait, the actual floor reaction force moment generated when the actual robot 1 is operated exactly in accordance with a motion of the gait will be closer to a desired floor reaction force moment (=Floor reaction force moment of the simplified model gait) than the actual floor reaction force moment is, which is generated when the actual robot 1 is operated exactly in accordance with a motion of the simplified model gait. This means that the dynamic accuracy between a motion and a floor reaction force moment of a second provisional corrected gait will be higher than the dynamic accuracy between a motion and a floor reaction force moment of a simplified model gait.

Then, according to the present embodiment, the second provisional corrected body position/posture are determined as the displacement dimension corrected body position/posture. In this case, if the operation mode of the robot 1 steadily remains the normal mode (if w1=0), then the displacement dimension corrected gait (=the second provisional corrected gait) will be a gait obtained by correcting the body position of a simplified model gait without changing the body posture (by maintaining it constant), thus achieving higher dynamic accuracy between a motion and a floor reaction force moment of a displacement dimension corrected gait than that of the simplified model gait, as with the second embodiment. In this case, if the simplified model gait is the same as that in the aforesaid second embodiment, then the displacement dimension corrected gait in the present embodiment (the third embodiment) will the be same as that in the second embodiment.

Further, if the operation mode of the robot 1 is steadily the running mode (if w1=1), then the second provisional corrected body position/posture determined in S506 of the foregoing FIG. 23 will be the same or substantially the same as the first provisional corrected body position/posture (the body positions of the two do not necessarily completely the same). Therefore, the displacement dimension corrected gait (=the second provisional corrected gait) in this case will be a gait obtained by correcting both the body position and the body posture of the simplified model gait, thus making it possible to achieve higher dynamic accuracy between a motion and a floor reaction force of the displacement dimension corrected gait (a translational floor reaction force and a floor reaction force moment) than that of the simplified model gait. In this case also, if the simplified model gait is the same as that of the aforesaid second embodiment, then the displacement dimension corrected gait in the present embodiment (the third embodiment) will be the same as that in the second embodiment.

If the operation mode of the robot 1 steadily remains the low-friction floor surface walking mode (if w1=0.5), then the displacement dimension corrected body posture will be the sum of the posture angle of half the body posture angle of the first provisional corrected gait and the posture angle of half the body posture angle of the simplified model gait, and the displacement dimension corrected body position will be the body position of the second provisional corrected gait applied when the body posture angle is the sum of the posture angle of half the body posture angle of the first provisional corrected gait and the posture angle of half the body posture angle of the simplified model gait. Hence, the displacement dimension corrected gait in this case will be the one obtained by correcting both body position and body posture of the simplified model gait so as to achieve higher dynamic accuracy between a motion and a floor reaction force of the displacement dimension corrected gait (a translational floor reaction force and a floor reaction force moment) than that of the simplified model gait, while restraining a change in body posture, as with the aforesaid second embodiment. Furthermore, the displacement dimension corrected gait enables the robot 1 to perform a stable operation while achieving higher dynamic accuracy than in a simplified model gait, restraining a change in the body posture to a minimum and preventing the robot 1 from slipping. In this case, according to the present embodiment, the displacement dimension corrected body position is determined such that the aforesaid condition 2 is satisfied to match the displacement dimension corrected body posture as the body posture after correction, making it possible to effectively reduce an error between an actual floor reaction force moment and a desired floor reaction force moment that occurs when the actual robot 1 is operated according to a motion of the displacement dimension corrected gait that includes the above displacement dimension corrected body position/posture.

When the operation mode of the robot 1 is changed, the value of the weight w1 is gradually changed by the processing of S504 shown in FIG. 23 mentioned above, so that a displacement dimension corrected body posture or a displacement dimension corrected body position will not suddenly change, as with the first and the second embodiments discussed above.

Next, some modifications associated with the first to the third embodiments explained above will be explained.

In the first to the third embodiments described above, a displacement dimension corrected body posture is determined on the basis of a value obtained by multiplying the aforementioned first provisional corrected body posture by the weight w1. In this case, the weight w1 may be provided with a frequency characteristic relative to the first provisional corrected body posture (the inclination angle of the body of the first provisional corrected gait). For example, a low-cut characteristic is imparted to the weight w1 relative to a frequency component of the first provisional corrected body posture, as shown in FIG. 26(a). In this case, if a desired gait is generated for providing a state wherein the first provisional corrected body posture is steadily maintained substantially constant, e.g., keeping the robot 1 continuously stationary in an upright posture state, then the displacement dimension corrected body posture obtained by multiplying the first provisional corrected body posture by the weight w1 can be maintained at the vertical posture securely and steadily without generating an offset relative to the vertical direction. This improves the appearance of the entire posture of the robot 1. Alternatively, as necessary, the weight w1 may be provided with a high-cut characteristic, as shown in FIG. 26(b). In this case, a high-frequency component of the first provisional corrected body posture, that is, the component that causes the first provisional corrected body posture to vibrate at high speed, can be removed when the displacement dimension corrected body posture is determined. As a result, minute vibration of the displacement dimension corrected body posture can be prevented, thus preventing an imaging device mounted on the head or the like of the robot 1 from shaking.

An embodiment of a fifth invention of the present invention is constructed by imparting a frequency characteristic to the weight w1, as shown in FIG. 26(a) or FIG. 26(b).

Further, in the first to the third embodiments described above, a desired ZMP has been used as the point Q related to an angular momentum product; however, the point Q may be a point other than the desired ZMP, and it may be any one of, for example, the following points:

a) Origin of a coordinate system (global coordinate system) describing a gait;
b) Appropriately set point that continuously moves together with the robot 1;
c) Overall center-of-gravity of the robot 1 in a full model;
d) Overall center-of-gravity of the robot 1 in a simplified model; and
e) Center-of-gravity of a set of predetermined mass points related to the first and the second displacement dimension correcting models (specifically, the center-of-gravity of a set of mass points that may incur positional differences between the first and the second displacement dimension correcting models. For example, in the first embodiment, the center-of-gravity of the set of all the mass points A1 to A5 applies, and in the second and the third embodiments, the center-of-gravity of the set of the body mass point A1 and the thigh mass points A2 and A3 applies).

Further, in the aforesaid first embodiment, the displacement dimension gait correcting subroutine of S024 of FIG. 9 has been carried out by the processing of FIG. 10; alternatively, however, it may be carried out by the processing of FIG. 23, as with the aforesaid third embodiment. This constitutes another embodiment related to the second invention of the present invention.

In the explanation of the aforesaid first to third embodiments, in the processing of the displacement dimension gait correcting subroutine of S024 of FIG. 9, the processing for correcting the body position/posture of a simplified model gait on the sagittal plane has been explained; alternatively, however, the body position/posture on the lateral plane orthogonal to the sagittal plane may be corrected together. In this case, for example, the processing of S200 to S218 of FIG. 11, the processing of S300 to S318 of FIG. 12, and the processing of S600 to S618 of FIG. 24 may be expanded to be three-dimensional. Alternatively, the processing for correcting the body position/posture on the sagittal plane and the processing for correcting the body position/posture on the lateral plane may be independently carried out using an algorithm similar to that shown in FIG. 11, FIG. 12, or FIG. 24. Supplementally, when correcting body position/posture, including a vertical component of a body position, if the processing for correcting the body position/posture on the sagittal plane and the processing for correcting the body position on the lateral plane are carried out independently, then the vertical component of the body position may be corrected by carrying out the correction processing on one of the sagittal plane and the lateral plane, and the body position/posture excluding the vertical component of the body position may be corrected on the other plane by the correction processing.

Further, the body position/posture on a horizontal plane (level plane) may be corrected together. Alternatively, body position/posture may be corrected on one or two of the sagittal plane, the lateral plane, and the horizontal plane.

Further, in the first to the third embodiments, in S100 of FIG. 10 or S500 of FIG. 23, the initial candidates (Pb21_s, θb21_s) of the first provisional corrected body position/posture have been determined using the first provisional corrected body position/posture determined at the time of the last control cycle. Alternatively, for example, the initial candidates (Pb21_s, θb21_s) may be set to be the same as the body position/posture of a simplified model gait. Similarly, in S102 of FIG. 10 or S506 of FIG. 23, the initial candidate Pb22_s of the second provisional corrected body position has been determined using the second provisional corrected body position determined at the time of the last control cycle. Alternatively, for example, the initial candidate Pb22_s may be set to be the same as the body position of a simplified model gait. However, to promptly explore the first provisional corrected body position/posture that satisfy the aforesaid conditions 1 and 2, or the second provisional corrected body position that satisfies the aforesaid condition 2, it is desirable to determine the initial candidates (Pb2_s, θb2_s) as explained in the aforesaid first to third embodiments.

In the processing of the displacement dimension gait correcting subroutine in the first to the third embodiments, the first provisional corrected body position/posture that satisfy the aforesaid conditions 1 and 2 have been exploratorily determined. Alternatively, for example, the amount of correction from the body position/posture of a simplified model gait to the first provisional corrected body position/posture may be determined, using a function expression or a map prepared beforehand, from the difference between the placement of the elements of the second displacement dimension correcting model (the positions of the mass points and the postures of the links having inertia) determined according to the aforesaid geometric restrictive condition (2) on the basis of a simplified model gait and the placement of the elements of the first displacement dimension correcting model (the differences in the positions of the mass points and the differences in posture angles of the links having inertia between the two models), and then the body position/posture of the simplified model gait may be corrected on the basis of the determined correction amount thereby to determine the first provisional corrected body position/posture.

Further, in the processing of the displacement dimension gait correcting subroutine in the first and the second embodiments, the second provisional corrected body position that satisfies the aforesaid condition 2 when the body posture is set to be identical to the body posture of the simplified model gait has been exploratorily determined. Alternatively, the amount of correction from the body position of a simplified model gait to the second provisional corrected body position may be determined, using a function expression or a map prepared beforehand, from the difference between the placement of the elements of the second displacement dimension correcting model (the positions of the mass points and the postures of the links having inertia) determined according to the aforesaid geometric restrictive condition (2) on the basis of a simplified model gait and the placement of the elements of the first displacement dimension correcting model (the differences in the positions of the mass points and the differences in posture angles of the links having inertia between the two models), and then the body position of the simplified model gait may be corrected on the basis of the determined correction amount thereby to determine the second provisional corrected body position. Similarly, in the third embodiment, the placement of the elements of the second displacement dimension correcting model may be determined according to the foregoing geometric restrictive condition (2) from an instantaneous value of a gait obtained by replacing the body posture of a simplified model gait by the sum of the result obtained by multiplying the first provisional corrected body posture by the foregoing weight w1 and the result obtained by multiplying the body posture of the simplified model gait by the foregoing weight w2 (hereinafter referred to as the replaced gait in the explanation here), and from the difference between this placement and the placement of the elements of the first displacement dimension correcting model, the amount of correction from the body position of the above replaced gait to the second provisional corrected body position may be determined, using a function expression or a map prepared beforehand, and then the body position of the replaced gait may be corrected on the basis of the determined correction amount thereby to determine the second provisional corrected body position.

Furthermore, in the processing of the displacement dimension gait correcting subroutine in the first to the third embodiments, when determining the first provisional corrected body position/posture are determined, the judgment of whether the inter-model overall center-of-gravity error Gc_err and the inter-model angular momentum product error Lc_err fall within permissible ranges or not (the processing of S210 of FIG. 11) may be omitted, and the search may be finished when the number of searches (the number of updates of candidates (Pb21_s, θb21_s)) reaches a predetermined number, and the then candidates (Pb21_s, θb21_s) may be determined as the first provisional corrected body position/posture. Alternatively, the search may be finished if the inter-model overall center-of-gravity error Gc_err and the inter-model angular momentum product error Lc_err fall within permissible ranges or when the number of searches reaches a predetermined number, and the candidates (Pb21_s, θb21_s) at that moment may be determined as the first provisional corrected body position/posture.

Similarly, in the processing of the displacement dimension gait correcting subroutine in the first to the third embodiments, when the second provisional corrected body position/posture are determined, the judgment of whether the inter-model angular momentum product error Lc_err falls within a permissible range or not (the processing of S310 of FIG. 12 or the processing of S610 of FIG. 24) may be omitted, and the search may be finished when the number of searches (the number of updates of candidates (Pb22_s, θb22_s)) reaches a predetermined number, and the candidates (Pb22_s, θb22_s) at that moment may be determined as the second provisional corrected body position/posture. Alternatively, the search may be finished if the inter-model angular momentum product error Lc_err falls within a permissible range or when the number of searches reaches a predetermined number, and the candidates (Pb22_s, θb22_s) at that moment may be determined as the second provisional corrected body position/posture.

Further, in the first to the third embodiments, when calculating the inter-model angular momentum product error Lc_err, the foregoing expression 08, for example, may be used in place of the foregoing expression 07, as previously discussed. In this case, the terms following $\Sigma$ of the right side of expression 08 will be the functions that substantially monotonously change relative to the angle (Pi1_Q_Pi2) formed by a segment that connects the mass point Ai and point Q of the first displacement dimension correcting model and a segment that connects the mass point Ai and point Q of the second displacement dimension correcting model. Thus, in the first to the third embodiments described above, using expression 08 to calculate the inter-model angular momentum product error Lc_err constitutes an embodiment of a sixth invention of the present invention.

Regarding the second and the third embodiments described above, the positional differences of the thigh mass points A2 and A3 between the first and the second displacement dimension correcting models are substantially equal to the positional deviation of the thigh mass points A2 and A3 of the second displacement dimension correcting model relative to the segment connecting the central point of the ankle joint and the central point of the hip joint of each leg 2 (the positional deviation within a plane substantially orthogonal to the segment) or the positional deviation of the center of the knee joint relative to the segment. Hence, when determining the inter-model overall center-of-gravity error Gc_err and the inter-model angular momentum product error L_err, for example, the distance between the aforesaid segment and the thigh mass points A2, A3 or the center of each knee joint (hereinafter referred to as the pseudo positional error distance of the thigh mass points A2, A3) may be used in place of the positional errors (P22-P21), (P32-P31) related to the thigh mass points A2, A3 in the aforesaid expressions 06 and 07.

In addition, the pseudo positional error distances of the thigh mass points A2, A3 are closely related to the bending angles of the knee joints of the legs 2, so that the pseudo positional errors of the thigh mass points A2 and A3 may be determined from the bending angles of the knee joints. More specifically, as shown in the aforesaid FIG. 20, if the length of each thigh link 24 (the distance between the central points of the hip joint and the knee joint, respectively, at both ends of the thigh link 24) is denoted by L, and a bending angle of a knee joint (an inclination angle of the axial center of a crus link (the straight line passing the center of the knee joint and the center of the ankle joint) relative to the axial center of the thigh link (the straight line passing the center of a hip joint and the center of the knee joint)) is denoted by $\theta$, then the pseudo positional error distances of the thigh mass points A2 and A3 will be substantially equal to $L*\sin(\theta/2)$. The length L is the same in both thigh links 24 and 24. Therefore, $L*\sin(\theta/2)$ determined on the basis of the bending angle $\theta$ of the knee joint of each leg 2 may be used in place of, for example, the positional errors (P22-P21), (P32-P31) related to the thigh mass points A2, A3 in the aforesaid expressions 06 and 07. Supplementally, if body position/posture and the positions/postures of both feet are determined, then the bending angle of the knee joint of each leg 2 will be uniquely determined by a geometric model (link model) of the robot 1.

Further, in the first to the third embodiments discussed above, the number of mass points of each leg 2 in the first and the second displacement dimension correcting model has been two; alternatively, however, a displacement dimension correcting model that has a mass point in each of, for example, a portion in the vicinity of the foot 22, a crus link, and a thigh link of each leg 2 (three mass points in each leg) may be constructed. In this case, as with the second or the third embodiment, if the positions of the mass points of the first displacement dimension correcting model are to be restricted, then two mass points other than the mass point of each foot may be set at, for example, two points defined by a predetermined internally dividing ratio on a segment that connects the center of an ankle joint and the center of a hip joint. Moreover, a rigid body (link) having inertia corresponding to a crus link and/or a body link may be added as an element of both displacement dimension correcting models.

Further, mass points, such as the foot mass points A4 and A5 of the first and the second displacement dimension correcting models in the second and the third embodiments, whose placements will be the same in both displacement dimension correcting models may be excluded from both displacement dimension correcting models.

Further, in the first to the third embodiments described above, if a desired gait is generated for performing a motion in which the robot 1 stops and sticks out both arms 5 and 5 forward when the operation mode of the robot 1 is, for example, the aforesaid normal mode (other than the running mode and the low-friction floor surface walking mode), then a mass point or inertia may be imparted to a part corresponding to each arm 5 in the first and the second displacement dimension correcting models.

Further, if the elbow joints of both arms 5 and 5 are bent or stretched, mass points corresponding to the elbow joints or in the vicinity thereof may be provided, as in the case where thigh mass points are provided in the first and the second displacement dimension correcting models in the second and the third embodiments. More specifically, as shown in, for example, FIG. 27, elbow mass points B8 and B9 respectively corresponding to the vicinity of the elbow joints of the arms 5, and hand tip mass points B6 and B7 respectively corresponding to the vicinity of the distal portions of the arms 5 are provided in addition to the body mass point B1, the thigh mass points B2, B3, and the foot mass points B4, B5 in the first and the second displacement dimension correcting models, and an arrangement is made such that the elbow mass points B8 and B9 are restricted to the points defined by a predetermined internally dividing ratio on a segment connecting the center of a shoulder joint and the center of a wrist joint of each arm 5 in the first displacement dimension correcting model. In addition, as with the second or the third embodiment, the first provisional corrected body position/posture are determined such that the inter-model overall center-of-gravity error Gc_err and the inter-model angular momentum product error L_err including the differences of the positions of the elbow joints B8 and B9 between the first displacement dimension correcting model and the second displacement dimension correcting model, approximate zero (satisfy the aforesaid conditions 1 and 2). Also, the second provisional corrected body position/posture are determined such that the inter-model angular momentum product error L_err approximates zero (satisfies the aforesaid condition 2) in a state wherein the body posture is identical to the body posture of a simplified model gait or identical to the sum of the result obtained by multiplying the first provisional corrected body posture by the foregoing weight w1 and the result obtained by multiplying the body posture of the simplified model gait by the foregoing weight w2. Regarding the first displacement dimension correcting model, the arm postures of the first displacement dimension correcting model may be restricted to the arm postures in the upright posture state of the robot 1 (the posture in which they are stretched in the vertical direction), as in the case where the postures of the legs 2 have been restricted in the first embodiment.

Further, to add supplemental explanation to the first to the third embodiments, in the first embodiment, the foregoing geometric restrictive condition (1) corresponding to the first geometric restrictive condition in the present invention and the foregoing geometric restrictive condition (2) corresponding to the second geometric restrictive condition are set as described above, so that the geometric restrictive conditions (1) and (2) are set as in the ninth invention of the present invention. Similarly, in the second and the third embodiments, the foregoing geometric restrictive condition (3) corresponding to the first geometric restrictive condition in the present invention and the foregoing geometric restrictive condition (2) corresponding to the second geometric restrictive condition are set as described above, so that the geometric restrictive conditions (3) and (2) are set as in the eighth invention of the present invention.

Further, in the first to the third embodiments, the total sum of the masses of all elements of the first displacement dimension correcting model agrees with the total mass of the robot 1, and the overall center-of-gravity position G1 of the first displacement dimension correcting model relative to an instantaneous desired motion of the robot 1 is set to agree or substantially agree with the overall center-of-gravity position Gs of the simplified model relative to the instantaneous desired motion. Moreover, the total sum of the masses of all elements of the second displacement dimension correcting model also agrees with the total mass of the robot 1, and the overall center-of-gravity position G2 of the second displacement dimension correcting model relative to an instantaneous desired motion of the robot 1 is set to substantially agree with a true overall center-of-gravity position Gf of the actual robot 1 relative to the instantaneous desired motion. Accordingly, in the first to the third embodiments, the difference between G1 and G2 (G1−G2) substantially agrees with the difference between the overall center-of-gravity position Gs of the simplified model and the true overall center-of-gravity position Gf of the robot 1 (Gs−Gf), i.e., the error of the overall center-of-gravity position of the simplified model. Thus, in the first to the third embodiments, the foregoing geometric restrictive condition (1) or (3) as the first geometric restrictive condition in the present invention and the foregoing geometric restrictive condition (2) as the second geometric restrictive condition are set as in the ninth invention discussed above. In this case, as previously described, mass points, such as the mass points in the vicinity of feet (foot mass points), whose placements will be the same positions in both displacement dimension correcting models, may be of course excluded from both displacement dimension correcting models.

INDUSTRIAL APPLICABILITY

As explained above, the present invention is useful in that it makes it possible to provide a gait generating device of a mobile robot that is capable of properly correcting a motion of an instantaneous desired gait, which is prepared using a dynamic model, by geometric computation that does not include differential equations or integral equations, thus achieving improved dynamic accuracy of the instantaneous desired gait that includes the corrected motion, while minimizing a change in the posture of a predetermined part, such as the body of the robot, at the same time.

BRIEF DESCRIPTION OF THE DRAWINGS

FIG. 7(a) to (c) are diagrams showing the relationship between a first displacement dimension correcting model and a simplified model in the first embodiment.

Figure 1:
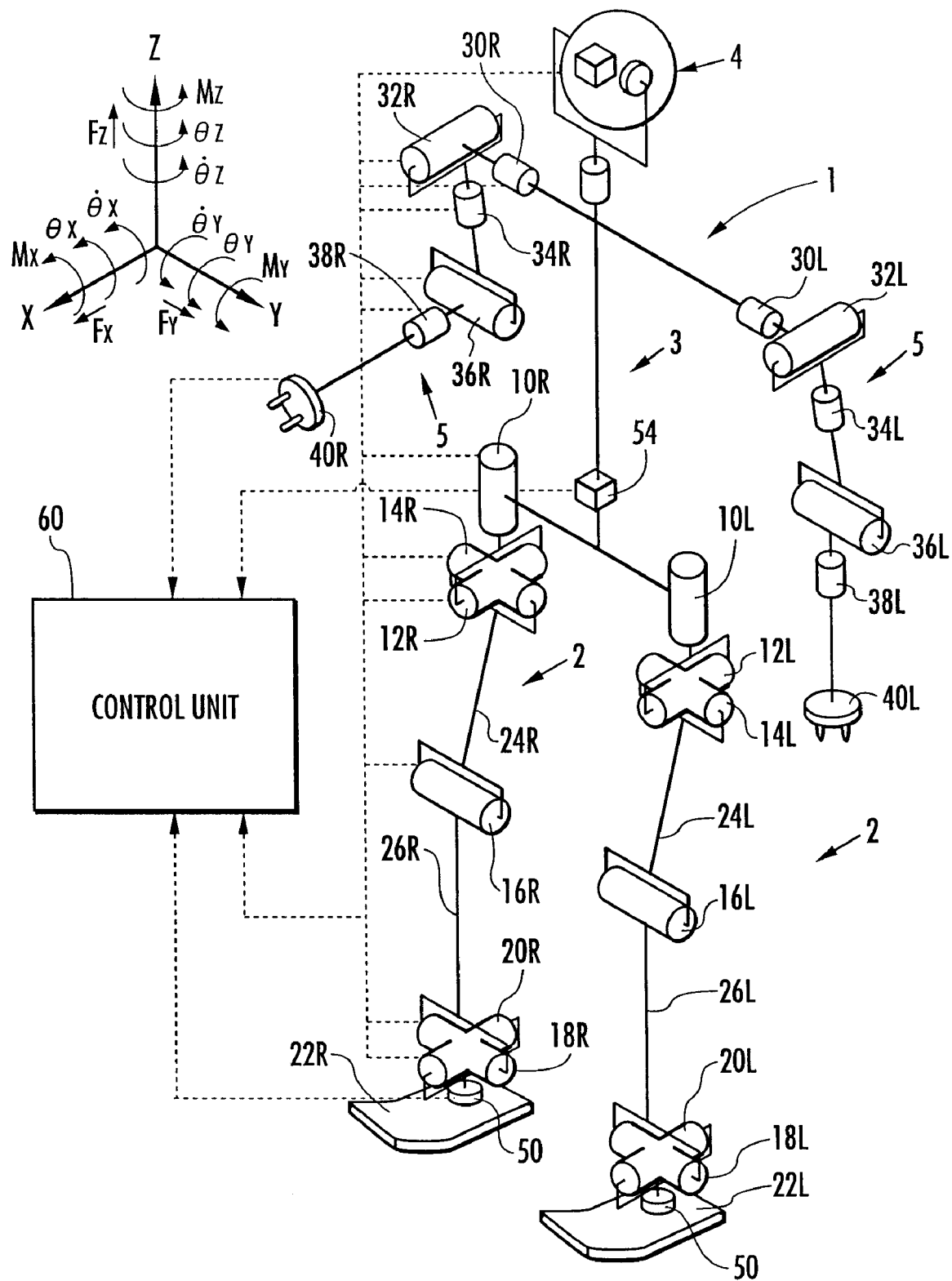
FIG. 1 It is a diagram schematically showing a general construction of a mobile robot (a bipedal walking robot) to which an embodiment of the present invention is applied.
Figure 2:
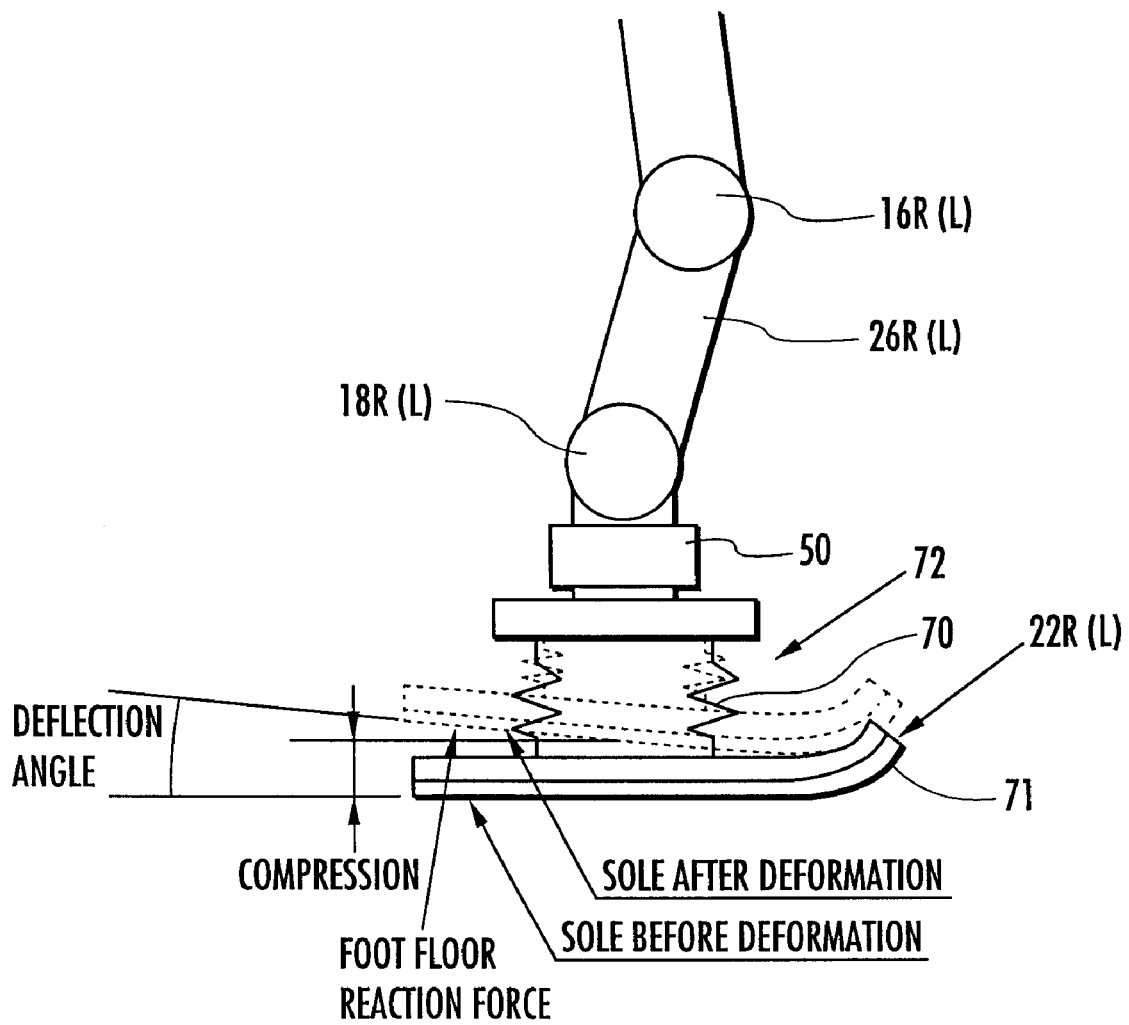
FIG. 2 It is a side view showing the construction of a foot portion of each leg of the robot shown in FIG. 1.
Figure 3:
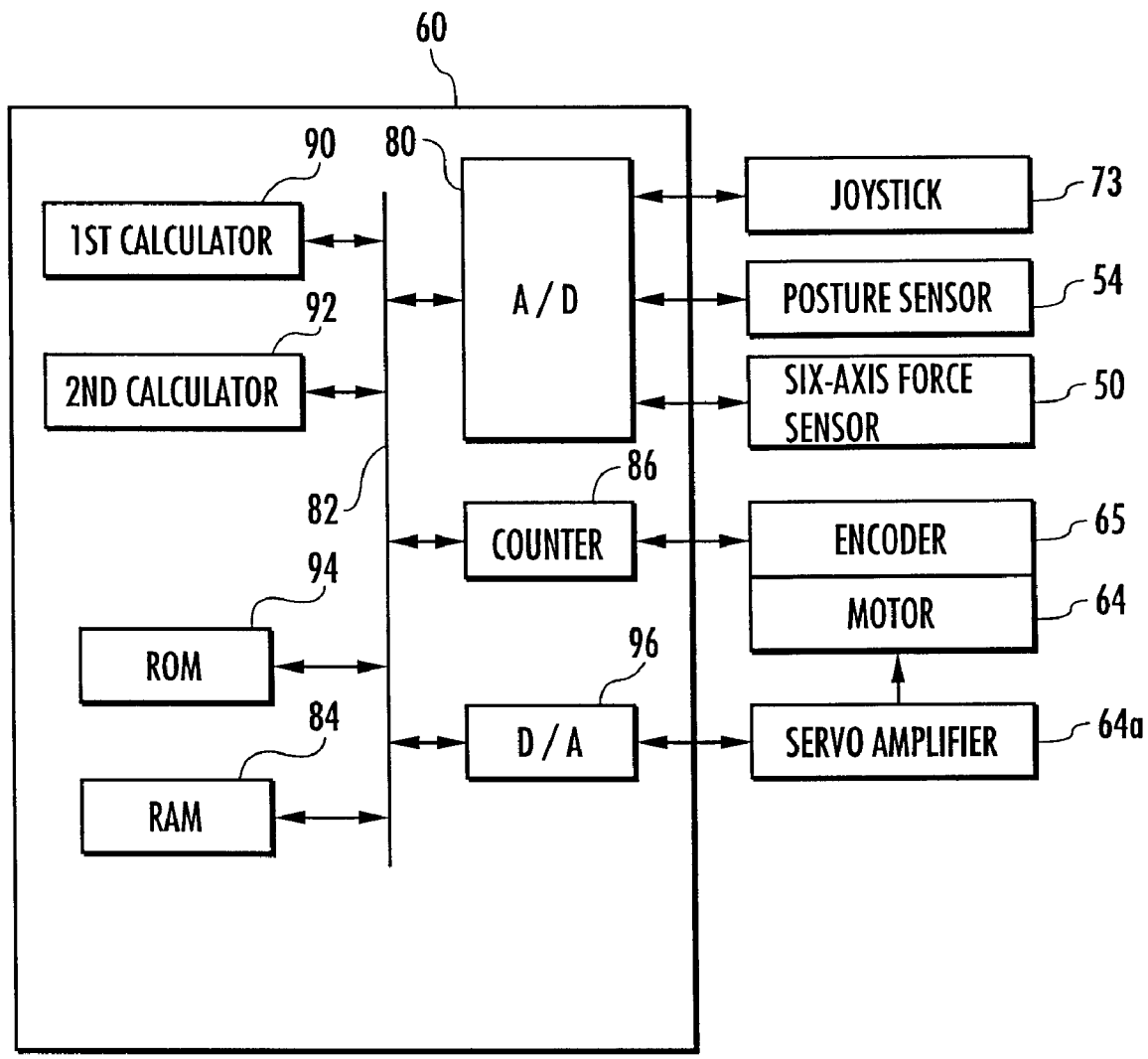
FIG. 3 It is a block diagram showing the construction of a control unit provided in the robot shown in FIG. 1.
Figure 4:
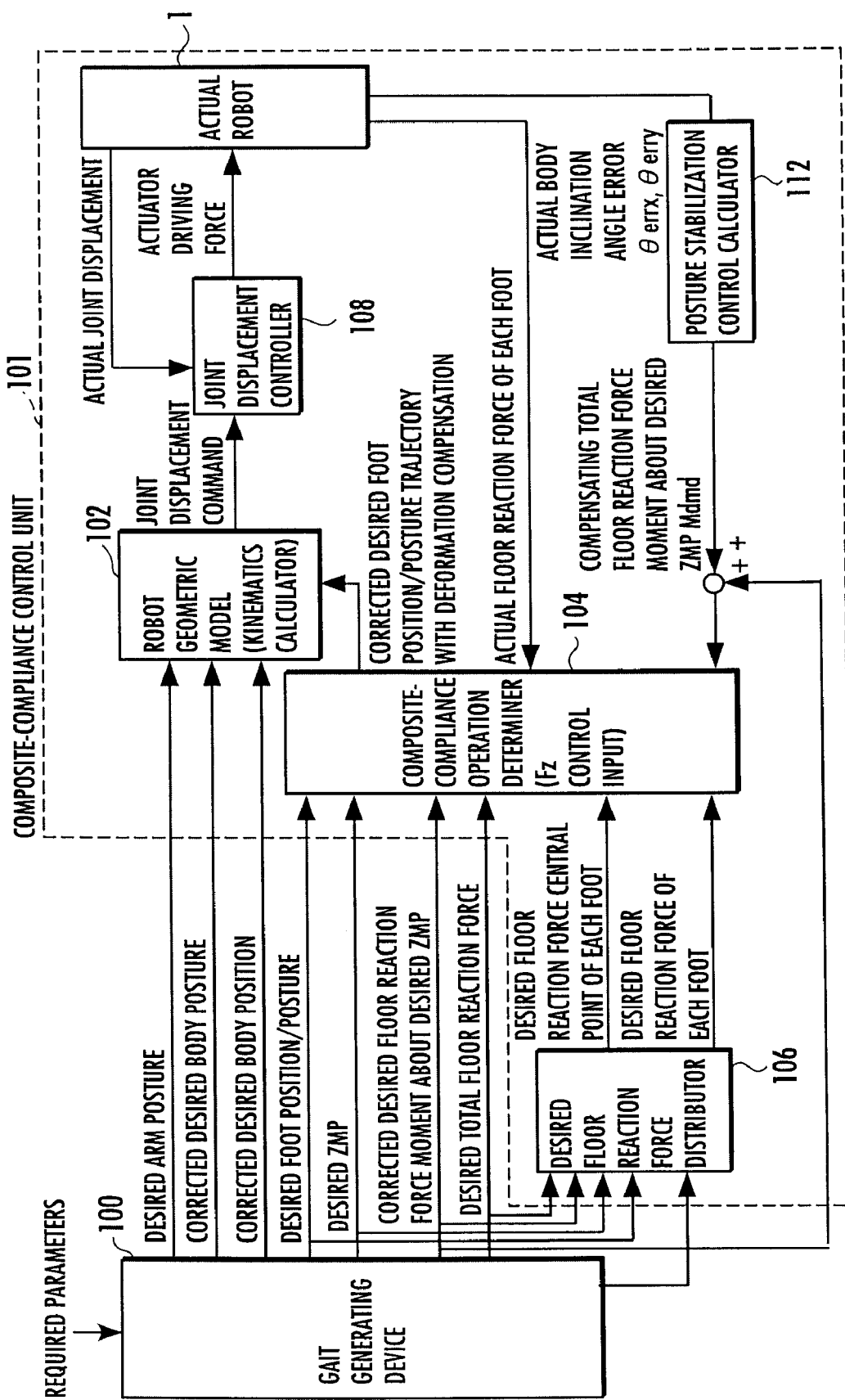
FIG. 4 It is a block diagram showing the functional construction of the control unit shown in FIG. 3.
Figure 5:
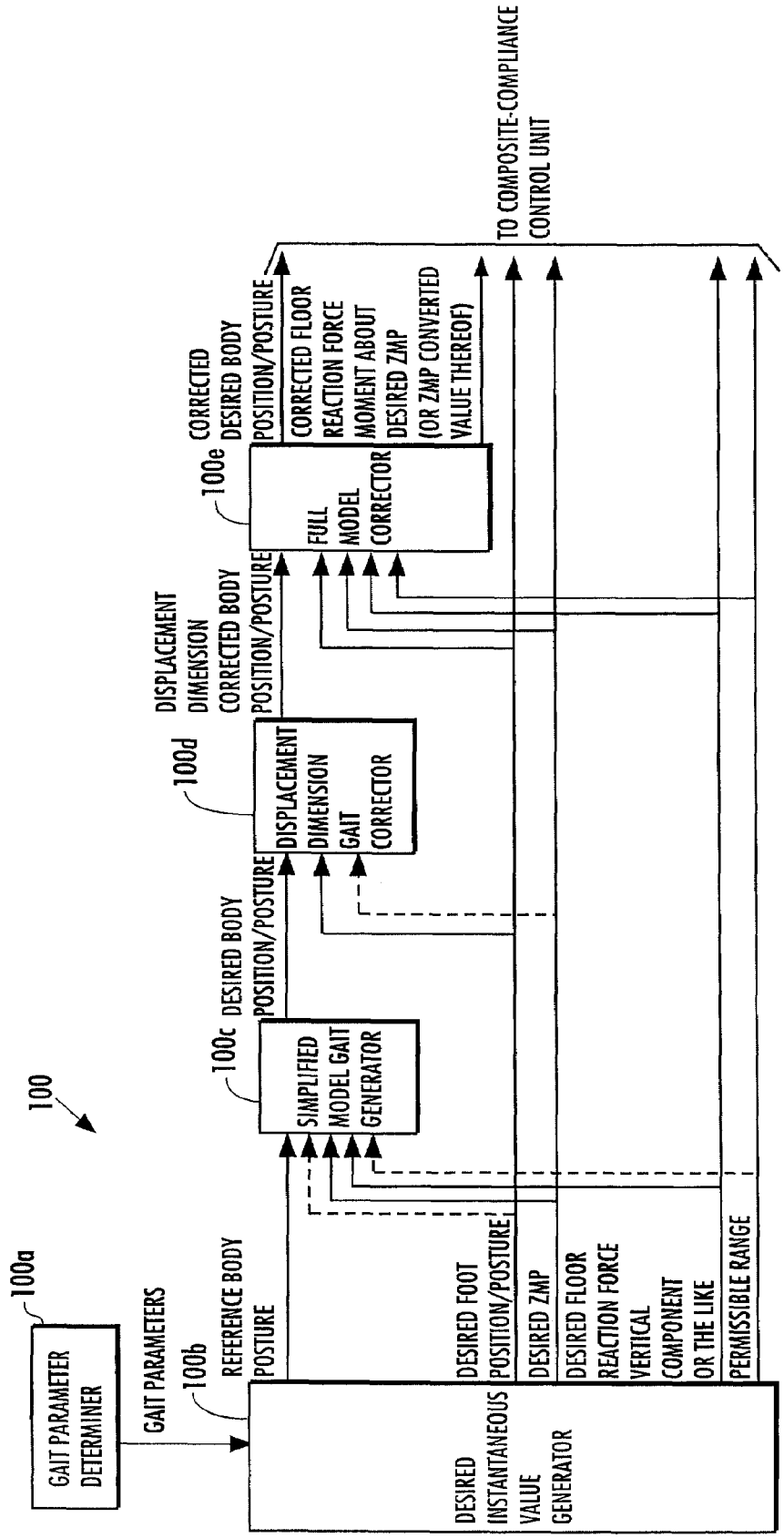
FIG. 5 It is a block diagram showing the functions of a gait generating device shown in FIG. 4.
Figure 6:
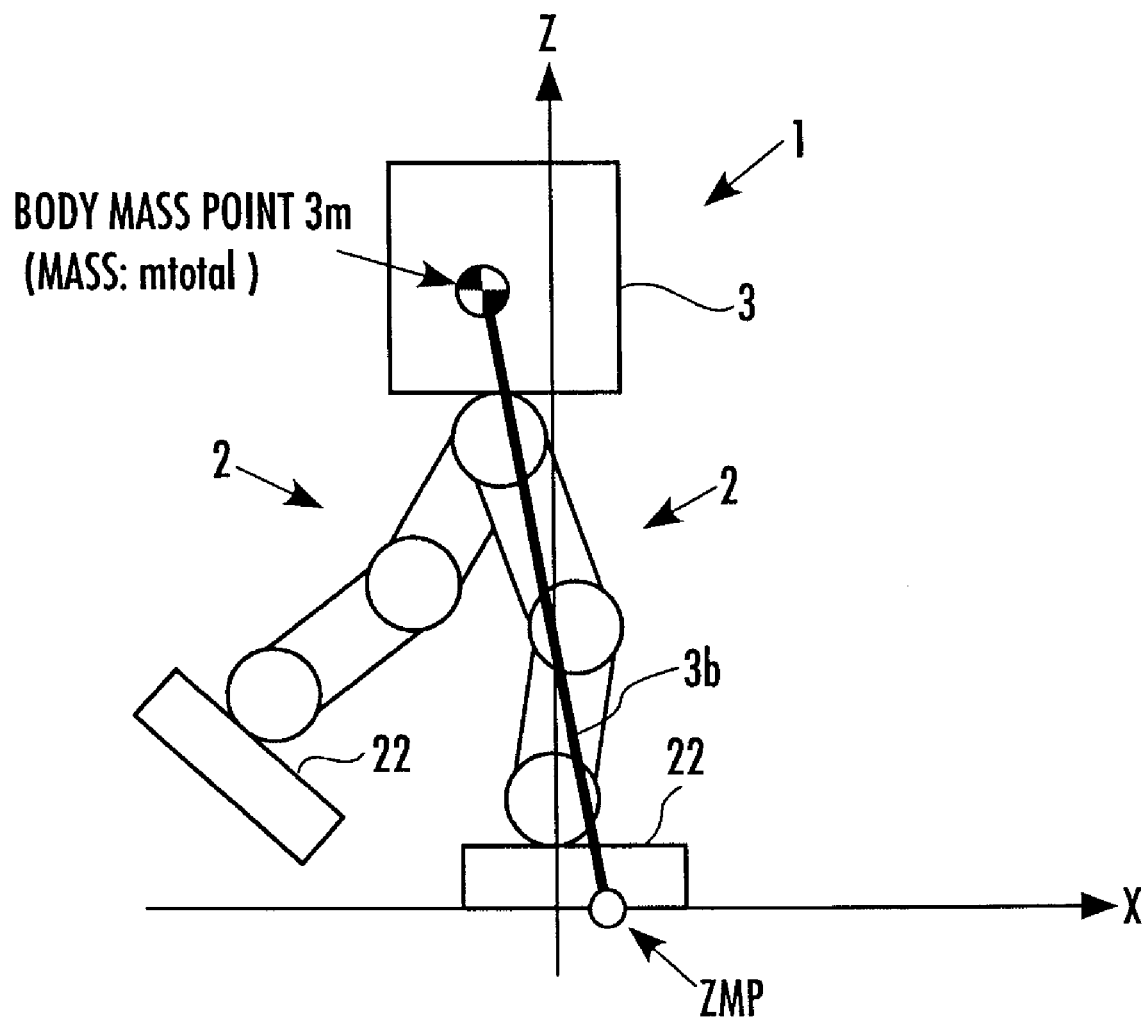
FIG. 6 It is a diagram showing the structure of a simplified model (dynamic model) in a first embodiment.
Figure 8:
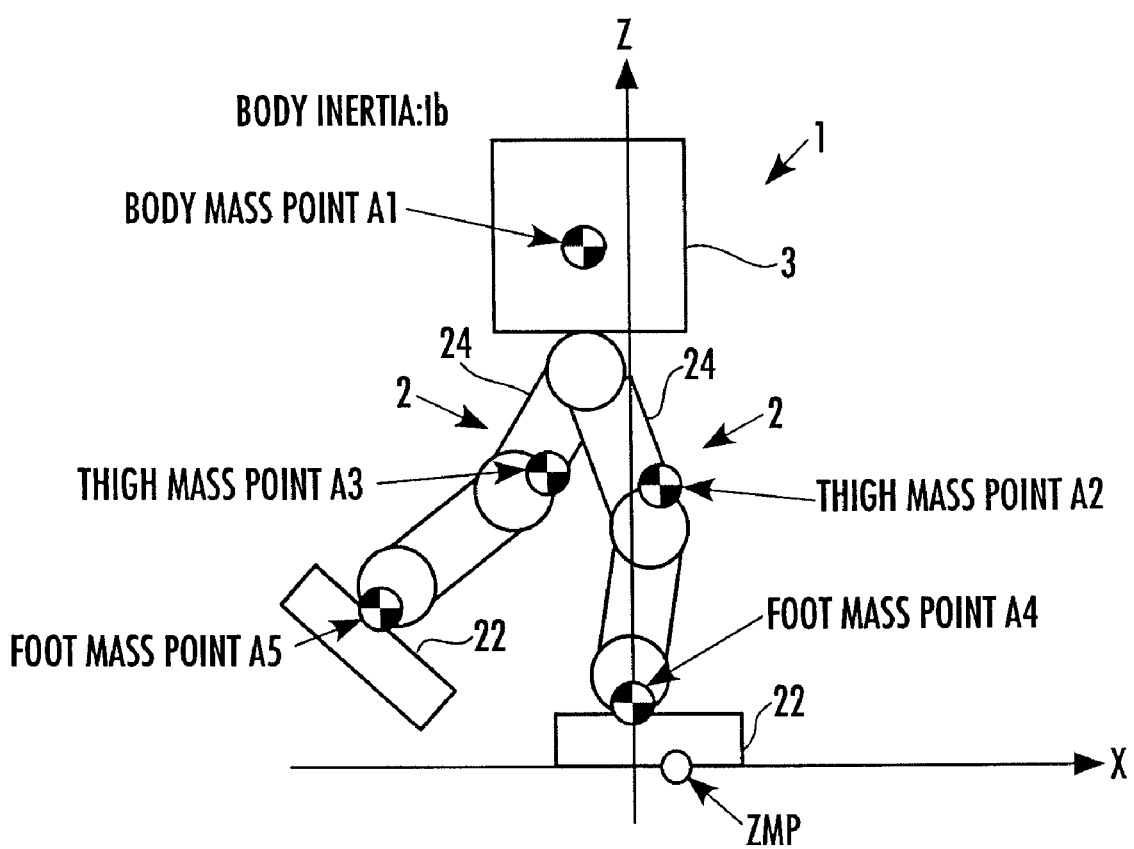
FIG. 8 It is a diagram showing the structure of a second displacement dimension correcting model in the first embodiment.
Figure 9:
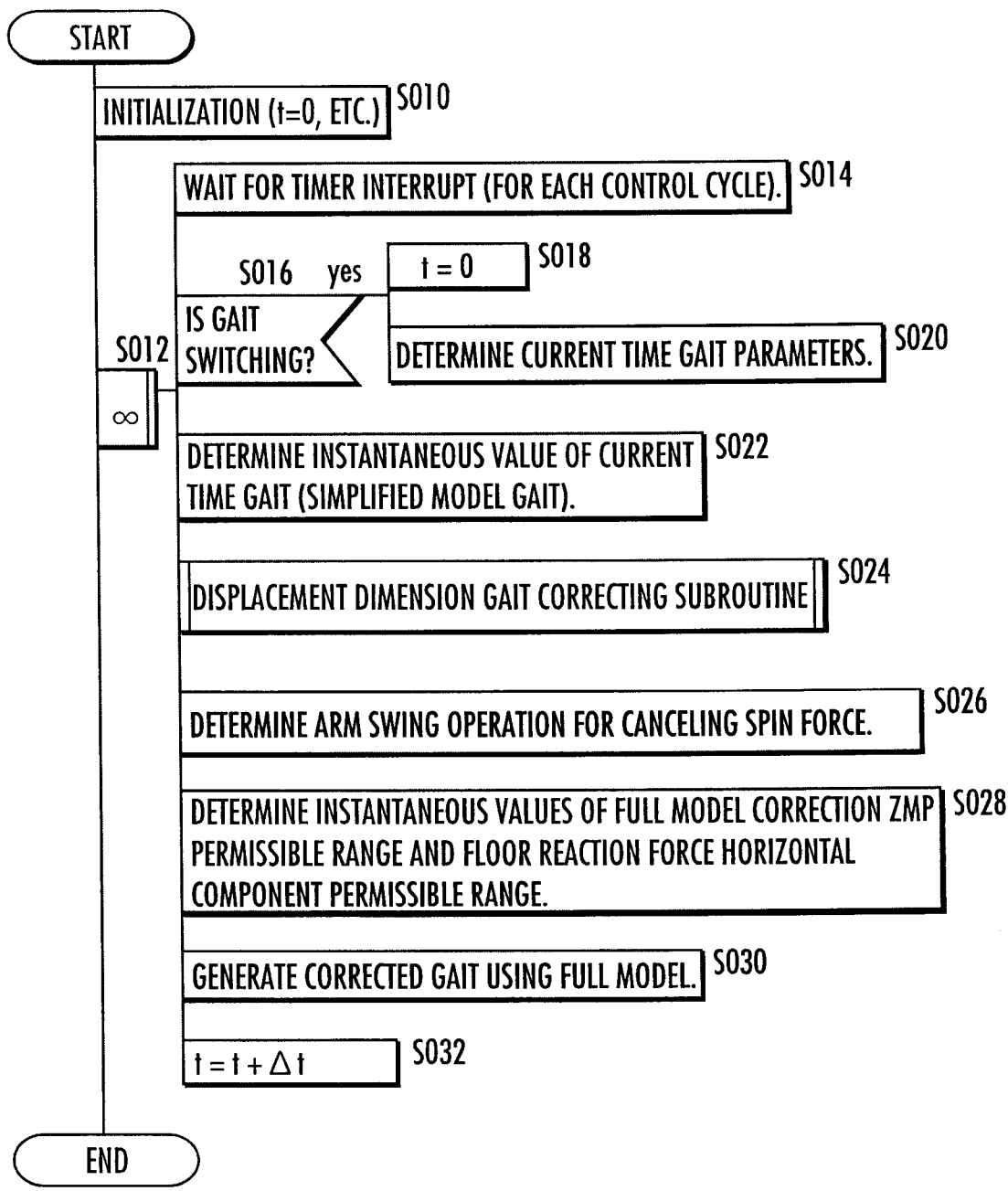
FIG. 9 It is a flowchart illustrating main routine processing of a gait generating device in the first embodiment.
Figure 10:
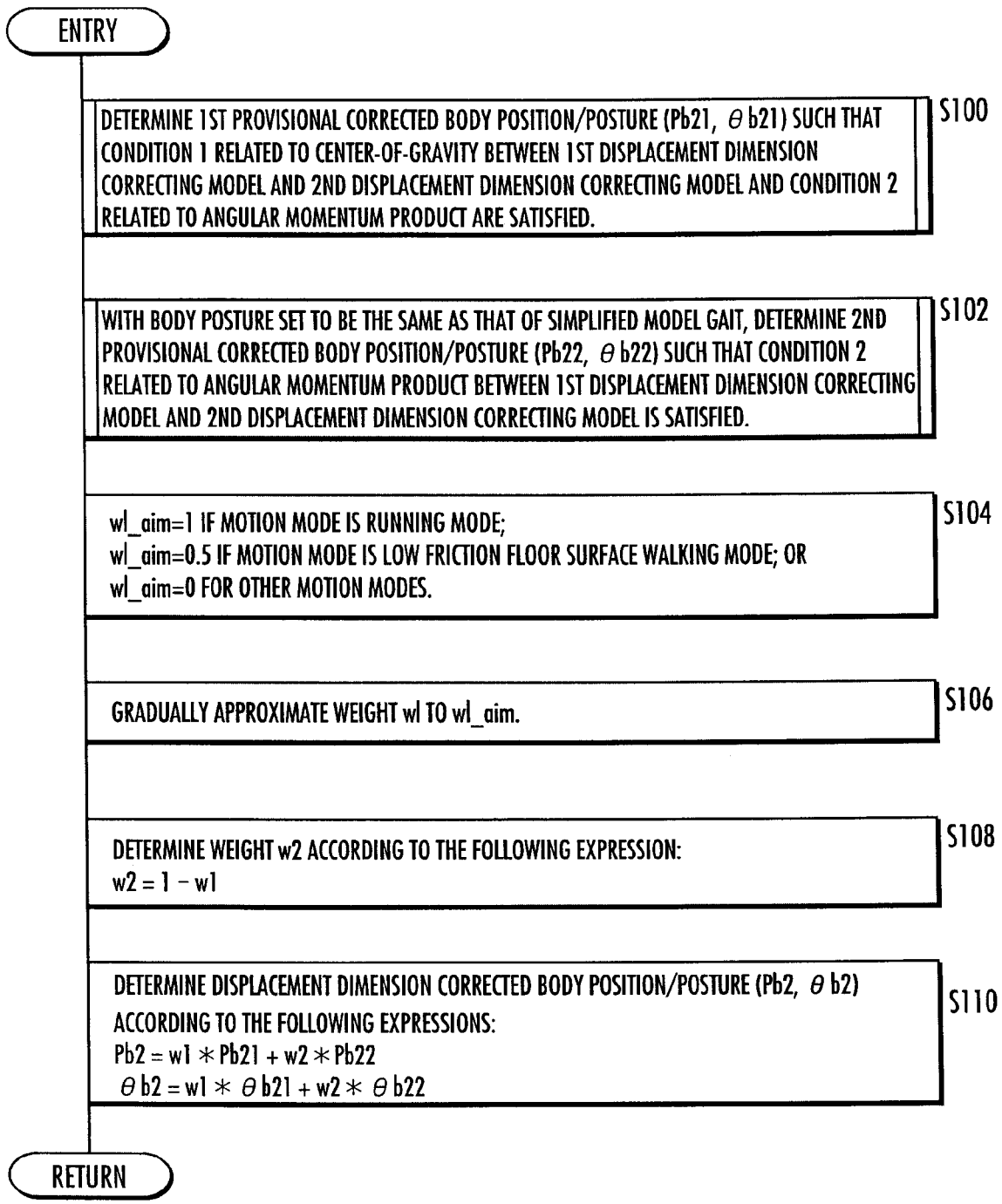
FIG. 10 It is a flowchart illustrating the processing of a displacement dimension gait correcting subroutine in the flowchart of FIG. 9 in the first embodiment.
Figure 11:
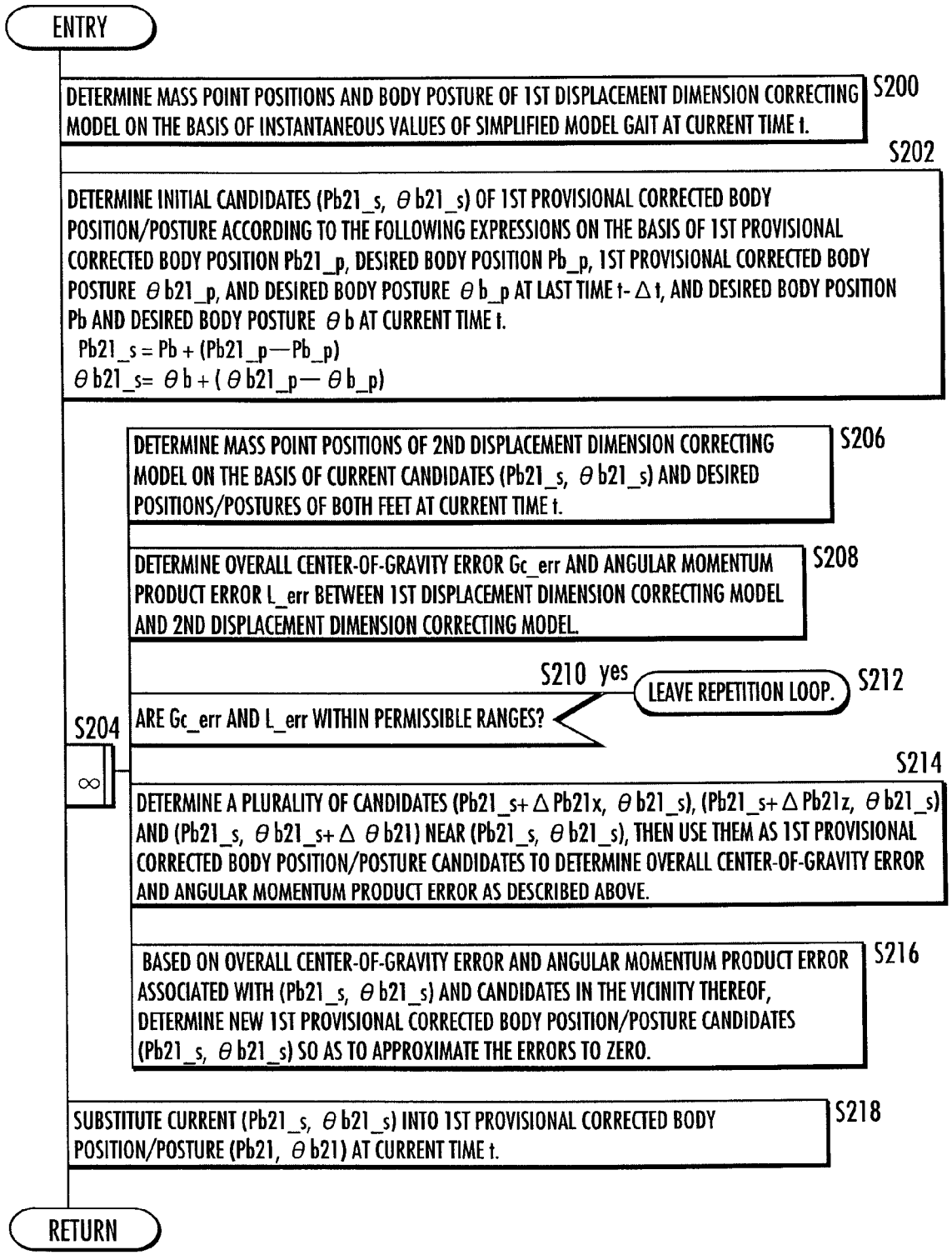
FIG. 11 It is a flowchart illustrating the subroutine processing of S100 of FIG. 10 in the first embodiment.
Figure 12:
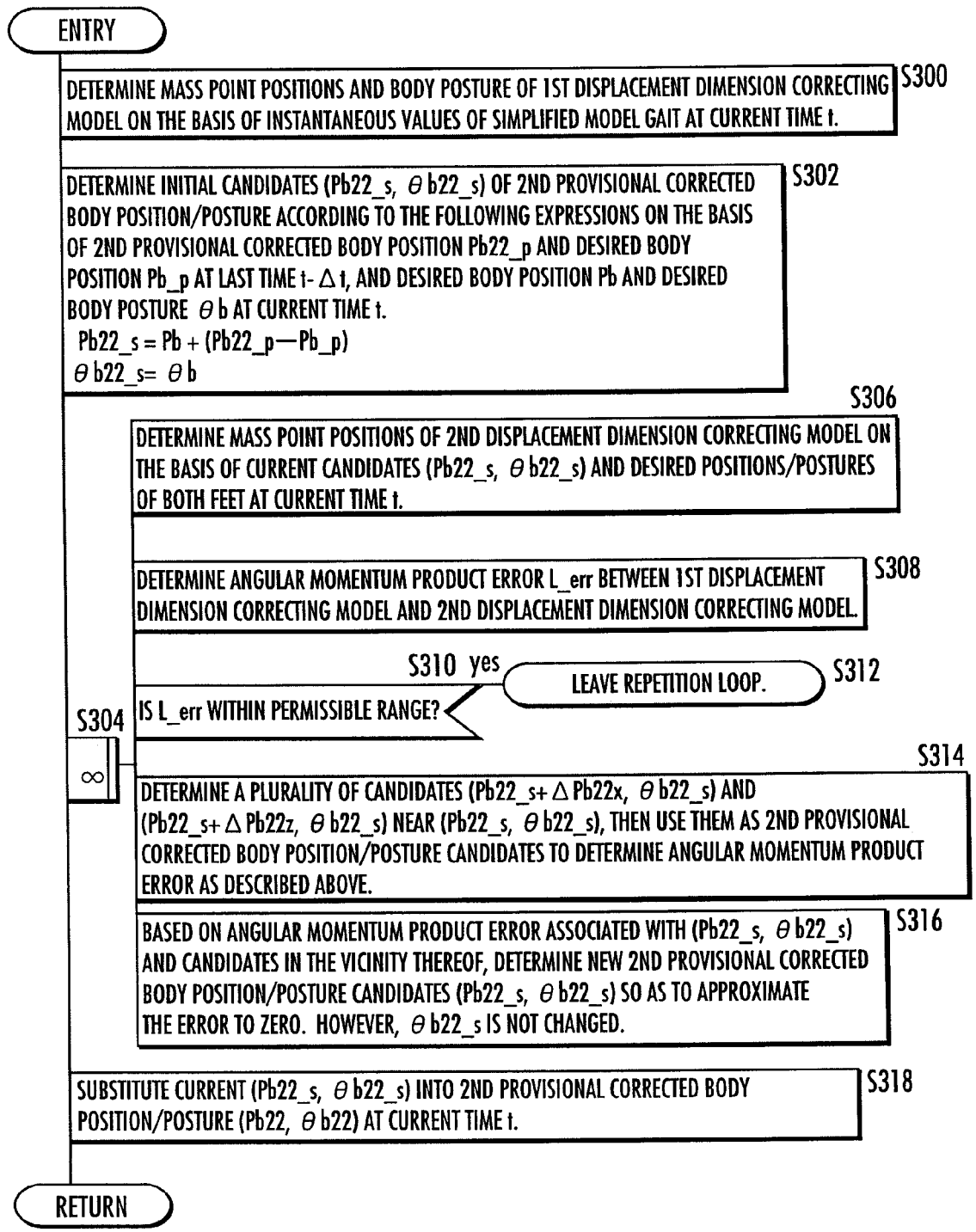
FIG. 12 It is a flowchart illustrating the subroutine processing of S102 of FIG. 10 in the first embodiment.
Figure 13:
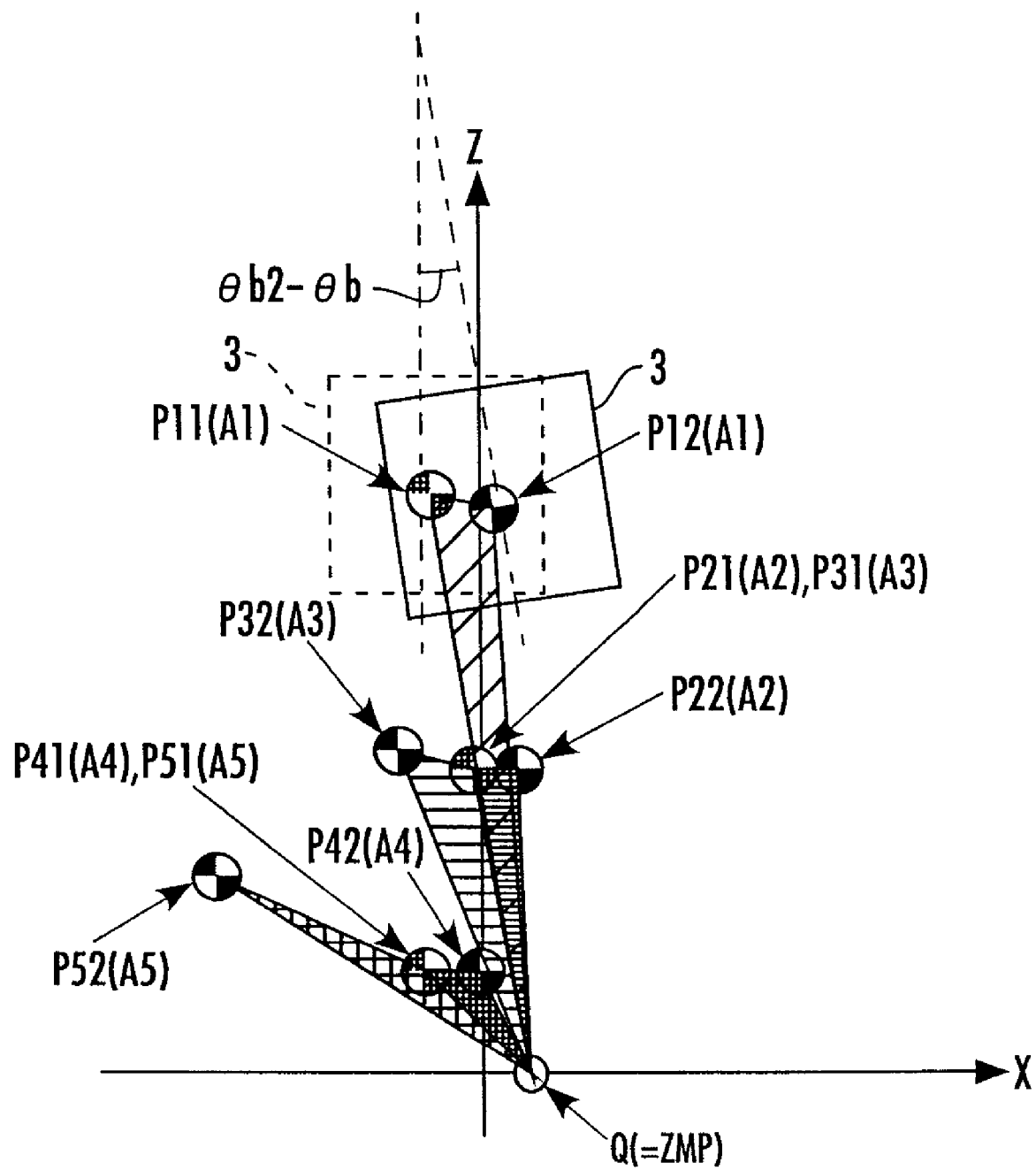
FIG. 13 It is a diagram for explaining the computation of angular momentum products in the first embodiment.
Figure 14:
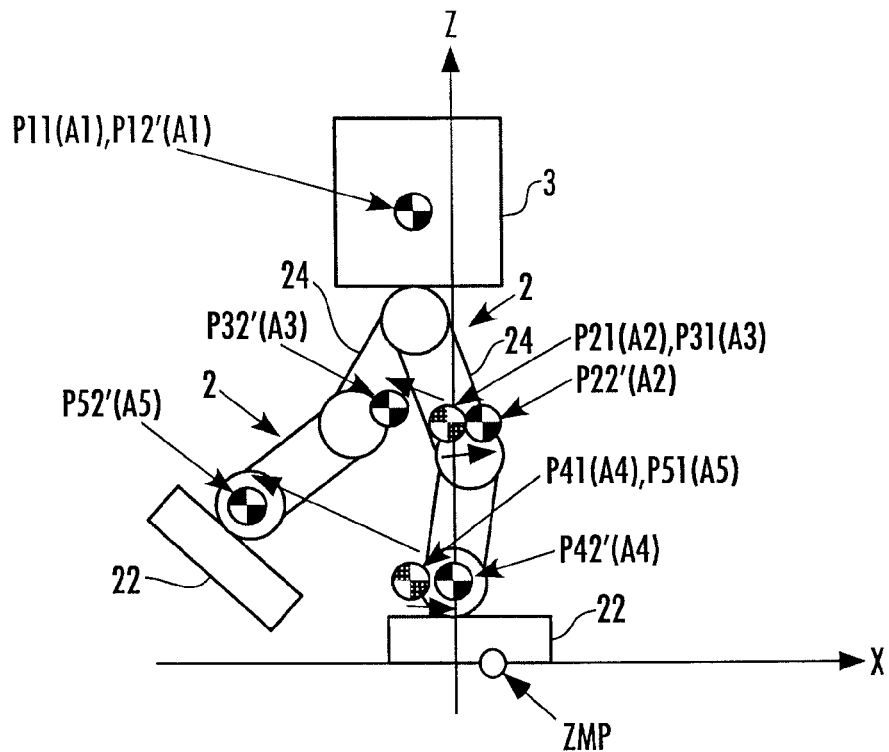
FIG. 14 It is a diagram showing a placement example of the elements of a first and a second displacement dimension correcting models in the first embodiment.
Figure 15:
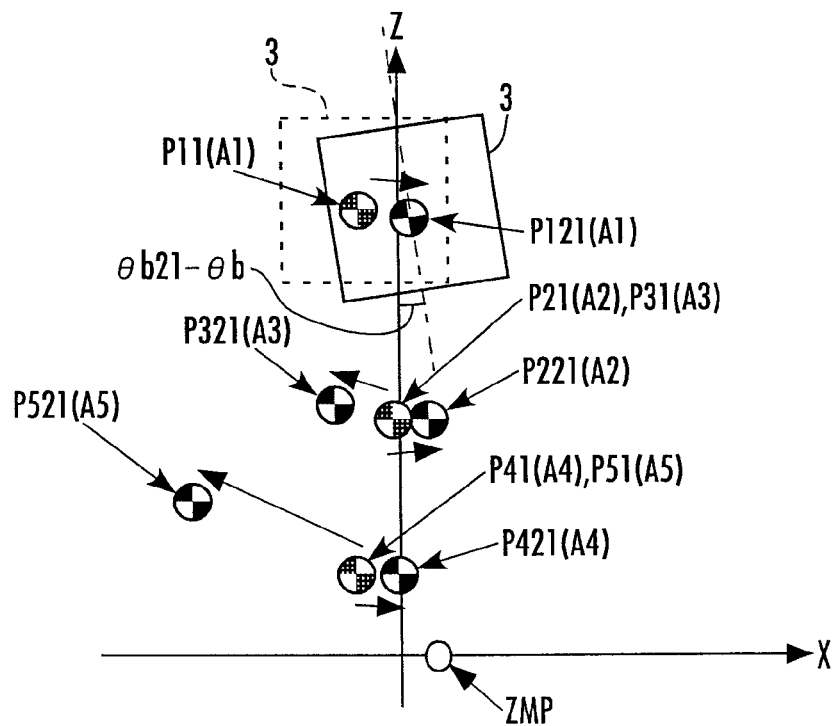
FIG. 15 It is a diagram showing a placement example of the elements of the first and the second displacement dimension correcting models in the first embodiment.
Figure 16:
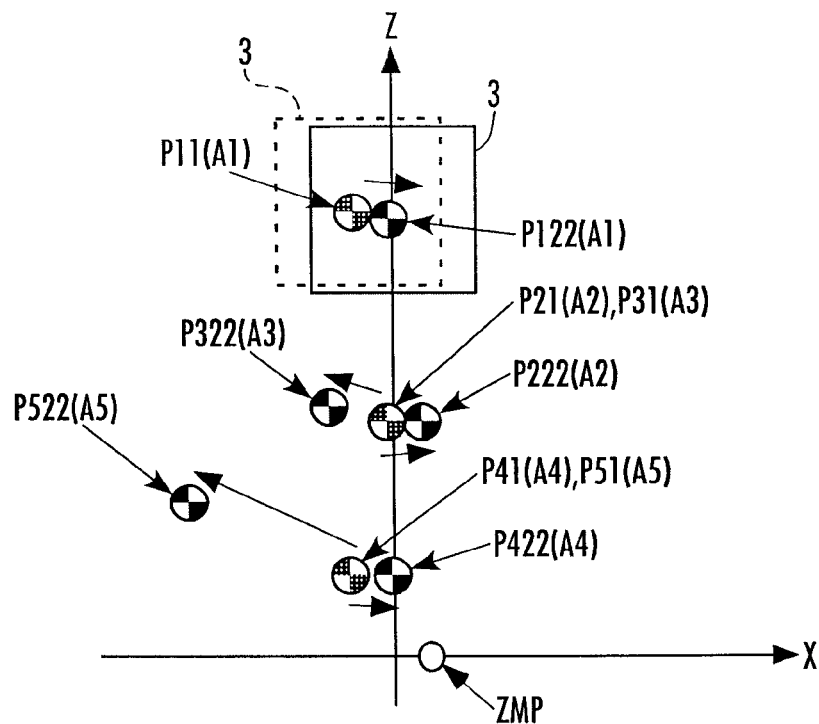
FIG. 16 It is a diagram showing a placement example of the elements of the first and the second displacement dimension correcting models in the first embodiment.
Figure 17:
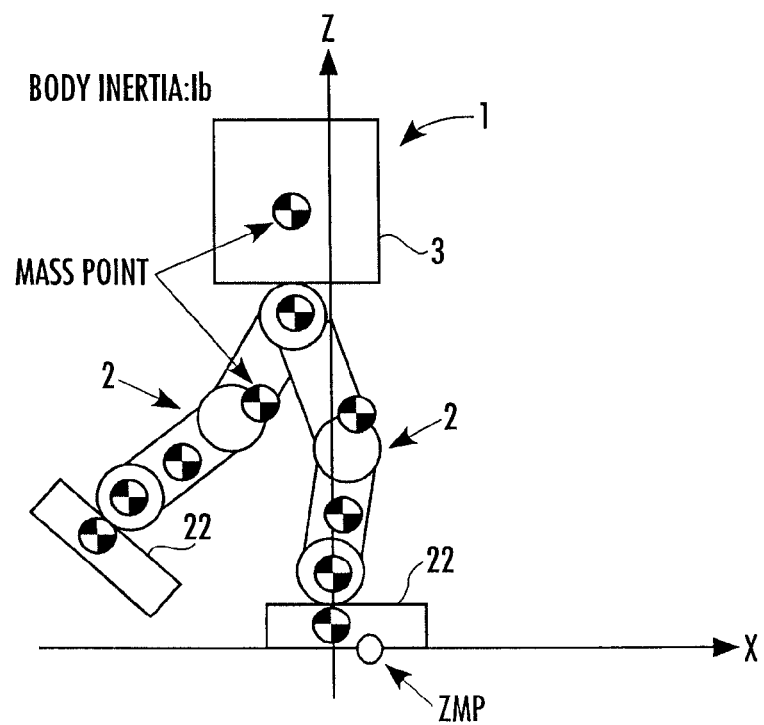
FIG. 17 It is a diagram showing an example of a full model used for a full model correction.
Figure 18:
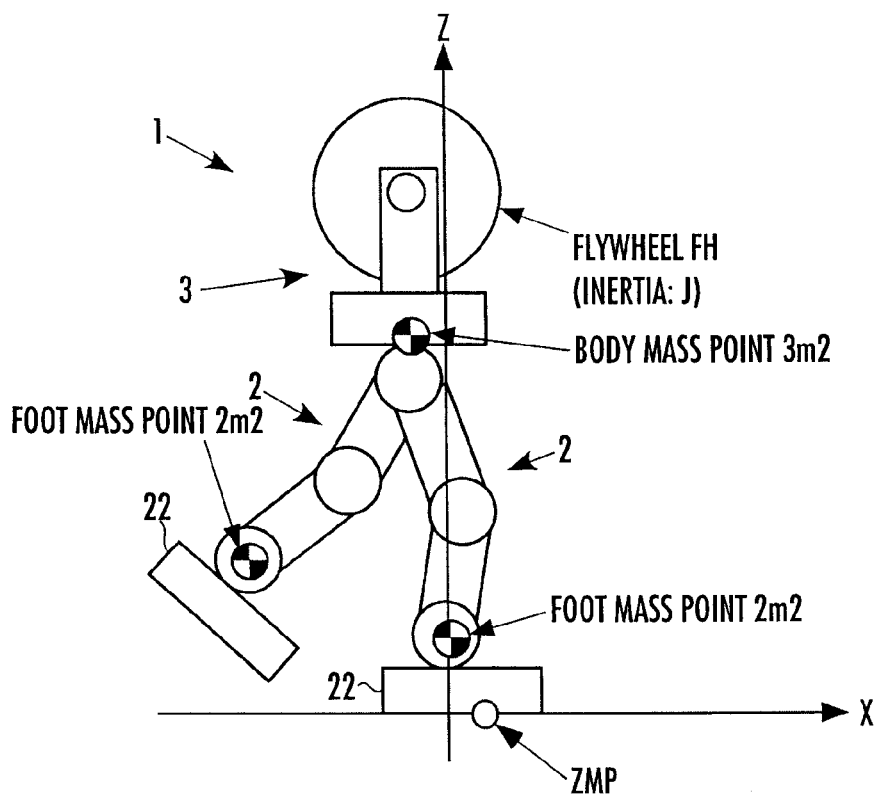
FIG. 18 It is a diagram showing a structure of a simplified model (dynamic model) in a second embodiment.
Figure 19:
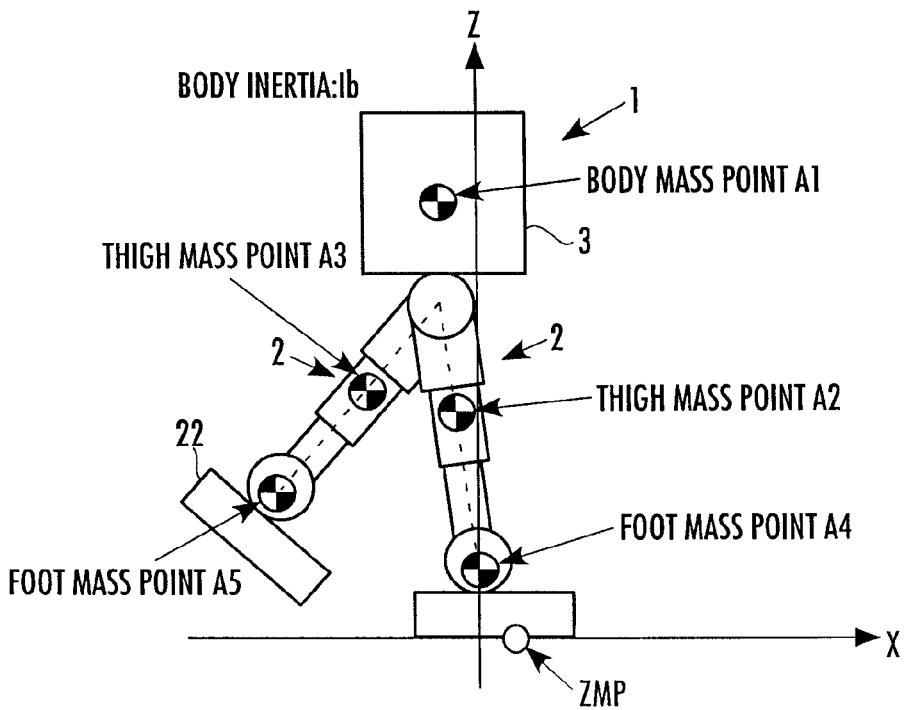
FIG. 19 It is a diagram showing the structure of a first displacement dimension correcting model in the second embodiment.
Figure 20:
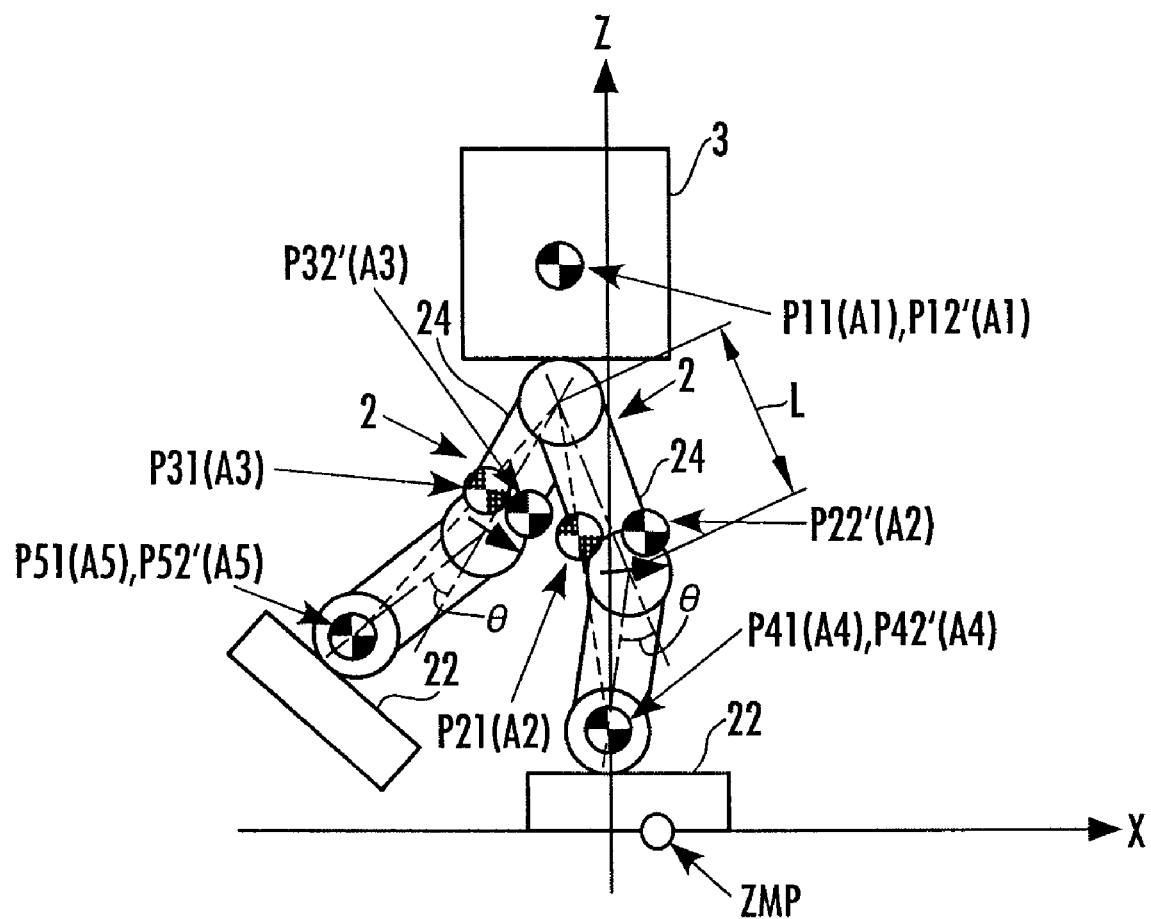
FIG. 20 It is a diagram showing a placement example of the elements of the first and the second displacement dimension correcting models in the second embodiment.
Figure 21:
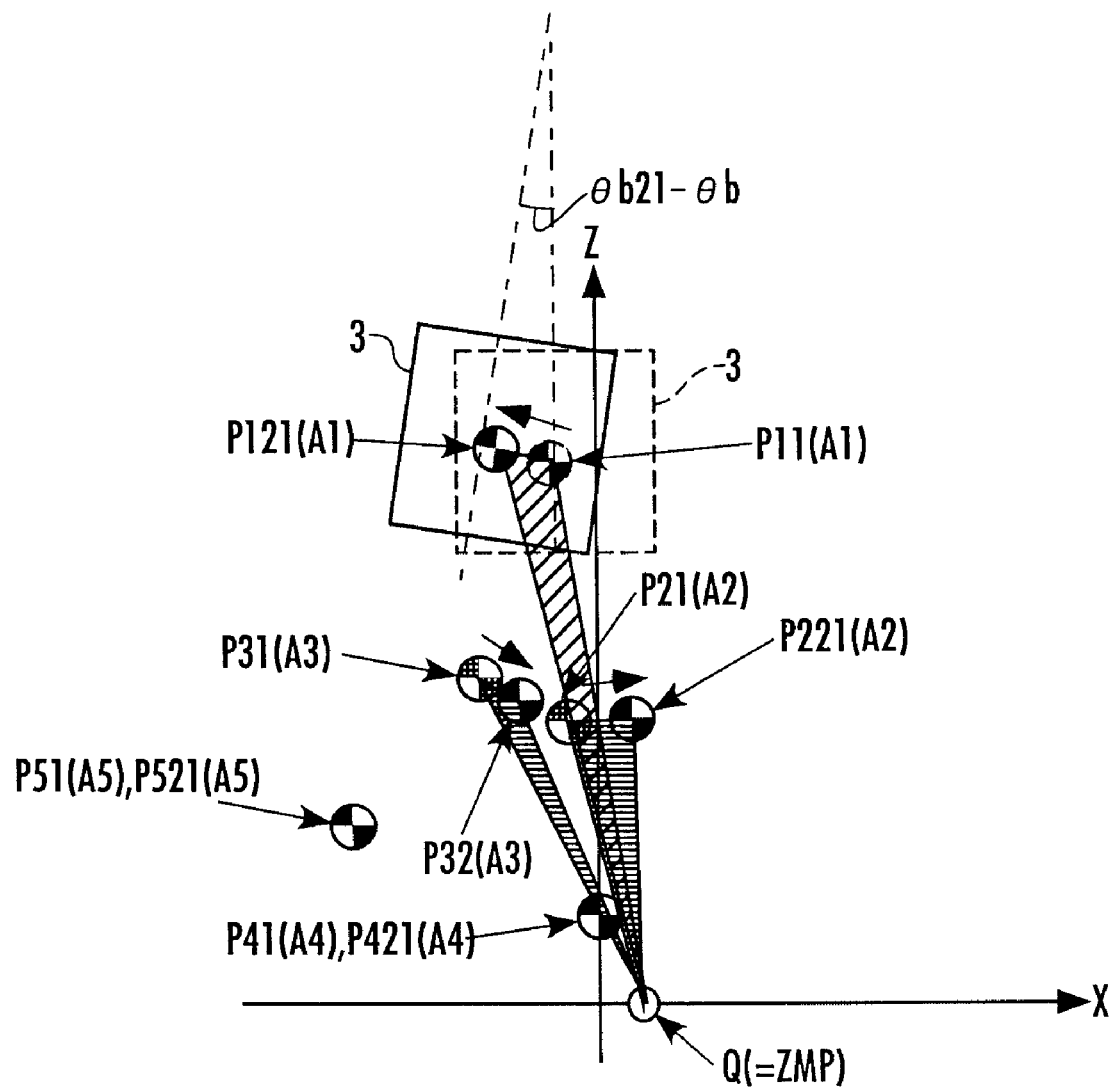
FIG. 21 It is a diagram showing a placement example of the elements of the first and the second displacement dimension correcting models in the second embodiment.
Figure 22:
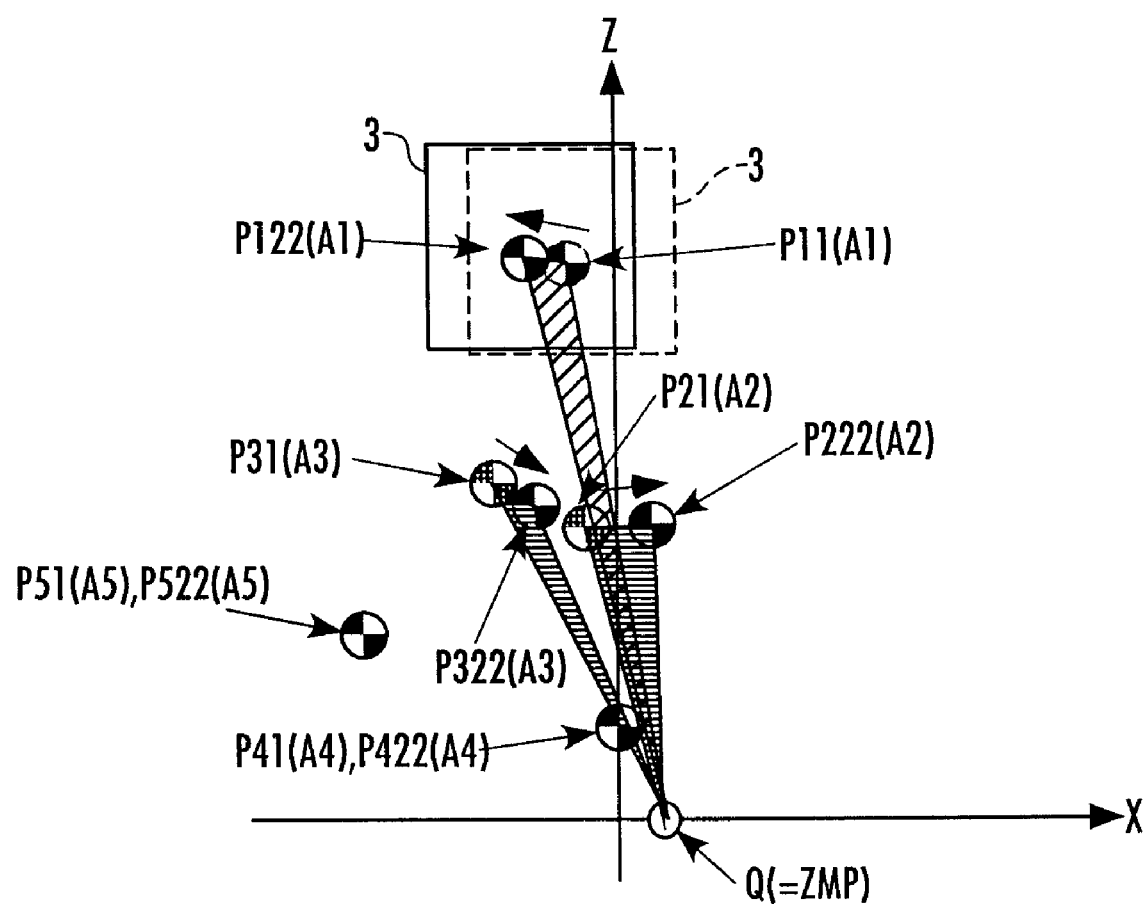
FIG. 22 It is a diagram showing a placement example of the elements of the first and the second displacement dimension correcting models in the second embodiment.
Figure 23:
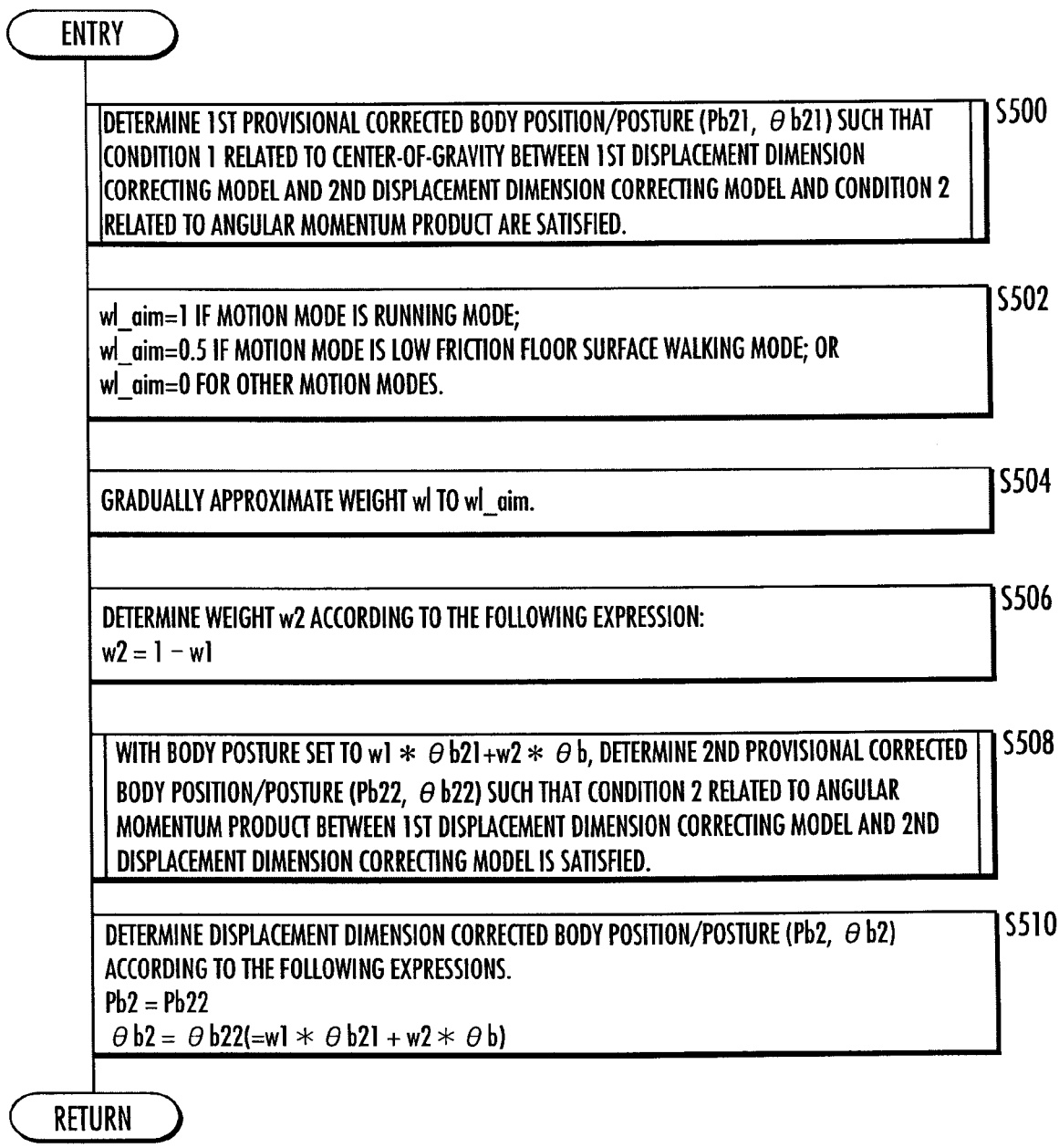
FIG. 23 It is a flowchart showing the processing of a displacement dimension gait correcting subroutine of the flowchart of FIG. 9 in a third embodiment.
Figure 24:
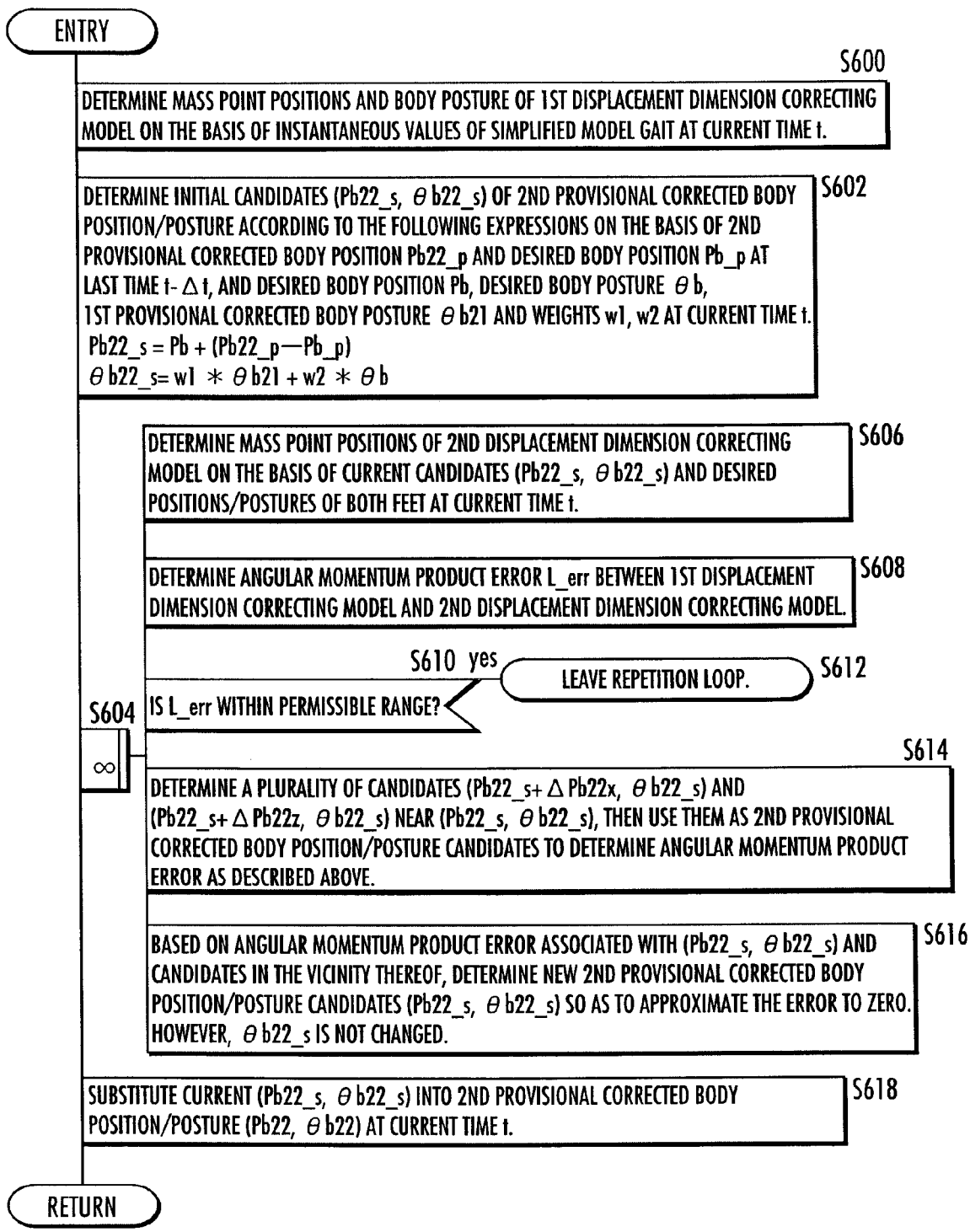
FIG. 24 It is a flowchart showing the subroutine processing of S506 of FIG. 23.
Figure 25:
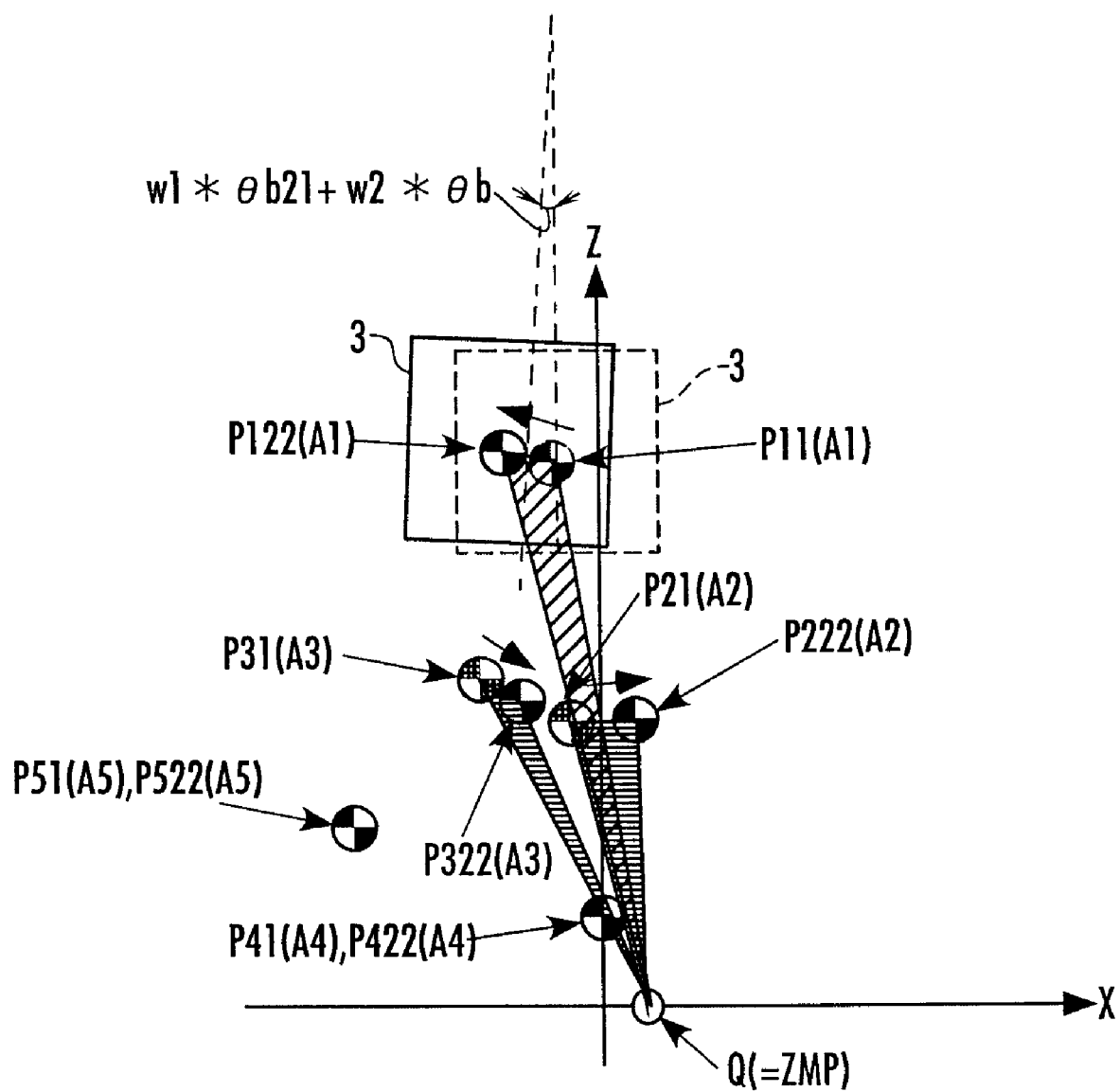
FIG. 25 It is a diagram showing a placement example of the elements of the first and the second displacement dimension correcting models in the third embodiment.
Figure 26A:
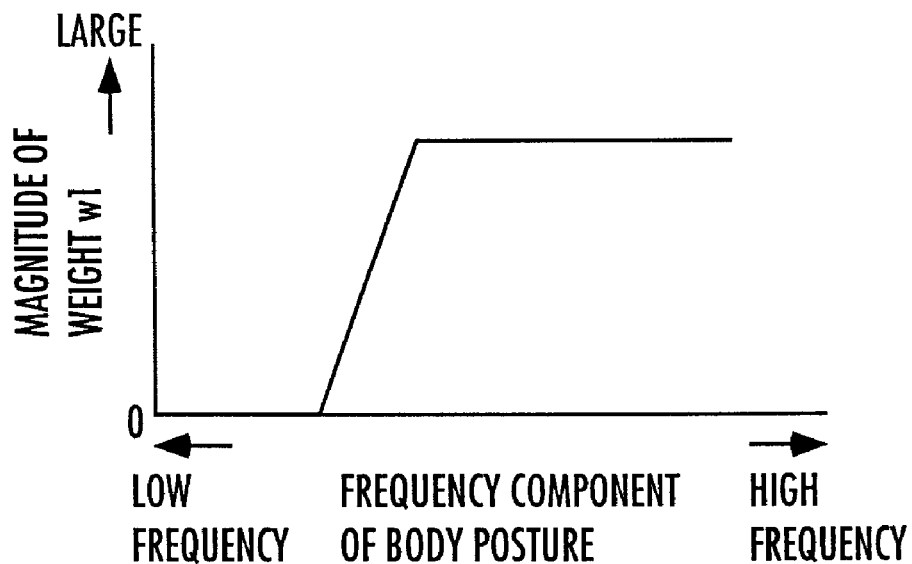
FIGS. 26(a) and (b) are graphs showing examples in which frequency characteristics have been imparted to a weight w1.
Figure 26B:
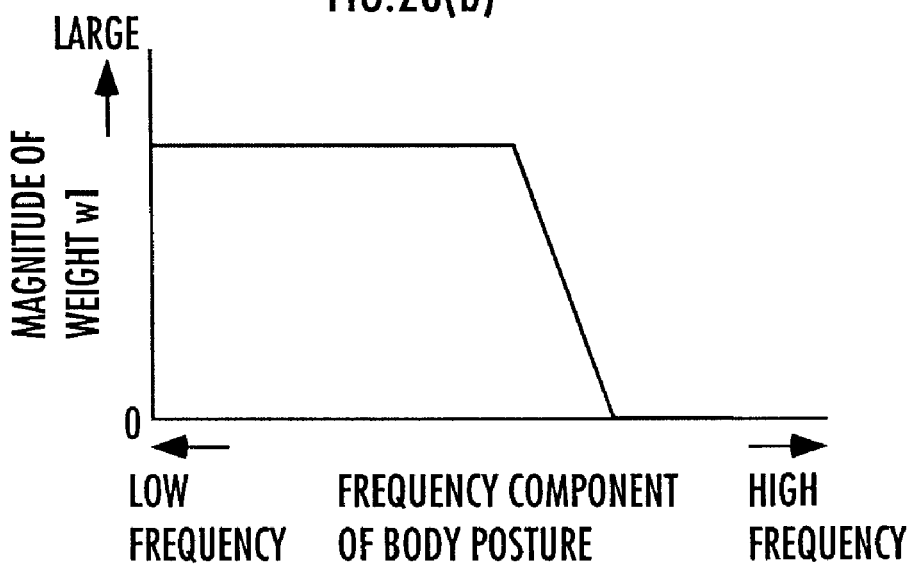
Figure 27:
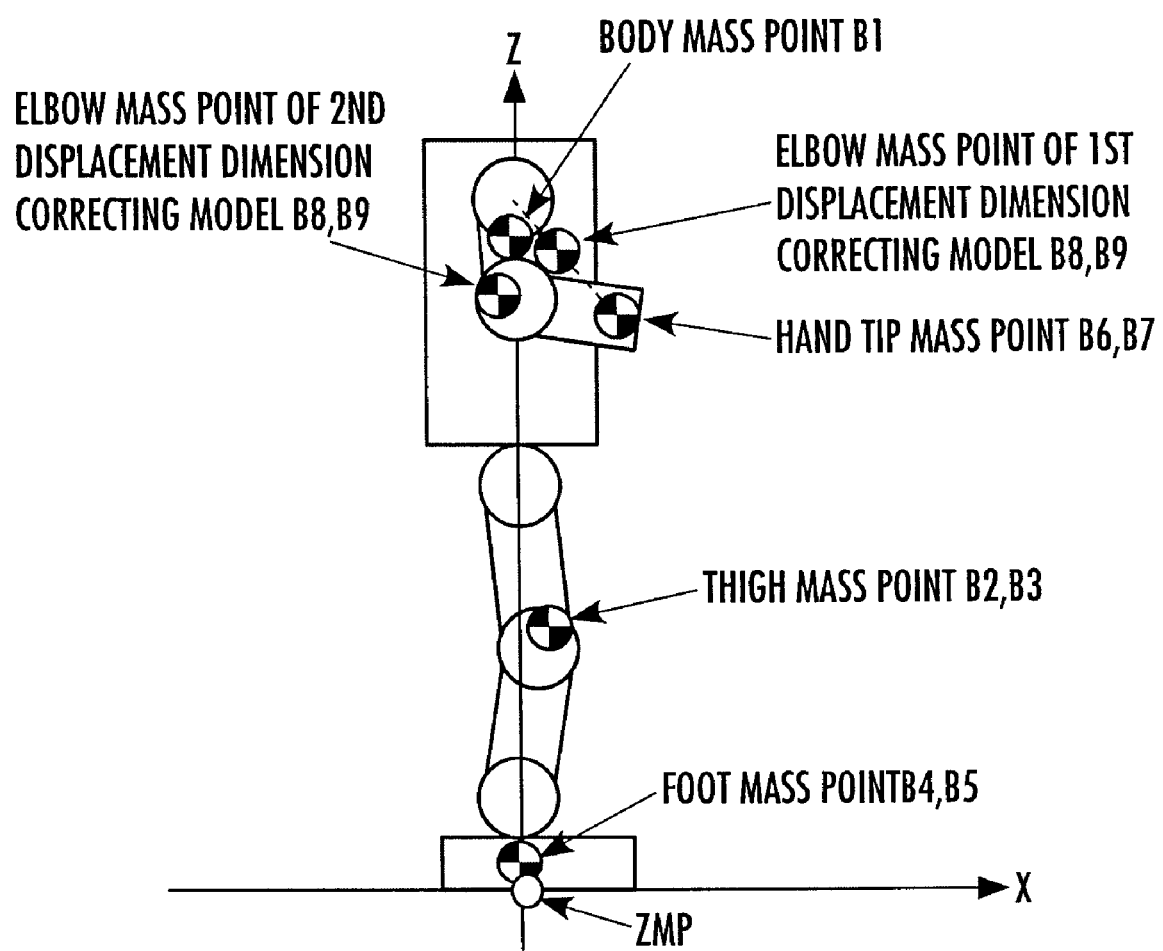
FIG. 27 It is a diagram showing another example of the placement of the elements of the first and the second displacement dimension correcting models.

The invention claimed is:

1. A gait generating device having instantaneous gait generating means for sequentially generating an instantaneous desired gait composed of an instantaneous desired motion of a mobile robot and an instantaneous desired floor reaction force, comprising:

first provisional corrected motion determining means for determining a first provisional corrected instantaneous desired motion obtained by provisionally correcting the position and the posture of a predetermined part of the mobile robot from the instantaneous desired motion;

second provisional corrected motion determining means for determining a second provisional corrected instantaneous desired motion obtained by provisionally correcting the position of the predetermined part from the instantaneous desired motion while maintaining the posture of the predetermined part to be the same as the posture in the instantaneous desired motion; and desired motion correcting means for determining a corrected instantaneous desired motion obtained by executing a true correction of the position and the posture of the predetermined part in the instantaneous desired motion on the basis of the first provisional corrected instantaneous desired motion and the second provisional corrected instantaneous desired motion, wherein, if all or a part of the mobile robot is expressed in terms of a model constructed of a plurality of elements, the elements being at least either rigid bodies having inertia or mass points, the placement of elements of the model determined according to a predetermined first geometric restrictive condition, which specifies the relationship between an instantaneous motion of the mobile robot and the placement of the elements of the model, from an instantaneous desired motion generated by the instantaneous gait generating means is defined as a first placement, the placement of the elements of the model determined according to a predetermined second geometric restrictive condition, which specifies the relationship between an instantaneous motion of the mobile robot and the placement of the elements of the model, from the first provisional corrected instantaneous desired motion determined by the first provisional corrected motion determining means is defined as a second placement, and the placement of the elements of the model determined according to the second geometric restrictive condition from the second provisional corrected instantaneous desired motion determined by the second provisional corrected motion determining means is defined as a third placement, then the first provisional corrected motion determining means determines the first provisional corrected instantaneous desired motion such that the translational force component of the resultant force of the inertial forces of the elements calculated by treating the difference in the placement of the elements of the model between the second placement and the first placement as acceleration becomes substantially zero and also the moment component generated about a predetermined point by the resultant force takes substantially a predetermined value, the second provisional corrected motion determining means determines the second provisional corrected instantaneous desired motion such that the moment component generated about the predetermined point by the resultant force of the inertial forces of the elements calculated by treating the difference in the placement of the elements of the model between the third placement and the first placement as acceleration takes substantially the predetermined value, and the desired motion correcting means determines the sum of the result obtained by multiplying the posture of the predetermined part in the first provisional corrected instantaneous desired motion by a predetermined weight w1 and the result obtained by multiplying the posture of the predetermined part in the second provisional corrected instantaneous desired motion by a predetermined weight w2 as the instantaneous desired posture of the predetermined part in the corrected instantaneous desired motion, and also determines the sum of the result obtained by multiplying the position of the predetermined part in the first provisional corrected instantaneous desired motion by the predetermined weight w1 and the result obtained by multiplying the position of the predetermined part in the second provisional corrected instantaneous desired motion by the predetermined weight w2 as the instantaneous desired position of the predetermined part in the corrected instantaneous desired motion.

2. A gait generating device having instantaneous gait generating means for sequentially generating an instantaneous desired gait composed of an instantaneous desired motion of a mobile robot and an instantaneous desired floor reaction force, comprising:

provisional corrected motion determining means for determining a provisional corrected instantaneous desired motion obtained by provisionally correcting the position and the posture of a predetermined part of the mobile robot from the instantaneous desired motion; and desired motion correcting means for determining a corrected instantaneous desired motion obtained by executing a true correction of the position and the posture of the predetermined part in the instantaneous desired motion, wherein, if all or a part of the mobile robot is expressed in terms of a model constructed of a plurality of elements, the elements being at least either rigid bodies having inertia or mass points, the placement of elements of the model determined according to a predetermined first geometric restrictive condition, which specifies the relationship between an instantaneous motion of the mobile robot and the placement of the elements of the model, from an instantaneous desired motion generated by the instantaneous gait generating means is defined as a first placement, the placement of the elements of the model determined according to a predetermined second geometric restrictive condition, which specifies the relationship between an instantaneous motion of the mobile robot and the placement of the elements of the model, from a provisional corrected instantaneous desired motion determined by the provisional corrected motion determining means is defined as a second placement, and the placement of the elements of the model determined according to the second geometric restrictive condition from the corrected instantaneous desired motion determined by the desired motion correcting means is defined as a third placement, then the provisional corrected motion determining means determines the provisional corrected instantaneous desired motion such that the translational force component of the resultant force of the inertial forces of the elements calculated by treating the difference in the placement of the elements of the model between the second placement and the first placement as acceleration becomes substantially zero, and also the moment component generated about a predetermined point by the resultant force takes substantially a predetermined value, and the desired motion correcting means determines the sum of the result obtained by multiplying the posture of the predetermined part in the provisional corrected instantaneous desired motion by a predetermined weight w1 and the result obtained by multiplying the posture of the predetermined part in the instantaneous desired motion generated by the instantaneous gait generating means by a predetermined weight w2 as the instantaneous desired posture of the predetermined part in the corrected instantaneous desired motion, and also determines the instantaneous desired position of the predetermined part in the corrected instantaneous desired motion such that the moment component generated about a predetermined point by the resultant force of the inertial forces of the elements calculated by treating the difference in the placement of the elements of the model between the third placement and the first placement as acceleration takes substantially a predetermined value.

3. The gait generating device of a mobile robot according to claim 1, comprising means for variably determining at least the predetermined weight w1 on the basis of at least the condition of a road surface on which the mobile robot is to be operated according to the desired gait or the motion mode of the mobile robot according to the desired gait, the magnitudes of both the predetermined weights w1 and w2 falling within the range of 0 to 1.

4. The gait generating device of a mobile robot according to claim 3, wherein the sum of the magnitude of the predetermined weight w1 and the magnitude of the predetermined weight w2 is 1.

5. The gait generating device of a mobile robot according to claim 1, wherein the predetermined weight w1 is a weight having a frequency characteristic relative to the posture of the predetermined part multiplied by the same.

6. The gait generating device of a mobile robot according to claim 1, wherein
in the moment component related to the difference in placement of the elements between the second placement and the first placement, the component originated from the difference between position A in the first placement and position B in the second placement of the elements of the model having masses is calculated from an angle formed by a segment connecting the predetermined point and the position A and a segment connecting the predetermined point and the position B by using a substantially monotonous function related to the angle, and
in the moment component related to the difference in placement of the elements between the third placement and the first placement, the component originated from the difference between position A in the first placement and position C in the third placement of the elements of the model having masses is calculated using the monotonous function from the angle formed by the segment connecting the predetermined point and the position A and a segment connecting the predetermined point and the position C.

7. The gait generating device of a mobile robot according to claim 1, wherein the instantaneous desired motion generated by the instantaneous gait generating means is determined using a dynamic model that represents the relationship between a motion of the mobile robot and a floor reaction force and that is constructed on the assumption that the inertial force generated by a specific motion component of at least one or more specific parts of the mobile robot is substantially zero, and the model includes an element corresponding to at least one part of the specific parts.

8. The gait generating device of a mobile robot according to claim 1, wherein
an instantaneous desired motion generated by the instantaneous gait generating means is determined such that it satisfies a desired floor reaction force or a desired ZMP on a predetermined dynamic model representing a relationship between a motion of the mobile robot and a floor reaction force, and
the first and the second geometric restrictive conditions are set such that a value obtained by adding a predetermined steady offset to the difference between a floor reaction force counterbalancing with a resultant force of the inertial forces of the elements that are generated due to temporal changes in the placement of the elements of the model determined according to the first geometric restrictive condition from the instantaneous desired motion and a floor reaction force counterbalancing with a resultant force of the inertial forces of the elements that are generated due to temporal changes in the placement of the elements of the model determined according to the second geometric restrictive condition from the instantaneous desired motion substantially agrees with an error of a floor reaction force produced in the dynamic model by the instantaneous desired motion.

9. The gait generating device of a mobile robot according to claim 1, wherein
an instantaneous desired motion generated by the instantaneous gait generating means is determined so that a desired floor reaction force or a desired ZMP on a predetermined dynamic model representing a relationship between a motion of the mobile robot and a floor reaction force is satisfied, and
the first and the second geometric restrictive conditions are set such that a value obtained by multiplying the difference between the overall center-of-gravity of the placement of the elements of the model determined according to the first geometric restrictive condition from the instantaneous desired motion and the overall center-of-gravity of the placement of the elements of the model determined according to the second geometric restrictive condition from the instantaneous desired motion by the total mass of the elements substantially agrees with a value obtained by multiplying an error of the overall center-of-gravity of the dynamic model in the instantaneous desired motion by a total mass of the dynamic model.

10. The gait generating device of a mobile robot according to claim 1, wherein the mobile robot is a robot comprising a plurality of legs or a plurality of arms extended from its body as a plurality of movable members, and the first geometric restrictive condition includes a condition in which any one of the elements of the model exists on a straight line parallel to a segment connecting a predetermined point in the vicinity of a distal portion of each movable member and a predetermined point in the vicinity of the portion of the movable member that is connected to the body.

11. The gait generating device of a mobile robot according to claim 1, wherein the mobile robot is a robot comprising a plurality of legs or a plurality of arms extended from its body as a plurality of movable members, and the first geometric restrictive condition includes a condition in which the body and the movable members on the model are retained in a predetermined constant posture state.

12. The gait generating device of a mobile robot according to claim 11, wherein the predetermined constant posture is the posture in which the body and the plurality of movable members of the mobile robot are oriented substantially in the vertical direction.

13. The gait generating device of a mobile robot according to claim 1, wherein the second geometric restrictive condition is set such that the placement of the elements of the model determined according to the condition from an arbitrary instantaneous desired motion of the mobile robot substantially agrees with the placement of parts corresponding to the elements in the robot following the instantaneous desired motion.

14. The gait generating device of a mobile robot according to claim 1, wherein the mobile robot comprises a plurality of legs or a plurality of arms extended from the body as a plurality of movable members and also has flexible joints at middle portions between the portions of the movable members that connect to the body and the distal portions of the movable members, and an instantaneous desired motion generated by the instantaneous gait generating means is determined using a dynamic model that represents a relationship between a motion of the robot and a floor reaction force and that is constructed on the assumption that the inertial forces produced at or near the middle portions of the movable members due to bending motions of the movable members are substantially zero, the model being a model that contains, as elements, mass points associated with at least middle portions or portions close thereto of the movable members.

15. The gait generating device of a mobile robot according to claim 14, wherein the first geometric restrictive condition includes a condition in which a mass point associated with a middle portion or a portion close thereto of each movable member of the elements of the model exists on the segment that connects a predetermined point in the vicinity of the distal portion of the movable member and a predetermined point in the vicinity of the portion of the movable member that links with the body, and the second geometric restrictive condition is set such that the placement of the elements of the model determined according to the condition from an arbitrary instantaneous desired motion of the mobile robot substantially agrees with the placement of parts corresponding to the elements in the robot following the instantaneous desired motion.

16. The gait generating device of a mobile robot according to claim 2, comprising means for variably determining at least the predetermined weight w1 on the basis of at least the condition of a road surface on which the mobile robot is to be operated according to the desired gait or the motion mode of the mobile robot according to the desired gait, the magnitudes of both the predetermined weights w1 and w2 falling within the range of 0 to 1.

17. The gait generating device of a mobile robot according to claim 16, wherein the sum of the magnitude of the predetermined weight w1 and the magnitude of the predetermined weight w2 is 1.

18. The gait generating device of a mobile robot according to claim 2, wherein the predetermined weight w1 is a weight having a frequency characteristic relative to the posture of the predetermined part multiplied by the same.

19. The gait generating device of a mobile robot according to claim 2, wherein in the moment component related to the difference in placement of the elements between the second placement and the first placement, the component originated from the difference between position A in the first placement and position B in the second placement of the elements of the model having masses is calculated from an angle formed by a segment connecting the predetermined point and the position A and a segment connecting the predetermined point and the position B by using a substantially monotonous function related to the angle, and in the moment component related to the difference in placement of the elements between the third placement and the first placement, the component originated from the difference between position A in the first placement and position C in the third placement of the elements of the model having masses is calculated using the monotonous function from the angle formed by the segment connecting the predetermined point and the position A and a segment connecting the predetermined point and the position C.

20. The gait generating device of a mobile robot according to claim 2, wherein the instantaneous desired motion generated by the instantaneous gait generating means is determined using a dynamic model that represents the relationship between a motion of the mobile robot and a floor reaction force and that is constructed on the assumption that the inertial force generated by a specific motion component of at least one or more specific parts of the mobile robot is substantially zero, and the model includes an element corresponding to at least one part of the specific parts.

21. The gait generating device of a mobile robot according to claim 2, wherein an instantaneous desired motion generated by the instantaneous gait generating means is determined such that it satisfies a desired floor reaction force or a desired ZMP on a predetermined dynamic model representing a relationship between a motion of the mobile robot and a floor reaction force, and the first and the second geometric restrictive conditions are set such that a value obtained by adding a predetermined steady offset to the difference between a floor reaction force counterbalancing with a resultant force of the inertial forces of the elements that are generated due to temporal changes in the placement of the elements of the model determined according to the first geometric restrictive condition from the instantaneous desired motion and a floor reaction force counterbalancing with a resultant force of the inertial forces of the elements that are generated due to temporal changes in the placement of the elements of the model determined according to the second geometric restrictive condition from the instantaneous desired motion substantially agrees with an error of a floor reaction force produced in the dynamic model by the instantaneous desired motion.

22. The gait generating device of a mobile robot according to claim 2, wherein an instantaneous desired motion generated by the instantaneous gait generating means is determined so that a desired floor reaction force or a desired ZMP on a predetermined dynamic model representing a relationship between a motion of the mobile robot and a floor reaction force is satisfied, and the first and the second geometric restrictive conditions are set such that a value obtained by multiplying the difference between the overall center-of-gravity of the placement of the elements of the model determined according to the first geometric restrictive condition from the instantaneous desired motion and the overall center-of-gravity of the placement of the elements of the model determined according to the second geometric restrictive condition from the instantaneous desired motion by the total mass of the elements substantially agrees with a value obtained by multiplying an error of the overall center-of-gravity of the dynamic model in the instantaneous desired motion by a total mass of the dynamic model.

23. The gait generating device of a mobile robot according to claim 2, wherein the mobile robot is a robot comprising a plurality of legs or a plurality of arms extended from its body as a plurality of movable members, and the first geometric restrictive condition includes a condition in which any one of the elements of the model exists on a straight line parallel to a segment connecting a predetermined point in the vicinity of a distal portion of each movable member and a predetermined point in the vicinity of the portion of the movable member that is connected to the body.

24. The gait generating device of a mobile robot according to claim 2, wherein the mobile robot is a robot comprising a plurality of legs or a plurality of arms extended from its body as a plurality of movable members, and the first geometric restrictive condition includes a condition in which the body and the movable members on the model are retained in a predetermined constant posture state.

25. The gait generating device of a mobile robot according to claim 24, wherein the predetermined constant posture is the posture in which the body and the plurality of movable members of the mobile robot are oriented substantially in the vertical direction.

26. The gait generating device of a mobile robot according to claim 2, wherein the second geometric restrictive condition is set such that the placement of the elements of the model determined according to the condition from an arbitrary instantaneous desired motion of the mobile robot substantially agrees with the placement of parts corresponding to the elements in the robot following the instantaneous desired motion.

27. The gait generating device of a mobile robot according to claim 2, wherein the mobile robot comprises a plurality of legs or a plurality of arms extended from the body as a plurality of movable members and also has flexible joints at middle portions between the portions of the movable members that connect to the body and the distal portions of the movable members, and an instantaneous desired motion generated by the instantaneous gait generating means is determined using a dynamic model that represents a relationship between a motion of the robot and a floor reaction force and that is constructed on the assumption that the inertial forces produced at or near the middle portions of the movable members due to bending motions of the movable members are substantially zero, the model being a model that contains, as elements, mass points associated with at least middle portions or portions close thereto of the movable members.

28. The gait generating device of a mobile robot according to claim 27, wherein the first geometric restrictive condition includes a condition in which a mass point associated with a middle portion or a portion close thereto of each movable member of the elements of the model exists on the segment that connects a predetermined point in the vicinity of the distal portion of the movable member and a predetermined point in the vicinity of the portion of the movable member that links with the body, and the second geometric restrictive condition is set such that the placement of the elements of the model determined according to the condition from an arbitrary instantaneous desired motion of the mobile robot substantially agrees with the placement of parts corresponding to the elements in the robot following the instantaneous desired motion.

\* \* \* \* \*